3/15/88 XR 4,731,730 SR

United States Patent [19]

Hedrick et al.

[11] Patent Number: 4,731,730

[45] Date of Patent: Mar. 15, 1988

[54] UNIVERSAL FUEL QUANTITY INDICATOR APPARATUS

[75] Inventors: Geoffrey S. Hedrick, Malvern; Steven L. Tomlinson, Coatesvile, both of Pa.

[73] Assignee: Smiths Industries Aerospace & Defence Systems Inc., Malvern, Pa.

[21] Appl. No.: 729,150

[22] Filed: Apr. 30, 1985

[51] Int. Cl.[4] .............. G01F 23/26

[52] U.S. Cl. .............. 364/509; 364/551; 364/506; 73/290 R; 73/304 C; 340/59; 340/620

[58] Field of Search .............. 364/509, 510, 571, 200, 364/900, 551, 506; 73/290 R, 304 C, 304 R; 370/53, 60; 340/59, 620

[56] References Cited

U.S. PATENT DOCUMENTS

| | | | |
|---|---|---|---|
| 4,083,248 | 4/1978 | Maier | 73/304 C |
| 4,090,408 | 5/1978 | Hedrick | 73/304 C |
| 4,173,893 | 11/1979 | Hedrick | 73/304 C |
| 4,220,823 | 9/1980 | Littlefield | 370/53 |
| 4,227,246 | 10/1980 | Vaughan, III et al. | 364/510 |
| 4,354,263 | 10/1982 | Bardry et al. | 370/60 |
| 4,355,363 | 10/1982 | Colby et al. | 73/290 R |
| 4,420,819 | 12/1983 | Price et al. | 364/900 |
| 4,589,077 | 5/1986 | Pope | 364/509 |

OTHER PUBLICATIONS

Signetics Corporation; Data Book; 1974.

*Primary Examiner*—Errol A. Krass
*Assistant Examiner*—V. N. Trans
*Attorney, Agent, or Firm*—Stiefel, Gross & Kurland

[57] ABSTRACT

A universal fuel quantity indicator apparatus (100,102) includes a digital fuel quantity indicator (100) having an internal microprocessor control unit (104) and a removably connectable digital calibration trim unit interface (102) which enables the fuel quantity indicator (100) to be reconfigured for different fuel tanks by varying selectable fuel tank parameters, such as constants associated with a fuel quantity determination based on calculations of capacitance of a tank capacitor array (110) and a compensator capacitor (112). The interface (102) includes up/down steering control buttons (140,142) which control selection and storage of the selected parameters, a mode selection jumper (154) which selects between a RUN mode and a CALIBRATE mode for the indicator (100), and an alternate static memory (108) which stores the configured parameters for loading to the indicator internal static memory (150) associated with the microprocessor (104) in the CALIBRATE mode to configure the indicator (100) for a specific fuel tank. The indicator display (130) is used in the CALIBRATE mode to display the parameters being selected to configure the indicator (100) for a specific fuel tank and in the RUN mode to display the measured fuel quantity information for the configured fuel tank. The control program for both the RUN and CALIBRATE modes is resident in the indicator internal static memory (150) and is accessed by the interface (102) in the CALIBRATE mode to accomplish the parameter selection needed to reconfigure the universal indicator (100) for a specific fuel tank, such as for an aircraft.

41 Claims, 23 Drawing Figures

NORMAL DISPLAY OF PARAMETER 2

NORMAL DISPLAY OF PARAMETER 3

NORMAL DISPLAY OF PARAMETER 5

NORMAL DISPLAY OF PARAMETER 6

NORMAL DISPLAY OF PARAMETER 6

EXAMPLE OF ERROR DISPLAY

UNIVERSAL FUEL QUANTITY INDICATOR APPARATUS

TECHNICAL FIELD

The present invention relates to fuel quantity indicator apparatus, and particularly to universal fuel quantity indicator apparatus capable of being reconfigured so as to be usable with a plurality of different fuel tanks having different associated parameters, with the fuel quantity present in such a fuel tank being based on calculations of capacitance of a tank capacitor array and a compensation capacitor, wherein a plurality of different parameters specific to a given tank configuration determine the measurement factors for the calculated fuel quantity determination.

BACKGROUND ART

Fuel quantity indicators, such as for use on aircraft, which determine the fuel quantity present in a fuel tank based on calculations of capacitance of a tank capacitor array and a compensation capacitor are well known in the art, such as disclosed in commonly owned U.S. Pat. Nos. 4,090,408 and 4,173,893, both of which name Geoffrey S. Hedrick, one of the inventors herein, as the sole inventor thereof. Each of the fuel quantity indicators disclosed in these patents are digital fuel quantity indicators and employ zero set adjustment. However, neither of these prior art systems is able to act as a universal fuel quantity indicator which can be reconfigured for a plurality of different fuel tank configurations such as by reprogramming the fuel quantity indicator constants to conform to varing fuel tank parameters associated with different aircraft or different fuel tank configurations on a given aircraft. This has required that several different fuel gauges be inventoried for a given aircraft and for a given aircraft manufacturer. This is so despite the fact that digital fuel quantity indicators employing a programmable read only memory as an integral part of the fuel gauge are known in the prior art, such as disclosed in U.S. Pat. No. 4,083,248 in which the programmable read only memory is used to compensate for errors in the probe for a specific tank. However, this system does not reconfigure the fuel quantity indicator and is tank dependent as opposed to being tank independent and, moreover, is not an alterable data source of different groups of parameters specific to a plurality of changing fuel tank configurations. This is also so despite the prior art use of a read only memory as a look up table in a digital fuel gauge for transforming the measured signal into an output signal proportional to the amount of fuel in the tank, such as disclosed in U.S. Pat. No. 4,487,066 which, once again, is not a universal fuel gage which may be reconfigured for different fuel tank configurations. Thus, none of the prior art known to applicants, provides a universal fuel gage which may be reconfigured to a plurality of different fuel tank configurations, such as by changing the stored parameters specfic to a given fuel tank configuration which determine the measuring factors for the calculated fuel quantity determination so as to set up the initial conditions for a given fuel tank for a universal fuel quantity indicator, nor such an arrangement in which a removably connectable interface is employed for a universal fuel gauge which, in conjunction with the fuel quantity indicator, can provide an auxiliary data source which is reprogrammable by the user to the particular specific fuel tank configuration with which the universal fuel quantity indicator is being used at that time. These disadvantages of the prior art are overcome by the present invention.

DISCLOSURE OF THE INVENTION

A universal fuel quantity indicator interface apparatus for providing a variable set of initial conditions for a universal fuel quantity indicator apparatus for variably configuring the universal fuel quantity indicator apparatus for a particular specific fuel tank for determining the fuel quantity present in the specific fuel tank based on calculations of capacitance of a tank capacitor array and a compensation capacitor wherein a plurality of different parameters specific to a given tank configuration determine the measurement factors for the calculated fuel quantity determination is provided as well as an improved fuel quantity indicator apparatus employing such an arrangement. The indicator comprises a display arrangement, such as a conventional digital display, for displaying fuel quantity information with respect to the fuel tank based on the calculated fuel quantity determination. A microprocessor control arrangement, including a central processing unit and static memory, is provided for calculating the fuel quantity determination and for controlling the display based on this calculation. The microprocessor static memory stores the control program information for controlling the operation of the microprocessor and for storing information corresponding to the different parameters specific to a given tank configuration for enabling the microprocessor to provide the calculated fuel quantity determination on the display for a given specific fuel tank. The interface apparatus includes an alterable static memory, such as a non-volatile RAM or NOVRAM or an electrically erasable programable memory or EEPROM, which is operatively connectable to the microprocessor control arrangement for providing an alterable auxiliary data source, to the microprocessor control arrangement, of different groups of the different parameters for a plurality of different specific fuel tanks. The interface also includes an up/down steering control circuit operatively connectable to the microprocessor central processing unit and the various static memories for selecting a particular group of the different parameters dependent on the parameters associated with a particular specific fuel tank. The up/down steering control circuit comprises a pair of switches for variably selecting the value of each of the parameters in the particular group and for storing each of the selected parameters in the group in the alterable static memory, with the selected parameter content of the alterable static memory being loaded into the microprocessor static memory for configuring the fuel quantity indicator for a particular specific fuel tank under control of the steering control circuit. Thus, the fuel quantity indicator apparatus is reconfigurable for a different specific fuel tank by varying the selected fuel tank parameters by the up/down steering control circuit. In this regard, the steering control circuit includes mode selection having, having as via a jumper, a first mode in which the parameters are selected and a second mode in which the reconfigured fuel quantity indicator operates without the need of the alterable static memory whose contents have been loaded into the static memory of the fuel quantity indicator. The display of the fuel quantity indicator is used in both modes with the display in the first or calibrate mode being employed to varify the selection of the parameters before they are stored, and with the display being used in a conventional manner in the second or run mode to display the measured fuel quantity information with respect to the particular fuel tank for which the indicator has been configured in the calibrate mode. In utilizing the steering control circuit in the calibrate mode, one of the switches preferably increments the selected parameter value and the other of the switches decrements the selected parameter value, and both switches are operated together in order to store the selected parameter value and advance through a predetermined selection sequence to the next parameter to be configured. In employing the universal fuel quantity indicator apparatus to the present invention in connection with an aircraft fuel tank, the selected parameters may comprise constants for the specfic fuel tank associated with the calculated fuel quantity determination, with with these constants comprising fuel scale display factors for the display device.

BEST MODE FOR CARRYING OUT THE INVENTION

Figure 18:
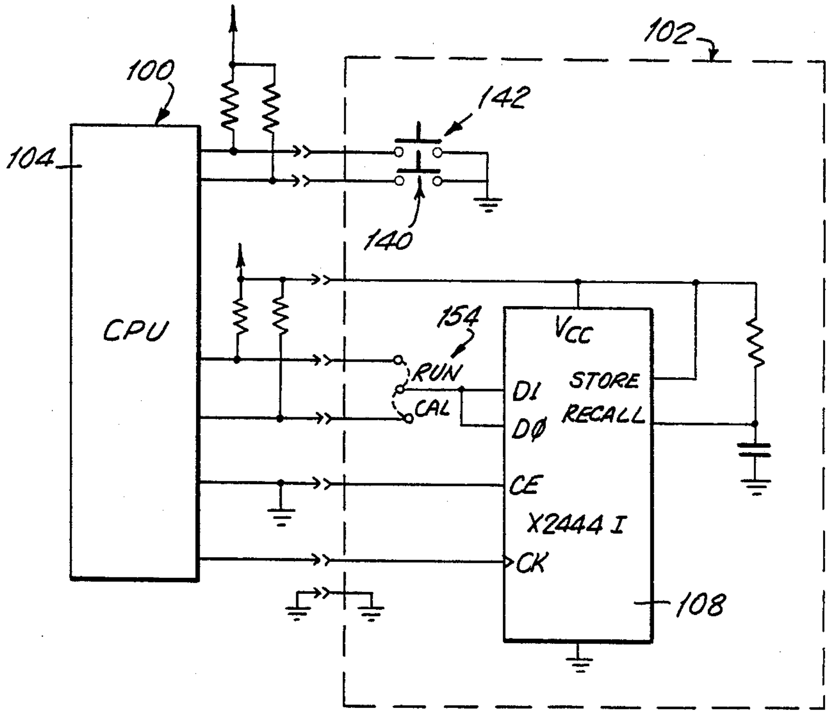
FIG. 18 is a schematic diagram, partially in block, illustrating the interface between the fuel quantity indicator of FIG. 1 and the interface or digital calibration trim unit of FIG. 5.

Referring now to the drawings in detail, and initially to FIGS. 1 through 4 and 22, the presently preferred universal fuel quantity indicator apparatus of the present invention, generally referred to by the reference numeral 100, is shown. As will be explained in greater detail hereinafter, and as illustrated in FIG. 18, the fuel quantity indicator apparatus 100 of the present invention preferably interfaces with an interface apparatus termed a digital calibration trim unit or DCTU, generally referred to by the reference numeral 102, illustrated in greater detail in FIGS. 5 and 6. As will be explained in greater detail hereinafter, the digital calibration trim unit 102 is preferably employed with the universal fuel quantity indicator apparatus 100 in order to configure and/or reconfigure the universal fuel quantity indicator apparatus 100 for a specific fuel tank configuration, such as for an aircraft, with the fuel quantity indicator apparatus 100 being reconfigurable for a different specific fuel tank by varying selected fuel tank parameters through the use of the digital calibration trim unit 102, as will be explained in greater detail hereinafter.

Preferably, the universal fuel quantity indicator apparatus 100 of the present invention will indicate fuel quantity in both analog and and digital format for a plurality of different fuel tank configurations in conjunction with the presently preferred digital calibration trim unit or interface 102 of the present invention. Preferably, the fuel quantity indicator apparatus 100 determines fuel quantity by first measuring the capacitive values of the conventional tank probe and then performs mathematical computations using the measured capacitances as input data under control of a microprocessor control unit 104, such as one comprising a central processing unit or CPU and associated internal and external static memory 150 and 106, respectively, such as a conventional NOVRAM for the external memory 106 with the microprocessor control unit 104 being illustrated in great detail in the schematic diagram of FIG. 3. The universal fuel quantity indicator apparatus 100 of the presently invention preferably interfaces with the personally preferred digital calibration trim unit 102 which initially stores the capacitance and maximum fuel weight data which are specific to the particular tank and probe assembly to which the fuel quantity indicator apparatus 100 is attached at that time in an alterable static memory 108 (FIG. 5), such as a non-volatile static memory such as a NOVRAM, such as a conventional Xicor X2444, or a conventional EEPROM such as one commercially available from National Semiconductor under the designation NMC 9306. The alterable static memory 108 employed in the DCTU 102 preferably retains any value stored therein on power down, which is important consideration in an aircraft environment. As will be described in greater detail hereinafter, the data or parameters stored in the alterable static memory 108 of the digital calibration trim unit 102 preferably companies the constant values necessary for the microprocessor control unit 104 of the universal fuel quantity indicator apparatus 100 to make the fuel weight calculations referred to above. In this regard, the fuel quantity indicator 100 preferably determines the fuel quantity present in the particular fuel tank for which it has been configured at that time by measuring the capacitances of the tank capacitor array, represented by reference numberal 110 in FIG. 22, and the compensator capacitor represented by reference numeral 112 in FIG. 22, and then conventionally digitally calculates the fuel quantity from these values.

Figure 22:
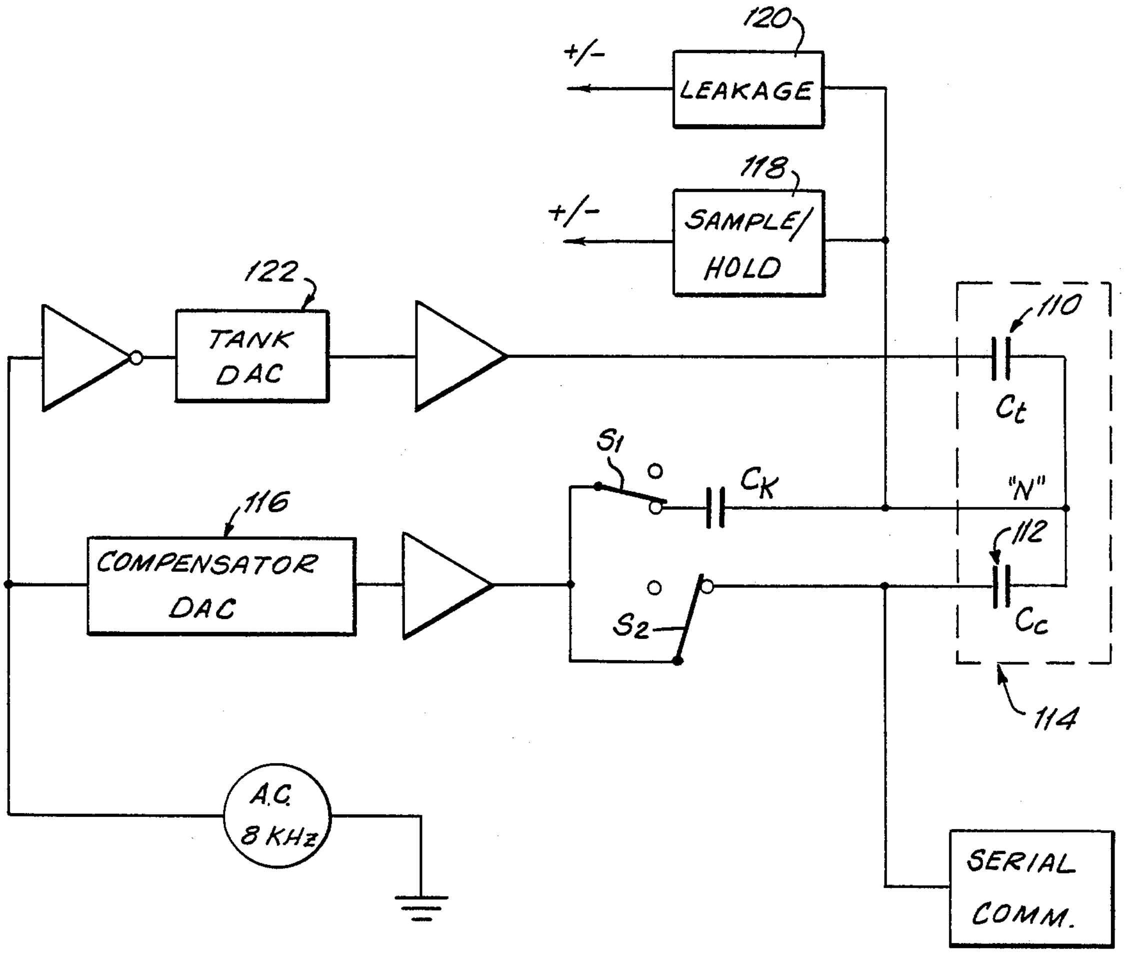
FIG. 22 is a block diagram illustrating a general representation of the ideal electrical circuit for the fuel quantity indicator of FIG. 1.

Referring to FIG. 22, a general representation of the ideal electrical circuit of the fuel quantity indicator apparatus 100 of the present invention is shown. The capacitor $C_t$, which represents the tank capacitor array 110, and the capacitor $C_c$, which represents the compensation capacitor 112 for a given tank probe 114 determine the fuel quantity based on the following theory of operation.

THEORY OF OPERATION

Figure 1:
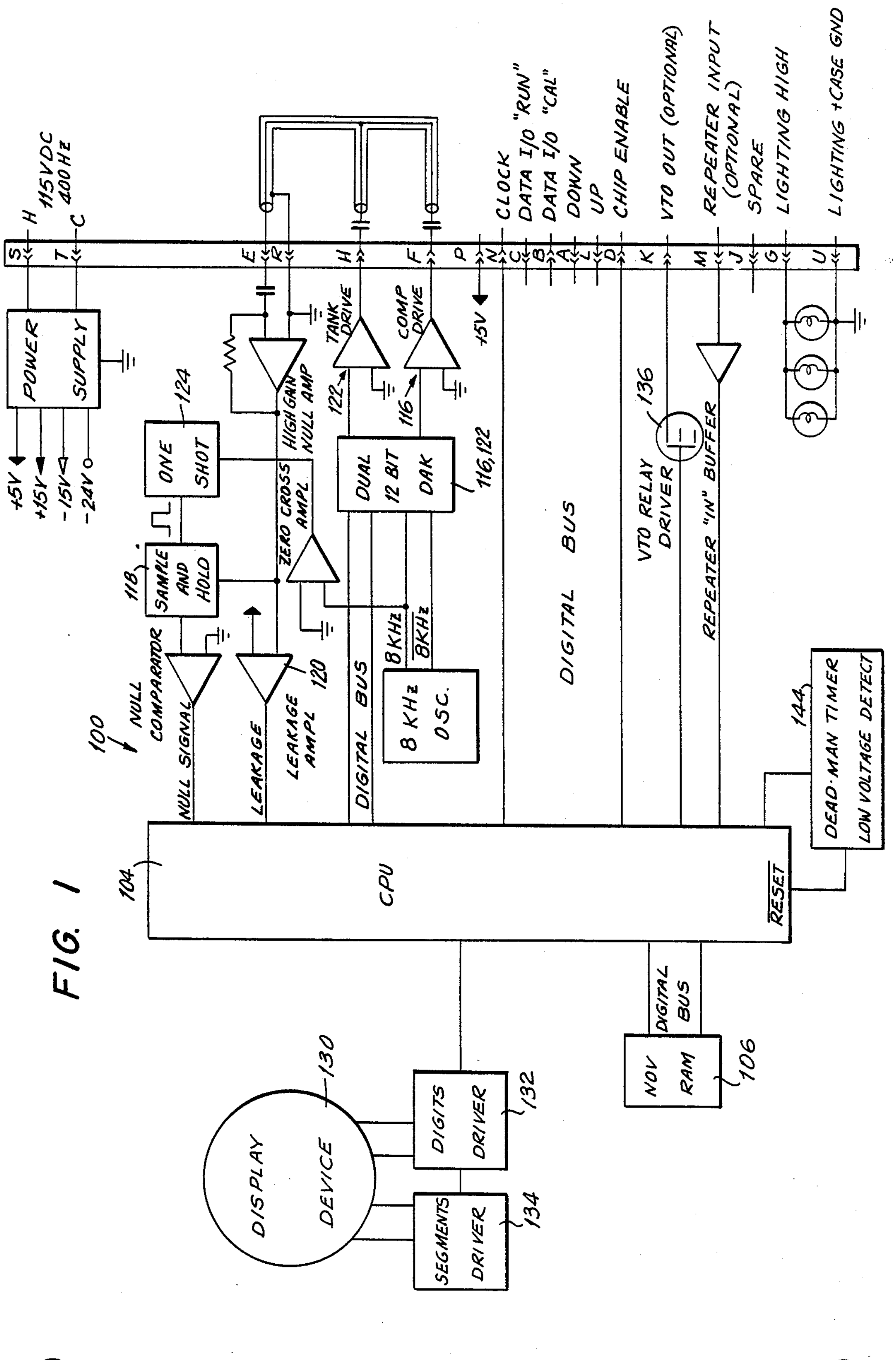
FIG. 1 is a functional block diagram of the presently preferred universal fuel quantity indicator apparatus of the present invention, with the interface device, or digital calibration trim unit, which is illustrated in FIG. 5 not shown.
Figure 2:
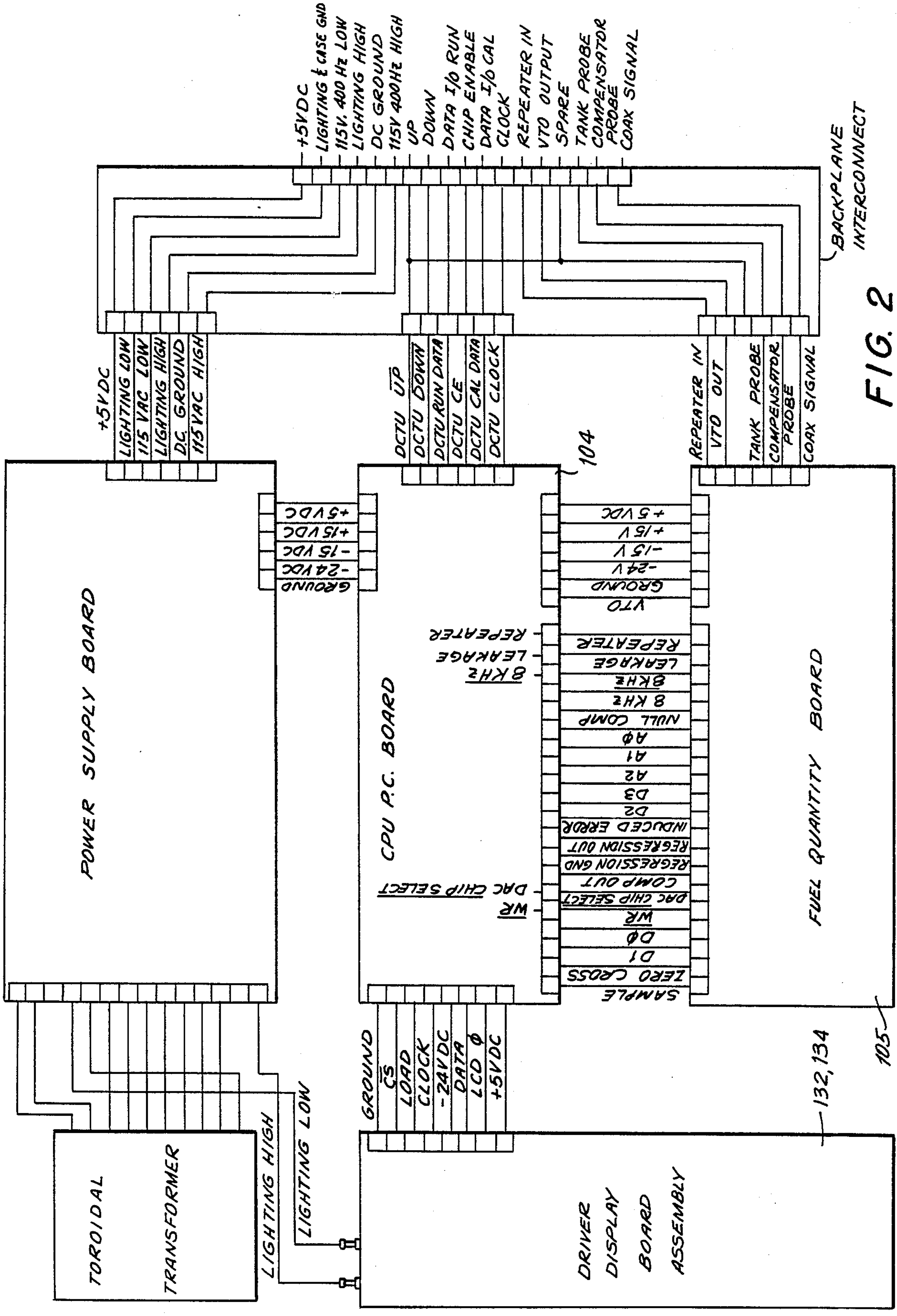
FIG. 2 is an illustrative wiring diagram for the fuel quantity indicator of FIG. 1.

In explaining the theory of operation of the fuel quantity indicator apparatus 100 of the present invention, the following terms are employed with reference to FIGS. 1 and 22:

v=voltage, c=capacitance, D=DAC counts

O=an offset value of DAC counts, (i.e. expected minus actual)

$\hat{c}_t$=tank capacitor full tank capacitance $\check{c}_t$=tank capacitor empty tank capacitance $\hat{c}_c$=compensator capacitor wet capacitance $\check{c}_c$=compensator capacitor dry capacitance $D_t$=tank capacitor DAC counts $D_c$=conpensator capacitor DAC counts $D_{tfc}$=expected tank capacitor DAC counts at full tank $D_{tec}$=expected tank capacitor DAC counts at empty tank $O_f$=interpolated factory calibration full tank offset $O_e$=interpolated factory calibration empty tank offset $O_{vcx}$=virtual compensator mode calibration offset (x=l, m or h)

$O_{vci}$=virtual compensator mode offset (interpolated for tank drive)

DAC=digital-to-anolog conventer

The process of nulling the fuel quantity indicator 100 of the present invention is the process whereby the value of a compensator DAC 116 is adjusted so that a small increment of the value of the compensator DAC 116 will cause the value of the input from a sample/hold circuit 118 to toggle between binary zero and one. Leakage, which is a leakage current passed to the CPU 104 though a leakage amplifier 120, is preferably defined as the binary input of the circuit which measures the electrical resistance of the fuel. The presence of a binary one at the input from this circuit indicates the presence of contamination in the fuel, with fuel contamination being measured as a function of electrical resistance, and also indicates that the fuel measurement is to be considered in error. It should be noted that as used throughout the balance of this this discussion "tank capacitor" is meant to refer to the entire tank capacitor array 110.

Thus, given the equation for capacitive reactance, $$v = i\,Xc = \frac{i}{wC} \quad (1)$$

where i=current; w=2 pi f; v=voltage; C=capacitance; Xc=1/WC=capacitive reactance; and f=frequency.

It follows that,

If $v_t$=tank drive voltage, $c_t$=tank capacitance, and $i_t$=current in $c_t$ and $v_c$=compensator drive voltage, $c_c$=compensator capacitance, and $i_c$=current in $c_c$, $$v_t = \frac{i_t}{wc_t} \quad (2)$$

and $$v_c = \frac{i_c}{w\,c_c} \quad (3)$$

If it is given that the drive voltages may be adjusted such that the voltage at point "N" in FIG. 22 is zero, then $i_t=i_c$ when this is true.

If it is given that $v_t$ and $v_c$ are equal in magnitude and frequency, but 180 degrees out of phase, then at this null point, $$v_t c_t = v_c\,c_c \quad (4)$$

and $$c_t = \frac{v_c\,\hat{c}_c}{\hat{v}_t} \quad (5)$$

Preferably, the value of $\hat{c}_c$ is a constant for constant values of the dielectric constant of the fuel in the tank being measured. Since the dielectric constant of Jet A fuel varies with density, and the density of the fuel in the tank is not constant from loading to loading, an accommodation must preferably be made for a variance in the value of $\hat{c}_c$. Preferably, by way of example, the selection of a value of $c_k$ equal to $\check{c}_c \pm 2.135479$ will produce accurate results, for the entire range of Jet A densities, for the equation, $$vt \pm \hat{c}_t = vc \pm (\hat{c}_c + c_k) \quad (6)$$

Where, $\hat{c}_t$=tank full capacitance, $\check{c}_t$=tank capacitance, $\hat{c}_c$=compensater wet capacitance, $\check{c}_c$=compensator dry capacitance.

Since DAC counts are preferably considered proportional to voltage, the above equation (6) may be expressed as follows:

$$D_t \pm \hat{c}_t = D_c \pm (\hat{c}_c + c_k) \quad (7)$$

Where Dt+number of tank DAC counts, and Dc=number of compensator DAC counts. At null, the compensator DAC 116 shouild preferably, by way of example, be set to approximately 3600 counts. This would allow for sufficient "headspace" in the calculation. The number of tank drive counts that will produce a null (with a full tank) at 3600 counts of compensator drive is given by the equation, $$\frac{3600 \pm (\hat{c}_c + c_k)}{\hat{c}_t} = D_t = \text{Tank Drive } DAC \text{ Counts} \quad (8)$$

Since the result of equation (8) is not a whole number and the DAC inputs must preferably be integers, DT must be rounded. After this rounding, the effect of the rounding may be quantified by, $$\frac{D_t \pm \hat{c}_t}{\hat{c}_c c_k} = D_{tfc} = \quad (9)$$

Corrected Full Tank Capacitor Counts. (Expected)

The number of DAC counts (theoretical) when the tank is empty and at null can be now given by, $$\frac{D_t \pm \hat{c}_t}{\hat{c}_c + c_k} = D_{tec} = \quad (10)$$

Corrected Empty Tank Capacitor Counts. (Expected)

If desired, in order to compensate for internal gain and bias errors, offset values can be calculated for known capacitances, stored in the indicator 100 in non-volatile memory 106 and used to calculate the constants of the fuel weight equation. In addition the indicator 100 is preferably conventionally initialized and errors which would be introduced to the aircraft environment are compensated for. Thereafter, the following expression is employed in the indicator apparatus microprocessor control unit 104 to calculate the fuel weight:

$$\text{Fuel Weight} = ((D_c - O_{tot}) - D_{cet})/\text{DAC Range} \pm \text{Max Fuel Wt.} \quad (11)$$

In the normal operating mode,
$O_{tot}$=zero, DAC Range$=(D_{cft}-(O_f+O_r))-(D_{cet}-(O_e+O_z))$ In VCOMP operating mode,
$O_{tot}=O_{vci}$, DAC Range$=(D_{cft}-(O_f-O_r))-(D_{cet}-(O_e+O_z))$ By way of example, the microcomputer or microprocessor control unit 104 employed in the fuel quantity indicator apparatus 100 of the present invention is a conventional CMOS microcomputer, such as a Hitachi HD63P01M1, also conventionally referred as the Hitachi 6301, preferably operating at a clock rate of one megahertz in the example herein. By way of example when a Hitachi 6301 microcomputer 104 is employed the following port assignments may be used:

TABLE OF HD6301 PORT ASSIGNMENTS

| PORT | PIN # | FUNCTION | INPUT/ OUT- PUT | DE- FAULT ON RESET |
|---|---|---|---|---|
| P10 | 13 | DCTURAM chip select | O | 0 |
| P11 | 14 | Tank DAC chip sel not | O | 1 |
| P12 | 15 | Excessive leakage | I | x |
| P13 | 16 | DCTU clock | O | 0 |
| P14 | 17 | display driver CS not | O | 1 |
| P15 | 18 | Disable sample not | O | 0 |
| P16 | 19 | DCTU data for "CAL mode | O | 0 |
| P17 | 20 | Display backplane | O | 0 |
| P20 | 8 | Mode select | I | x |
| P21 | 9 | Mode select/periph clk | I/O | x |
| P22 | 10 | mode select/VTO | I/O | x |
| P23 | 11 | DCTU chip select | O | 0 |
| P24 | 12 | DCTU data for "RUN mode | O | 0 |
| P30 | 37 | D0 data/serial input | I/O | 0 |
| P31 | 36 | D1 data/serial output | I/O | 0 |
| P32 | 35 | D2 data | I/O | 0 |
| P33 | 34 | D3 data | I/O | 0 |
| P34 | 33 | A0 address bit 0 | O | 0 |
| P35 | 32 | A1 address bit 1 | O | 0 |
| P36 | 31 | A2 address bit 2 | O | 0 |
| P37 | 30 | Repeater input | I | x |
| P40 | 29 | Output Low | O | 1 |
| P41 | 28 | Regression cap in | O | 1 |
| P42 | 27 | Regression cap ground | O | 1 |
| P43 | 26 | Compensater drive disable | O | 1 |
| P44 | 25 | DCTU "UP" not button | I | x |
| P45 | 24 | DCTU "DOWN" not button | I | x |
| P46 | 23 | Deadman output | O | 0 |
| P47 | 22 | Signal comparator input | I | x |

The functions of the microcomputer 104 I/O signals and the digital calibration trim unit or DCTU 102 listed in the above table are defined in greater detail as follows:

"DCTURAM chip select" is active high and enables the DCTURAM to accept serial data on the next active clock edge. "Tank DAC chip select not" is active low and selects the signal DAC as the active device with address and data information to be clocked into the device on the next rising clock edge. "Excessive leakage" is an input polled by the CPU 104 and indicates if there is an excessive resistive component between the plates of the sensing capacitors. The resistive element causes high signal levels 90 degrees out-of-phase from the true capacitive signal and is isolated and detected on this input. "DCTU clock" is the clock input to the DCTU 102 with data being synced to the rising edge of this clock at the DCTU. "Display drivers chip select not" is active low and enables the LCD driver pair to accept serial data on the next active clock edge. "Disable zero-cross one-shot timer" is active low and inhibits a conventional one-shot timer 124 from triggering a sample cycle by holding the clear pin low. This is preferably required when sending serial data on the compensator line and when executing a signal check space since both conditions could throw the signal null to a state that would require a software settling routine or wait loop. Thus, to avoid this condition the sampling is preferably inhibited by a low state on this pin. "DCTU data for CAL mode" is the calibration mode data input to the DCTU 102. Restraints on the content of the command strings would preferably require that a write or store command sent to the DCTU 102 must be transmitted on a pin that can be physically removed from the circuit during normal operation, which is accomplished in the presently preferred embodiment of the invention. "Display backplane frequency 60 Hz (±25%) is an input which is toggled at, preferably, approximately 60 Hz to supply the needed AC frequency to a liquid crystal display 130 via an LCD driver pair 132, 134 comprising digits driver 132 and segments driver 134. Preferably this is a priority routine, as failure to execute a 50/50 duty cycle frequency could result in permanent plating damage to the LCD display 130. "Mode Select" is for entry into the single chip mode of the microcomputer 104" with program pins P20, P21 and P22 in the logical one state immediately after the reset pin goes to a high state. Port P20 is preferably used exclusively for this purpose and has a pull-up resistor to ensure the proper logic level. "Mode Select/Peripheral clock" at P21 has two purposes. First, immediately following a reset it is read as a program pin, a pull-up resistor being used to ensure that a proper logical '1' is present. Its second purpose is that of providing a constant frequency clock output for the peripheral devices. Using the CPU 104 internal timer, a constant frequency pulse train will preferably be generated at all times, independent of all CPU states except reset. "Mode select /VTO driver" is a dual purpose pin. On reset, P20, P21 and P22 determine the mode of operation. The passive pull-up on this line ensures this function. The second function is the repeater mode VTO relay function. A logic 'high' output will turn an FET 136 'on'. "DCTU chip select" is the active high chip select for the DCTURAM component of the DCTU 102. The clock input to the DCTU should preferably be low at the time of application of this signal. Data will preferably be clocked into the device on the rising clock edge after the chip select is applied. "DCTU data for "RUN" mode" is the run mode data input to the DCTU 102. Once again restraints on the content of the command strings preferably require that a write or store command sent to the DCTU 102 be transmitted on a pin that can be physically removed from the circuit during normal operation. The data transmitted to the DCTU 102 during the "RUN" or normal operation mode is preferably screened and transmitted in a very strict, straightforward manner that can be easily audited. "D0 data bit zero" for the tank and compensator drive DAC, 116, 122 is the parallel bus data bit zero. For the serial bus devices, this is the data input to the CPU 104 data output of the peripheral devices. When used as a parallel bus bit, it can be either an input or an output. "D1 Data bit 1/serial data output" for parallel data bus applications, acts, as the D1 data bit. The bit also functions as the serial bus output pin. "D2 Data bit 2" is used as a parallel bus data bit only for interfacing to the signal DAC. "D3 Data bit 3" is used as a parallel bus data bit only for interfacing to the signal DAC. "A2 Address bit 2" is used as a parallel bus address bit for addressing internal registers of the signal DAC. "Repeater input" is the input for the data when the gauge 100 is acting as a repeater. "Regression capacitor in" is active low, and switches the regression capacitor into the null point. "Regression capacitor to ground" is active low, and switches the regression capacitor to ground to reduce its stray capacitance effects. P41 is preferably in its inactive state when th P42 function is active. "Compensator drive disable" is active low, and switches the compensator 112 out of the circuit when it detects that a shorted condition exists. "DCTU UP not input" is the "UP" button 140 (FIG. 5) interface from the DCTU 102. The operation of this button 140 as well as the general DCTU 102 operation will be described in greater detail hereinafter. "DCTU DOWN not input" is the "DOWN" button 142 interface from the DCTU 102. Again, the operation of this button 142 will also be described in greater detail hereinafter with respect to the DCTU 102 operation. "Deadman output" is from a deadman timer circuit 144 and is preferably, by way of example, toggled at 120 Hz±10%, or the deadman circuit 144 generates a system reset. "Signal comparator input" is tied to the comparator which indicates the null point condition. A one on this line indicates that the compensator is higher than the null point, and the compensator DAC 116 counts should be decreased to approach a null point. A zero on this line indicates that the compensator is lower than the null point and that the compensator DAC 116 counts should be increased to approach the null point.

Figure 3:
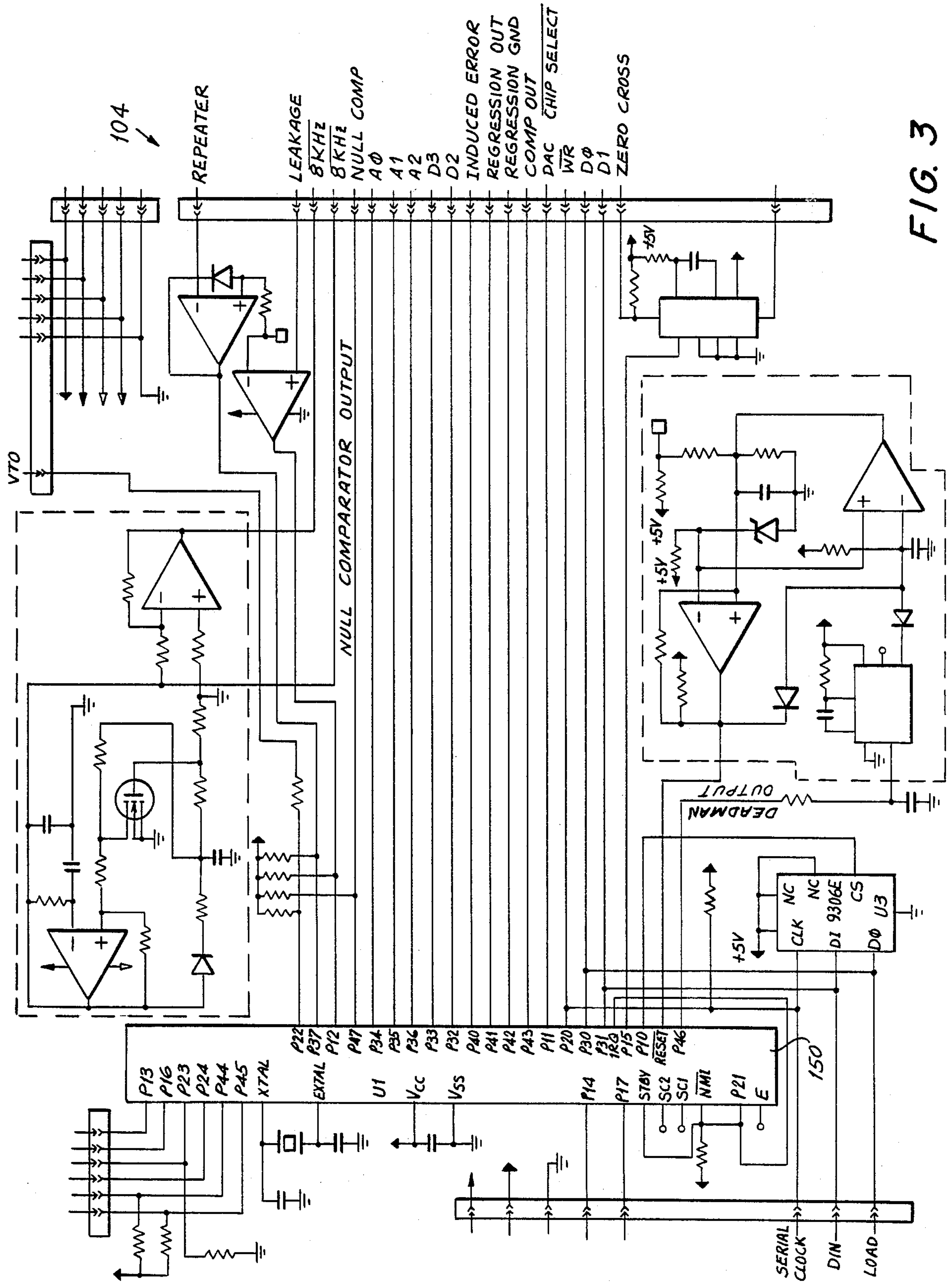
FIG. 3 is a schematic diagram of the CPU printed circuit board portion of the wiring diagram of FIG. 2.
Figure 4:
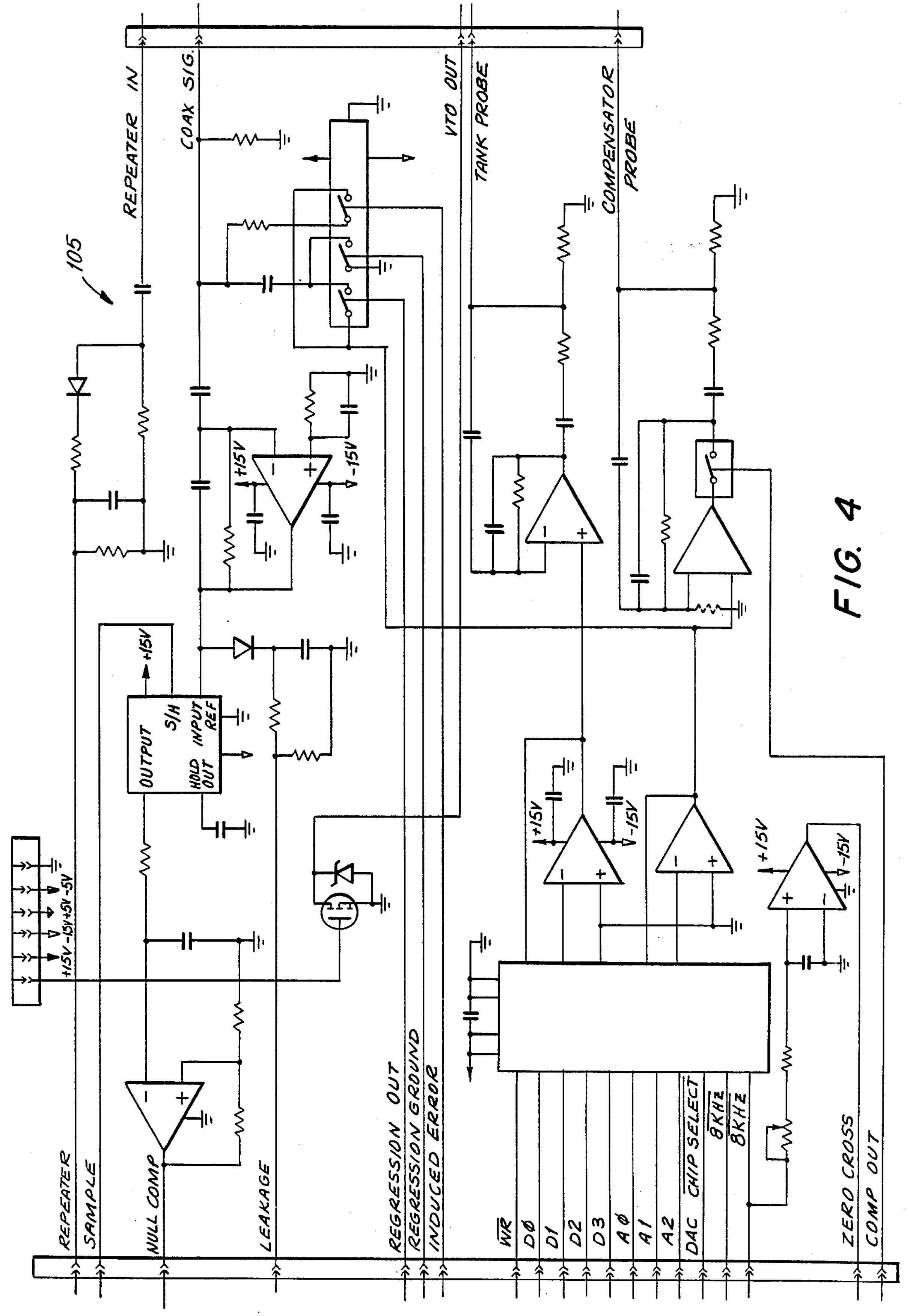
FIG. 4 is a schematic diagram of the fuel quantity printed circuit board portion of the wiring diagram of FIG. 2.

As shown and preferred in FIG. 3, the microcomputer or microprocessor control unit 104 preferably includes the aforementioned internal memory 150 for carrying the operating or control software. Given the example of a Hitachi 6301 microcomputer 104, such a microcomputer 104 accomodates piggyback PROM assemblies, such as a 2764 series 8K-by-8 EPROM, with this EPROM static memory 150 (FIG. 3) preferably appearing to be part of the memory map of the microcomputer 104. In this regard, the operating control program which interfaces the fuel quantity indicator 100 with the digital calibration trim unit or DCTU 102 of the present invention and which is resident preferably in static memory 150 of the microprocessor control unit 104 is given by way of example below for the embodiment illustrated herein:

OPERATING CONTROL PROGRAM

```
                 I
                 I     ; xxxxxxxxxxxxxxxxxxxxxxxxxxxxxxxxxxxxxxxxxxxxxxxxxxxxxx
                 I     ;   INITILIZATION MODULE
                 I     ;
                 I     ;
                 I     ; xxxxxxxxxxxxxxxxxxxxxxxxxxxxxxxxxxxxxxxxxxxxxxxxxxxxxx
                 I
                 I
0000E002 0F      I     RESET   SEI
0000E003 8640    I             LDA A #01000000B   ; MAKE DEADMAN AN OUTPUT
0000E005 9705    I             STA A @DDR4        ; STORE IN DDR
0000E007 9707    I             STA A @PORT4       ; SET DEADMAN OUTPUT HIGH
0000E009 7F0007  I             CLR   PORT4       ; SET DEADMAN OUTPUT LOW
0000E00C 9707    I             STA A @PORT4       ; SET DEADMAN OUTOUT HIGH
                 I             ;
0000E00E 8608    I             LDA A #00001000B      ; ENABLE TIMER OVERFLOW & OUTPUT COMPARE
0000E010 9708    I             STA A @TIMCTRL
0000E012 CC07D0  I             LDD   #2000
0000E015 DD08    I             STD   @OUTCMP
                 I
0000E017 CE0100  I             LDX  #100H
0000E01A 35      I             TXS
                 I             ;
0000E01B CC0000  I             LDD  #0
0000E01E CE00FF  I             LDX  #0FFH
0000E021 ED00    I     ZERAM   STD  0,X
0000E023 09      I             DEX
```

```
0000E024 09       I          DEX
0000E025 8C007F   I          CPX  #07FH
0000E028 24F7     I          BCC  ZERAM
                  I
0000E02A 86F9     I          LDA A #11111001B  ; ALL LINES OUTPUT EXCEPT P12
0000E02C 9701     I          STA A @DDR2
0000E02E 86BB     I          LDA A #10111011B  ; ALL LINES OUTPUT EXCEPT P12
0000E030 9700     I          STA A @DDR1
0000E032 86FF     I          LDA A #11111111B  ; OUTPUT LINE A0-A2 FOR DAC
0000E034 9704     I          STA A @DDR3
0000E036 864F     I          LDA A #01001111B  ;
0000E038 9705     I          STA A @DDR4
0000E03A 86F7     I          LDA A #11110111B  ; SET DISABLE SAMPLE NOT
0000E03C 9702     I          STA A @PORT1
0000E03E 860F     I          LDA A #00001111B  ; DCTU UNSELECT
0000E040 9703     I          STA A @PORT2
0000E042 8605     I          LDA A #00000101B  ; INITILIZE PORT 4
0000E044 9707     I          STA A @PORT4
                  I          ;
0000E046 CC0BB8   I          LDD   #3000          ; CONSTANT FOR 60 SECOND DEADMAN TIMEOUT
0000E049 DD8E     I          STD   @DEDTIM        ; FOR STARTUP CONDITIONS
                  I          ;
0000E04B 8605     I          LDA A #5             ; INITIAL FREQUENCY ABSCCER VALUE
0000E04D 9795     I          STA A @FRQCNT        ; STORE IN FREQUENCY ABSCC
0000E04F 9797     I          STA A @NULCYC        ; STORE IN NULL CYCLE
0000E051 8603     I          LDA A #3             ; INITIAL NULL ABSCCER VALUE
0000E053 9796     I          STA A @NULCTR        ; STORE IN NULL ABSCC
                  I          ;
0000E055 0E       I          CLI                  ; ENABLE INTERUPTS
                  I
                  I
0000E056 BDF655   I          JSR   DISBLK         ; BLANK THE DISPLAY
0000E059 BDF197   I          JSR   ROMTST         ; TEST ROM FOR ERRORS
0000E05C BDF1AB   I          JSR   RAMTST         ; TEST RAM FOR ERRORS
0000E05F BDEFAA   I          JSR   ERROROUT       ; DISPLAY STORED ERROR CODES
                  I          ;
0000E062 BDE10C   I          JSR   ICALF          ; ATTEMPT TO ENTER FACTORY CAL
0000E065 BDE2FC   I          JSR   ICALM          ; ATTEMPT TO ENTER MECH CAL
0000E068 BDE7B5   I          JSR   IDCTU          ; READ DCTU AND COMPUTE CONSTANTS
                  I          ;
0000E06B 86F9     I          LDA A #11111001B  ; ALL LINES OUTPUT EXCEPT P12
0000E06D 9701     I          STA A @DDR2
0000E06F 86BB     I          LDA A #10111011B  ; ALL LINES OUTPUT EXCEPT P12
0000E071 9700     I          STA A @DDR1
0000E073 86FF     I          LDA A #11111111B  ; OUTPUT LINE A0-A2 FOR DAC
0000E075 9704     I          STA A @DDR3
0000E077 864F     I          LDA A #01001111B  ;
0000E079 9705     I          STA A @DDR4
0000E07B 86F7     I          LDA A #11110111B  ; SET DISABLE SAMPLE NOT
0000E07D 9702     I          STA A @PORT1
0000E07F 860F     I          LDA A #00001111B  ; DCTU UNSELECT
0000E081 9703     I          STA A @PORT2
0000E083 8605     I          LDA A #00000101B  ; INITILIZE PORT 4
0000E085 9707     I          STA A @PORT4
                  I          ;
0000E087 BDEC8E   I          JSR    APXNUL        ; FIND QUICK NULL
0000E08A 8603     I          LDA A  #3
0000E08C 9799     I          STA A  @AVGCTRL      ; SET 16 FACTOR RUNNING AVERAGE
0000E08E BDE0D9   I          JSR    NULLONS       ; BEGIN NULLING
                  I          ;
0000E091 7EECCF   I          JMP    SYSEXO        ; JUMP TO EXECUTIVE
                  I    ;
                  I    ; ****************************************************************
                  I    ;
                  I    ;   DELAY   WAIT X NUMBER OF 10 MS INTERVALS
                  I    ;
                  I    ; ****************************************************************
                  I
0000E094 DFD1     I    DELAY   STX  @DELTIM       ; ABSCC DOWN VARIABLE
0000E096 CE0BB8   I            LDX  #3000         ; SIX SECOND CONSTANT
```

```
0000E099 DF8E     I          STX  @DEDTIM
                  I          ;
                  I
0000E09B DED1     I   DELAY1 LDX  @DELTIM       ; READ VARIABLE FROM INTERUPT
0000E09D 26FC     I          BNE  DELAY1        ; WAIT FOR ZERO
0000E09F 39       I          RTS                ; RETURN
                  I          ;
                  I
                  I  ; xxxxxxxxxxxxxxxxxxxxxxxxxxxxxxxxxxxxxxxxxxxxxxxxxxxxxxxxxxxxxxxxxx
                  I  ;
                  I  ;  IERROR   LOG ERROR CODE IN X INTO CALRAM
                  I  ;           THEN DISPLAYS HARD ERROR SCREEN
                  I  ;
                  I  ; xxxxxxxxxxxxxxxxxxxxxxxxxxxxxxxxxxxxxxxxxxxxxxxxxxxxxxxxxxxxxxxxxx
                  I
                  I
0000E0A0 BDEEED   I  IERROR    JSR    ERRLOG         ; LOG HARDERROR
0000E0A3 8602     I            LDA A  #2
0000E0A5 9780     I            STA A  STATUS         ; SET STATUS REGISTAR FOR HARD ERROR
0000E0A7 BDF7C3   I            JSR    DISCTRL        ; CALL DISPLAY ROUTINE
0000E0AA CE0258   I  LOOP      LDX    #0600
0000E0AD DF8E     I            STX    @DEDTIM
0000E0AF 20F9     I            BRA    LOOP           ; LOOP AND DIE
                  I            ;
                  I  ; xxxxxxxxxxxxxxxxxxxxxxxxxxxxxxxxxxxxxxxxxxxxxxxxxxxxxxxxxxxxxxxxxx
                  I  ;
                  I  ;  NULLOFF  TURNS OFF NULLING AT THE END OF THE NEXT MESSAGE
                  I  ;           TEMPORARILY
                  I  ;
                  I  ; xxxxxxxxxxxxxxxxxxxxxxxxxxxxxxxxxxxxxxxxxxxxxxxxxxxxxxxxxxxxxxxxxx
                  I
0000E0B1 9698     I  NULLOFF   LDA A @NULLCTRL       ; READ THE NULLCTRL REGISTAR
0000E0B3 8504     I            BIT A #00000100B      ; TEST FOR IN TRANSMIT
0000E0B5 26FA     I            BNE   NULLOFF         ; WAIT FOR IN TRANSMIT
0000E0B7 0F       I            SEI                   ; DISABLE INTERUPTS
0000E0B8 9698     I            LDA A @NULLCTRL       ; READ NULLCTRL
0000E0BA 84FE     I            AND A #11111110B      ; AND OFF NULLING ACTIVE FLAG
0000E0BC 9798     I            STA A @NULLCTRL       ; RESTORE NULLCTRL
0000E0BE 0E       I            CLI
0000E0BF 39       I            RTS                   ; EXIT
                  I            ;
                  I  ; xxxxxxxxxxxxxxxxxxxxxxxxxxxxxxxxxxxxxxxxxxxxxxxxxxxxxxxxxxxxxxxxxx
                  I  ;
                  I  ;  NULLOFFS  TURNS OFF NULLING AT THE END OF THE NEXT MESSAGE
                  I  ;            UNTIL THE NEXT NULLONS
                  I  ;
                  I  ; xxxxxxxxxxxxxxxxxxxxxxxxxxxxxxxxxxxxxxxxxxxxxxxxxxxxxxxxxxxxxxxxxx
                  I
0000E0C0 BDE0B1   I  NULLOFFS  JSR  NULLOFF          ; SUSPEND NULLING
0000E0C3 0F       I            SEI
0000E0C4 9698     I            LDA A @NULLCTRL       ; READ NULL CONTROL
0000E0C6 847F     I            AND A #01111111B      ; TURN OFF NULL ON HOLD
0000E0C8 9798     I            STA A @NULLCTRL       ; STORE NULL CONTROL
0000E0CA 0E       I            CLI
0000E0CB 39       I            RTS                   ; EXIT
                  I
                  I
                  I  ; xxxxxxxxxxxxxxxxxxxxxxxxxxxxxxxxxxxxxxxxxxxxxxxxxxxxxxxxxxxxxxxxxx
                  I  ;
                  I  ; NULLON   TURNS NULLING BACK ON AFTER BEING SUSPENDED
                  I  ;
                  I  ; xxxxxxxxxxxxxxxxxxxxxxxxxxxxxxxxxxxxxxxxxxxxxxxxxxxxxxxxxxxxxxxxxx
                  I
0000E0CC 0F       I  NULLON  SEI
0000E0CD 9698     I          LDA A @NULLCTRL         ; READ STATUS OF NULLING BEFORE
0000E0CF 8580     I          BIT A #10000000B        ; TEST FOR NULLING ON BEFORE
0000E0D1 2704     I          BEQ    NULLONX
0000E0D3 8A01     I          ORA A #1
0000E0D5 9798     I          STA A @NULLCTRL
0000E0D7 0E       I  NULLONX CLI
```

```
0000E0D8 39      I          RTS
                 I          ;
                 I          ;
                 I    ; xxxxxxxxxxxxxxxxxxxxxxxxxxxxxxxxxxxxxxxxxxxxxxxxxxxxxxxxxxxxxxxxxxxxxxx
                 I    ;
                 I    ; NULLONS  TURNS NULLING BACK ON ABSOLUTELY IRREGARDLESS OF THE
                 I    ;          PREVIOUS STATE
                 I    ;
                 I    ; xxxxxxxxxxxxxxxxxxxxxxxxxxxxxxxxxxxxxxxxxxxxxxxxxxxxxxxxxxxxxxxxxxxxxxx
                 I
0000E0D9 0F      I    NULLONS  SEI
0000E0DA 9698    I             LDA A @NULLCTRL
0000E0DC 8A81    I             ORA A #10000001B
0000E0DE 9798    I             STA A @NULLCTRL
0000E0E0 0E      I             CLI
0000E0E1 39      I             RTS                    ; EXIT
                             INCLUDE 'icalf3.asm'
                 I             ;
                 I
                 I                                        ;
                 I                                        ; AS A 16 BIT VALUE
                 I                                        ;
                 I
                 I             ;
                 I    ;
                 I             ;
                 I                                        ;
0000E2E6 BDE0C0  I             JSR    NULLOFFS            ;
0000E2E9 39      I             RTS                        ;
                 I                                        ;
                 I                                        ;
                 I                                        ;
                 I    ; xxxxxxxxxxxxxxxxxxxxxxxxxxxxxxxxxxxxxxxxxxxxxxxxxxxxxxxxxxxxxxxxxxxx
                 I    ; xxx
                 I    ; xxx   CALDEV   CALCULATE DEVIATION WORD FOR STORAGE FROM
                 I    ; xxx            VALUE IN (D) AND SAVEIN YREG
                 I    ; xxx
                 I    ; xxx   ENTER    DATA WORD TO OPERATE ON IN DOUBLE A
                 I    ; xxx
                 I    ; xxx   USES     YREG
                 I    ; xxx
                 I    ; xxx   REGS     ACCD
                 I    ; xxx
                 I    ; xxx   CALLS    NOTHING
                 I    ; xxx
                 I    ; xxx   EXITS    YREG SET TO DEVIATION TO BE STORED
                 I    ; xxx
                 I    ; xxxxxxxxxxxxxxxxxxxxxxxxxxxxxxxxxxxxxxxxxxxxxxxxxxxxxxxxxxxxxxxxxxx
                 I                                        ;
                 I                                        ;
0000E2EA C30080  I    CALDEV         ADDD    #128         ; ADD 128 TO ADJUST RANGE
0000E2ED 8100    I                   CMP A   #0           ; HIGH BYTE = 0 ?
0000E2EF 260A    I                   BNE     CALDEVX      ; NO, WE HAVE A BAD DELTA
                 I                   ;
0000E2F1 C080    I    CALGD          SUB B   #128
0000E2F3 D789    I                   STA B   @YREG+1      ; LOW BYTE FOR CALRAM WORD
0000E2F5 C8FF    I                   EOR B   #255         ; EOR IT FOR CHECKSUM
0000E2F7 D788    I                   STA B   @YREG        ; HIGH BYTE FOR CALRAM WORD
0000E2F9 D188    I                   CMP B   @YREG        ; SET EQUAL FLAG
0000E2FB 39      I    CALDEVX        RTS
                            INCLUDE 'icalad.asm'
                 I            ;
                 I    ;
                 I    ;xxxxxxxxxxxxx THE SOURCE CODE FOR THE CALIBRATION ROUTINE  xxxxxxxxxxxxxxxxxx
                 I    ;xxxxxxxxxxxxx              that runs on                   xxxxxxxxxxxxxxxxxx
                 I    ;xxxxxxxxxxxxx       THE DIGITAL CALIBRATION TRIM UNIT     xxxxxxxxxxxxxxxxxx
                 I    ;xxxxxxxxxxxxx              which is part of               xxxxxxxxxxxxxxxxxx
                 I    ;xxxxxxxxxxxxx    THE MODEL 2300 FUEL QUANTITY INDICATOR   xxxxxxxxxxxxxxxxxx
                 I
                 I    ;THESE ARE THE VARIABLE NAME EQUATES. NCBUF IS ONLY USED BY THE MAIN LOOP WHEN
```

```
                   I    ;INTERRUPT-DRIVEN NULLING IS ENABLED. NCBUF THEREFORE REMAINS UNALTERED BY THE
                   I    ;MAIN LOOP PROGRAM DURING THE CALIBRATION ROUTINE.
                   I
                9D I    KYSTAT  EQU     NCBUF
                9F I    CLTMP1  EQU     NCBUF+2
                A1 I    CLTMP2  EQU     NCBUF+4
                A3 I    CLTMP3  EQU     NCBUF+6
                   I
                   I
                   I    ;DCTU * THIS IS THE MAIN ENTRY POINT FOR THE ICALM ROUTINE. ICALM PERFORMS ALL
                   I    ;        ALL OF THE STUFF NECESSARY TO ALLOW A LINE MECHANIC TO REPROGRAM THE
                   I    ;        DCTU WORK.
                   I    ;
                   I    ;        ON ENTRY, WE FIRST CHECK TO SEE IF THE CALIBRATION JUMPER IS CORRECTLY
                   I    ;        INSTALLED. WE DO THIS BY TOGGLING THE THE RUN PORT LINE, P2-4. IF THE
                   I    ;        CAL LINE, PORT P1-6, DOESN'T FOLLOW THE RUN LINE, THE JUMPER IS NOT IN
                   I    ;        THE CAL POSITION SO WE EXIT TO THE MAIN RUNNING LOOP. IF THE CAL LINE
                   I    ;        DOES FOLLOW THE RUN LINE, THE JUMPER IS IN THE CAL POSITION SO WE
                   I    ;        CONTINUE WITH ICALM.
                   I    ;
                   I    ;        AFTER DETERMINING THE WE CAN INDEED DO CAL COMM, WE ENTER A BUTTON
                   I    ;        SCANNING LOOP. IF BOTH BUTTONS ON THE DCTU ARE PUSHED SIMULTANEOUSLY,
                   I    ;        THE PARAMETER WHICH THE OPERATOR IS PROGRAMMING CHANGES. ONE BUTTON IS
                   I    ;        INCREMENT AND THE OTHER IS DECREMENT THE DISPLAY VALUE.
                   I    ;
                   I    ;        NOTE THAT THE PARAMETER CHANGE IS NEGATIVE EDGE TRIGGERED. THAT IS, THE
                   I    ;        ROUTINE IS ENTERED WHEN A SECOND BUTTON IS DEPRESSED WHILE THE FIRST IS
                   I    ;        ALREADY DEPRESSED, OR WHEN BOTH BUTTONS ARE DEPRESSED SIMULTANEOUSLY.
                   I    ;
                   I    ;        INCREMENT AND DECREMENT ARE POSITIVE EDGE TRIGGERED. THAT IS, WHEN A
                   I    ;        BUTTON IS RELEASED WHILE THE OTHER IS UNPRESSED, AN INCREMENT OR
                   I    ;        DECREMENT OCCURS. NOTE THAT IF EITHER BUTTON IS HELD DEPRESSED FOR TWO
                   I    ;        SECONDS, THE UNIT BEGINS HIGH SPEED, CONTINUOUS INCREMENTING OR
                   I    ;        DECREMENTING UNTIL THE BUTTON IS RELEASED.
                   I    ;
                   I    ;        DATA IS STORED IN THE NOVRAM IN THE FOLLOWING FORMAT:
                   I    ;
                   I    ;        WORD #  DESCRIPTION                     RANGE & RESOLUTION
                   I    ;
                   I    ;        00      16-BIT CHECKSUM WORD            N/A
                   I    ;        01      LB/KG INDICATOR                 0 = LB ; 1 = KG
                   I    ;        02      MAXIMUM FUEL QUANTITY           10 - 9990 BY 10'S
                   I    ;        03      TANK EMPTY CAPACITANCE          1 - 65000 BY 1'S
                   I    ;        04      TANK FULL CAPACITANCE           1 - 65000 BY 1'S
                   I    ;        05      COMPENSATOR DRY CAPACITANCE     1 - 65000 BY 1'S
                   I    ;        06      COMPENSATOR WET CAPACITANCE     1 - 65000 BY 1'S
                   I    ;        07      # OF WRITES TO DCTU NOVRAM      1 - 1000 BY 1'S
                   I    ;
                   I    ;        NOTE THAT THE FUEL QUANTITY IS STORED IN MULTIPLES OF TEN LBS OR KGS.
                   I    ;        THIS IS BECAUSE THE MASTER FUEL GAGE HAS A DUMMY ZERO AS ITS LEAST
                   I    ;        SIGFNIFICANT DIGIT. CALCULATIONS INVOLVING THE MAX FUEL QUANTITY MUST
                   I    ;        ACCOUNT FOR THIS BY FIRST MULTIPLYING THE VALUE STORED IN THE DCTU
                   I    ;        NOVRAM BY TEN. NOTE ALSO THAT THE INCREMENT INTERVAL IS TEN WHICH IS
                   I    ;        EQUAL TO AN EFFECTIVE INCREMENT OF ONE HUNDRED LBS OR KGS.
                   I    ;
                   I    ;        THE CAPACITANCE IS STORED IN ONE-TENTH PICOFARAD INCREMENTS.
                   I    ;
                   I
                   I
0000E2FC 7F00B1    I   ICALM   CLR     ANALOG          ;INITIALIZE THE PRAMETER COUNTER
0000E2FF 8603      I           LDA A   #00000011B      ;SET THE KEYSTATE STATUS REGISTERS
0000E301 979D      I           STA A   @KYSTAT         ;TO A NEUTRAL STATE
0000E303 979E      I           STA A   @KYSTAT+1
                   I
0000E305 CC0BB8    I   REFRSH  LDD     #3000           ;REFRESH THE DEAD-MAN TIMER
0000E308 DD8E      I           STD     DEDTIM
                   I           ;
                   I
0000E30A BDE6DF    I   RUNTST  JSR     NDESNOV         ; DESELECT DCTU RAM CHIP
0000E30D 8605      I           LDA A   #5              ; TEST THE JUMPER 5 TIMES
```

```
0000E30F 9784     I              STA A   @COUNT          ; STORE IN COUNT
                  I              ;
0000E311 86BF     I    RUNTST1   LDA A   #10111111B      ; MAKE CAL LINE INPUT
0000E313 9700     I              STA A   @DDR1           ; SET DDR
0000E315 861D     I              LDA A   #00011101B      ; MAKE RUN LINE OUTPUT
0000E317 9701     I              STA A   @DDR2           ; SET DDR
0000E319 4F       I              CLR A                   ; CLEAR ACCUM
0000E31A 9703     I              STA A   @PORT2          ; TAKE RUN LINE LOW
0000E31C D602     I              LDA B   @PORT1          ; READ CAL LINE
                  I
0000E31E C540     I              BIT B   #01000000B      ; TEST FOR LOW
0000E320 2647     I              BNE     ICALMEXIT       ; NOT THE SAME --> NOT IN CAL MODE
                  I              ;
0000E322 8610     I              LDA A   #00010000B      ; BIT 4 ACTIVE
0000E324 9703     I              STA A   @PORT2          ; TAKE LINE HIGH
                  I
0000E326 D602     I              LDA B   @PORT1          ; READ CAL LINE
0000E328 C540     I              BIT B   #01000000B      ; TEST FOR HIGH
0000E32A 2730     I              BEQ     ICALMEXIT       ; NOT THE SAME --> NOT IN CAL MODE
                  I              ;
0000E32C 4F       I              CLR A                   ; CLEAR ACCUM
0000E32D 9703     I              STA A   @PORT2          ; TAKE RUN LINE LOW
0000E32F D602     I              LDA B   @PORT1          ; READ CAL LINE
                  I
0000E331 C540     I              BIT B   #01000000B      ; TEST FOR LOW
0000E333 2634     I              BNE     ICALMEXIT       ; NOT THE SAME --> NOT IN CAL MODE
0000E335 7A0084   I              DEC     COUNT           ; DO THE SEQUENCE 5 TIMES
0000E338 26D7     I              BNE     RUNTST1         ; BRANCH TO DO IT AGAIN
                  I
0000E33A BDE37F   I    ICALM0    JSR     KEYSCN
0000E33D 96B1     I              LDA A   @ANALOG         ;IF THIS IS PARAMETER NUMBER ZERO, DISPLAY THE
0000E33F 2608     I              BNE     ICALM1          ;CAL MESSAGE AND ONLY CHECK FOR PARAM KEYSTATE
                  I
                  I              ;
0000E341 BDF86E   I              JSR     DISCAL          ;BY BY LOADING AN OFFSET VALUE WHICH DOESN'T
0000E344 CEE376   I              LDX     #ICALMK         ;INCLUDE POSSIBLE EXITS TO INK AND DEK.
0000E347 2003     I              BRA     ICALM2
                  I              ;
0000E349 CEE36A   I    ICALM1    LDX     #ICALMJ         ;OFFSET FOR THE WHOLE KEYSCAN JUMP TABLE.
                  I              ;
0000E34C 969D     I    ICALM2    LDA A   KYSTAT
0000E34E A100     I              CMP A   0,X             ;COMPARE TABLE VALUE TO THE RESULTS OF KEYSCAN.
0000E350 2708     I              BEQ     ICALM3          ;IF WE ARE A VALID KEYSCAN STATE, BRANCH.
0000E352 08       I              INX                     ;OTHERWISE, DEX TO THE NEXT LINE IN THE TABLE.
0000E353 08       I              INX
0000E354 08       I              INX
0000E355 8CE37F   I              CPX     #ICALML+3
0000E358 26F2     I              BNE     ICALM2
0000E35A 7EE305   I    ICALM5    JMP     REFRSH
                  I
0000E35D EE01     I    ICALM3    LDX     1,X             ;WE'RE POINTING AT A VALID KEYSCAN WORD, SO WE
0000E35F AD00     I              JSR     X               ;DO THE SUBROUTINE RIGHT NEXT TO US.
0000E361 27F7     I              BEQ     ICALM5          ;EVERY ROUTINE SHOULD RETURN 00 IN ACCD AND THE
                  I              ;
0000E363 CE0009   I    ICERROR   LDX     #9              ;LOAD THE OCTU ERROR CODE INTO
0000E366 BDE0A0   I              JSR     IERROR          ; CALL INITILIZATION ERROR
                  I              ;
0000E369 39       I    ICALMEXIT RTS
                  I    ;  -----------------------------------------------------------
                  I    ;
                  I    ;  DISPATCH TABLE - ICALMJ
                  I    ;
                  I    ;     THIS IS THE JUMP TABLE OF KEY SWITCH SERVICE ROUTINES. IT IS ORGANIZED
                  I    ;     IN THREE BYTE LINES. BYTE ONE OF EACH TRIPLET IS A KEYSTATE LOGICAL
                  I    ;     WORD. IF THE KEYSCAN ROUTINE RETURNS THE VALUE OF BYTE ONE, THE SUB-
                  I    ;     ROUTINE IN THE CORRESPONDING BYTE TWO:BYTE THREE IS EXECUTED.
                  I    ;
                  I    ;  -----------------------------------------------------------
                  I
0000E36A 01       I    ICALMJ    BYTE    00000001B
```

```
0000E36B E4B3    I           WORD FSTINK
0000E36D 0B      I           BYTE 00001011B
0000E36E E464    I           WORD INK
0000E370 02      I           BYTE 00000010B
0000E371 E55E    I           WORD FSTDEK
0000E373 07      I           BYTE 00000111B
0000E374 E50F    I           WORD DEK
0000E376 30      I    ICALMK BYTE 00110000B
0000E377 E408    I           WORD PARAM
0000E379 20      I           BYTE 00100000B
0000E37A E408    I           WORD PARAM
0000E37C 10      I    ICALML BYTE 00010000B
0000E37D E408    I           WORD PARAM
                 I
                 I
                 I    ;KEYSCN xxxxx   THIS IS THE KEYBOARD SCAN ROUTINE. IT WORKS LIKE THIS:
                 I    ;WE'VE DEFINED A LOGICAL WORD WHICH REPRESENTS THE CURRENT STATE OF THE
                 I    ;KEYBOARD IN THE FOLLOWING FORMAT:
                 I    ;
                 I    ;       BIT #   7       DON'T CARE
                 I    ;               6       DON'T CARE
                 I    ;               5       INC BUTTON NEGATIVE TRANSITION (PUSH)
                 I    ;               4       DEC BUTTON NEGATIVE TRANSITION (PUSH)
                 I    ;               3       INC BUTTON POSITIVE TRANSITION (RELEASE)
                 I    ;               2       DEC BUTTON POSITIVE TRANSITION (RELEASE)
                 I    ;               1       INC BUTTON CURRENT CONDITION (0=DOWN, 1=UP)
                 I    ;               0       DEC BUTTON CURRENT CONDITION (0=DOWN, 1=UP)
                 I    ;
                 I    ;EVERY TIME YOU ZIP THROUGH THIS ROUTINE, YOU DEBOUNCE, WHICH TAKES 40 MS OR
                 I    ;SO, AND THEN UPDATE THE STATUS OF THE KEYSTATE LOGICAL WORD. THE TRANSITION
                 I    ;FLAGS INDICATE THAT A BUTTON POSITION HAS CHANGED SINCE THE LAST TIME THE
                 I    ;KEYBOARD WAS SCANNED. SPECIFIC VALUES OF THE KEYSTATE LOGICAL WORD CAUSE
                 I    ;THE FOLLOWING JUMPS TO ACTION ROUTINES.
                 I    ;
                 I    ;       00001011B      INCREMENT      INCREMENT BUTTON JUST CAME UP WHILE
                 I    ;                                     DECREMENT BUTTON WAS UP.
                 I    ;
                 I    ;       00000001B      FASTINC        CHECK THE STATUS OF THE ZIP COUNTER
                 I    ;                                     AND IF ZERO, INC QUICKLY
                 I    ;
                 I    ;       00000111B      DECREMENT
                 I    ;
                 I    ;       00000010B      FASTDEC        CHECK THE STATUS OF THE ZIP @COUNTER
                 I    ;                                     AND IF ZERO, DEC QUICKLY
                 I    ;
                 I    ;       00100000B      CHANGE CURRENT
                 I    ;       00110000B      WORKING
                 I    ;       00010000B      PARAMETER
                 I
                 I    ;AT THE END OF THIS ROUTINE, THE KEYSTATE IS IN KYSTAT AND KYSTAT+1
                 I    ;
                 I    ;USES REGISTERS - ACCA, ACCB, ACCX, KYSTAT, KYSTAT+1,
                 I    ;
                 I    ;CALLS ROUTINES - DBOUNS(DELAY)
                 I    ;
                 I    ;EXPECTS DATA   - VALID KEYSTATES IN KYSTAT AND KYSTAT+1
                 I    ;
                 I    ;RETURNS DATA   - KEYSTATE LOGICAL WORD (AS DEFINED ABOVE)
                 I    ;
                 I
0000E37F 7F009E  I    KEYSCN  CLR    KYSTAT+1        ;CLEAR A WORKING REGISTER
0000E382 BDE3C8  I            JSR    DBOUNS          ;GET THE VALID STATE OF THE KEYS INTO ACCA
0000E385 979E    I            STA A  @KYSTAT+1       ;SAVE THE CURRENT BUTTON STATE IN KYSTAT+1
0000E387 44      I            LSR A                  ;WORK ON THE INC BUTTON FIRST
0000E388 D69D    I            LDA B  @KYSTAT         ;RECALL THE OLD BUTTON STATES
0000E38A C403    I            AND B  #00000011B
0000E38C 54      I            LSR B                  ;SHIFT TO JUST THE INC BUTTON
0000E38D 10      I            SBA
0000E38E 2204    I            BHI    KYSCN1
0000E390 2D0A    I            BLT    KYSCN2
```

```
0000E392 2010      I            BRA    KYSCN3        ;IF NEW - OLD = 0, THERE ARE NO TRANSITIONS.
                   I
0000E394 8608      I    KYSCN1  LDA A  #00001000B    ;IF THE NEW - OLD = 1, THAT MEANS THE NEW IS
0000E396 9A9E      I            ORA A  @KYSTAT+1     ;HIGHER THAN THE OLD, WHICH MEANS THAT THIS IS
0000E398 979E      I            STA A  @KYSTAT+1     ;A POSITIVE TRANSITION, AND WE OVERWRITE THE
0000E39A 2008      I            BRA    KYSCN3        ;APPROPRIATE BIT IN THE @TEMP REGISTER.
                   I
0000E39C 8620      I    KYSCN2  LDA A  #00100000B    ;IF THE NEW - OLD = -1, THAT MEANS THE NEW IS
0000E39E 9A9E      I            ORA A  @KYSTAT+1     ;LOWER THAN THE OLD, WHICH MEANS THAT THIS IS
0000E3A0 979E      I            STA A  @KYSTAT+1     ;A NEGATIVE TRANSITION, AND WE OVERWRITE THE
0000E3A2 2000      I            BRA    KYSCN3        ;APPROPRIATE BIT IN THE @TEMP REGISTER.
                   I
0000E3A4 969E      I    KYSCN3  LDA A  @KYSTAT+1     ;GET THE CURRENT BUTTON STATE AGAIN
0000E3A6 8401      I            AND A  #00000001B    ;WORK ON ONLY THE DEC BUTTON
0000E3A8 D69D      I            LDA B  @KYSTAT       ;RECALL THE OLD BUTTON STATES
0000E3AA C401      I            AND B  #00000001B    ;KEEP JUST THE DEC BUTTON
0000E3AC 10        I            SBA
0000E3AD 2204      I            BHI    KYSCN4
0000E3AF 2D0A      I            BLT    KYSCN5
0000E3B1 2010      I            BRA    KYSCN6        ;IF NEW - OLD = 0, THERE ARE NO TRANSITIONS.
                   I
0000E3B3 8604      I    KYSCN4  LDA A  #00000100B    ;IF THE NEW - OLD = 1, THAT MEANS THE NEW IS
0000E3B5 9A9E      I            ORA A  @KYSTAT+1     ;HIGHER THAN THE OLD, WHICH MEANS THAT THIS IS
0000E3B7 979E      I            STA A  @KYSTAT+1     ;A POSITIVE TRANSITION, AND WE OVERWRITE THE
0000E3B9 2008      I            BRA    KYSCN6        ;APPROPRIATE BIT IN THE @TEMP REGISTER.
                   I
                   I
0000E3BB 8610      I    KYSCN5  LDA A  #00010000B    ;IF THE NEW - OLD = -1, THAT MEANS THE NEW IS
0000E3BD 9A9E      I            ORA A  @KYSTAT+1     ;LOWER THAN THE OLD, WHICH MEANS THAT THIS IS
0000E3BF 979E      I            STA A  @KYSTAT+1     ;A NEGATIVE TRANSITION, AND WE OVERWRITE THE
0000E3C1 2000      I            BRA    KYSCN6        ;APPROPRIATE BIT IN THE @TEMP REGISTER.
                   I
0000E3C3 969E      I    KYSCN6  LDA A  @KYSTAT+1
0000E3C5 979D      I            STA A  @KYSTAT
0000E3C7 39        I            RTS
                   I
                   I
                   I    ;DBOUNS xxxxx  DEBOUNCE - THIS ROUTINE DOES A SOFTWARE DEBOUNCE OF THE TWO
                   I    ;              DCTU SET SWITCHES. IT WORKS BY LOOKING AT THE PORT LINES FOR
                   I    ;              THE SWITCHES, WAITING A FEW MSECS, GRABBING THE PORT AGAIN AND
                   I    ;              COMPARING THE RESULT.
                   I    ;              THE KEYSTATE IS RETURNED FROM DEBOUNCE IN THE FORM XXXXXXBB
                   I    ;              WHERE THE B'S ARE BINARY NUMBERS, THE X'S ARE DONT'T CARES,
                   I    ;              FILLED WITH ZEROS AND THE DEC BUTTON IS THE LSB. A 1 IS A
                   I    ;              MADE OR PUSHED SWITCH. A 0 IS AN OPEN OR UNPUSHED SWITCH.
                   I    ;              THIS DATA IS RETURNED IN ACCA.
                   I    ;
                   I    ;USES REGISTERS - ACCA, ACCB, ACCX
                   I    ;
                   I    ;CALLS ROUTINES - DELAY
                   I    ;
                   I    ;EXPECTS DATA   - NONE
                   I    ;
                   I    ;RETURNS DATA   - KEYSTATE IN ACCA
                   I    ;
0000E3C8 9607      I    DBOUNS  LDA A  @PORT4        ; BRING IN THE DATA
0000E3CA 8430      I            AND A  #00110000B    ;AND AWAY ALL BUT THE SWITCH LINES
0000E3CC CE0002    I            LDX    #02           ;DELAY OF 20 MSECS
0000E3CF BDE094    I            JSR    DELAY         ;WAIT 20 MSECS, AND THEN CHECK AGAIN
0000E3D2 D607      I            LDA B  PORT4         ;GET THE PORT STATE
0000E3D4 C430      I            AND B  #00110000B    ;AND AWAY ALL BUT THE SWITCH LINES
0000E3D6 11        I            CBA                  ;COMPARE THE SWITCH STATES
0000E3D7 26EF      I            BNE    DBOUNS        ;IF NOT THE SAME, KEEP TRYING UNTIL SAME
0000E3D9 CE0002    I            LDX    #02           ;DO IT AGAIN. DELAY OF 20 MSECS
0000E3DC BDE094    I            JSR    DELAY         ;WAIT 20 MSECS, AND THEN CHECK AGAIN
0000E3DF D607      I            LDA B  PORT4         ;GET THE PORT STATE
0000E3E1 C430      I            AND B  #00110000B    ;AND AWAY ALL BUT THE SWITCH LINES
0000E3E3 11        I            CBA                  ;COMPARE THE SWITCH STATES
0000E3E4 26E2      I            BNE    DBOUNS        ;IF NOT THE SAME, KEEP TRYING UNTIL SAME
0000E3E6 44        I            LSR A                ;MOVE THE BUTTONS FOUR RIGHT
```

```
0000E3E7 44       I            LSR A
0000E3E8 44       I            LSR A
0000E3E9 44       I            LSR A
0000E3EA 39       I            RTS
                  I
                  I
0000E3EB 00000001 I   LIMITS   WORD 0,1               ;THIS IS THE TABLE OF LIMITS OF THE PARAMETERS.
0000E3EF 000A1F40 I            WORD 10,8000           ;90-80000 LBS OF FUEL, 0 OR 1 FOR LBS/KGS,
0000E3F3 018F4E20 I            WORD 399,20000         ;0-2000 PICOFARADS CAPACITANCE FOR ALL OF THE
0000E3F7 031F7530 I            WORD 799,30000         ;CAPS.
0000E3FB 00C705D2 I            WORD 199,1490
0000E3FF 018F05D2 I            WORD 399,1490
0000E403 00000400 I            WORD   0,1024
0000E407 00000400 I            WORD   0,1024
                  I
                  I   ;PARAM xxxxx    THIS ROUTINE IS EXECUTED WHEN BOTH KEYS ARE DEPRESSED AT THE
                  I   ;               SAME TIME. THIS INDICATES THAT THE OPERATOR IS FINISHED WITH A
                  I   ;               PARAMETER. THE ROUTINE FIRST STORES THE VALUE OF @ABSCC IN THE
                  I   ;               NOVRAM, INCREMENTS THE PARAMETER NUMBER, RESETS IT TO ZERO
                  I   ;               IF IT HAS REACHED ITS MAXIMUM (8), MOMENTARILY DISPLAYS THE NEW
                  I   ;               PARAMETER NUMBER, AND DISPLAYS THE NEW VALUE OF @ABSCC.
                  I   ;
                  I   ;USES REGISTERS - ACCA,
                  I   ;
                  I   ;CALLS ROUTINES - STORE(?????)
                  I   ;               - DISPNO(?????)
                  I   ;               - DELAY(?????)
                  I   ;               - CALDSP(?????)
                  I   ;
                  I   ;EXPECTS DATA   - VALID @ANALOG
                  I   ;               - VALID @ABSCC
                  I   ;
                  I   ;RETURNS DATA   - INCREMENTS @ANALOG
                  I   ;
                  I
0000E408 CC0BB8   I   PARAM    LDD    #3000         ; DEADMAN CONSTANT
0000E40E DD8E     I            STD    @DEDTIM       ; PUT IN DEADMAN TIMER
0000E410 96B1     I            LDA A  @ANALOG       ; READ PARAMETER NUMBER
0000E412 8102     I            CMP A  #2            ; IS THIS TOTAL FUEL?
0000E414 260F     I            BNE    PARAMO        ; NO SKIP IT
0000E416 DCBE     I            LDD    @ABSCC        ; READ VALUE
0000E418 83000A   I            SUBD   #10           ; IS IT 100 ?
0000E41B 2608     I            BNE    PARAMO        ; NO SKIP IT
0000E41D 968D     I            LDA A  @STATUS       ; READ STATUS
0000E41F 8A20     I            ORA A  #00100000B    ; SET DIAGNOSTIC FLAG
0000E421 978D     I            STA A  @STATUS       ; RESTORE STATUS
0000E423 2008     I            BRA    PARAMA        ; SKIP STORE GO TO NEXT PARAM
                  I
0000E425 DCBE     I   PARAMO   LDD    @ABSCC        ; READ NEW PARAMETER
0000E427 93DC     I            SUBD   @CCVAL        ; SUBTRACT LAST VALUE
0000E429 2705     I            BEQ    PARAMA        ; IF EQUAL SKIP IT  DON'T WRITE THE SAME NUMBER
0000E42B BDE691   I            JSR    STORE         ;STORE THE CURRENT VALUE OF @ABSCC. RETURN WITH
0000E42E 2633     I            BNE    PARAM4        ;AN ERROR IF THE CHECKSUM FROM STORE FLUNKS.
0000E430 7C00B1   I   PARAMA   INC    ANALOG        ;CHECK TO SEE IF WE ARE OVER THE MAXIMUM
0000E433 96B1     I            LDA A  @ANALOG       ;PARAMETER NUMBER (6)
0000E435 8109     I            CMP A  #09
0000E437 2506     I            BLO    PARAM1
0000E439 8600     I            LDA A  #00           ;IF WE ARE OVER THE MAXIMIM PARAMETER NUMBER,
0000E43B 97B1     I            STA A  @ANALOG       ;RESET IT TO 0.
0000E43D 2721     I            BEQ    PARAM3        ;BRANCH TO EXIT
0000E43F BDF88F   I   PARAM1   JSR    DISPNO        ;DISPLAY THE PARAMETER NUMBER
0000E442 BDE37F   I   PARAM2   JSR    KEYSCN        ;WAIT FOR THE OPERATOR TO RELEASE BOTH KEYS
0000E445 8103     I            CMP A  #00000011B    ;BEFORE CONTINUING.
0000E447 26F9     I            BNE    PARAM2
0000E449 CE0064   I            LDX    #100          ;LEAVE THE PARAMETER MESSAGE ON THE SCREEN FOR
0000E44C BDE094   I            JSR    DELAY         ;ONE SECOND AFTER THE BUTTONS ARE RELEASED.
0000E44F BDE678   I            JSR    RECALL
0000E452 96B1     I            LDA A  @ANALOG       ;LOOK AT THE PARAMETER NUMBER.
0000E454 BDE773   I            JSR    RUNRED        ;UPDATE YREG AND ABSCC WITH THE
0000E457 DC88     I            LDD    @YREG         ;THE CURRENT DATA WORD FROM THE NOVRAM.
```

```
0000E459 DDBE     I              STD      @ABSCC
0000E45B DDDC     I              STD      @CCVAL          ; HOLD FOR COMPARISON
0000E45D BDE5BA   I              JSR      CALDSP          ;DISPLAY THIS WORD
0000E460 CC0000   I     PARAM3   LDD      #00
0000E463 39       I     PARAM4   RTS
                  I
                  I     ;INK *****        THIS ROUTINE INCREMENTS THE VALUE IN @ABSCC. MAXIMUM AND
                  I     ;                 MINIMUM VALUES FOR @ABSCC ARE LISTED IN THE TABLE ABOVE. THE
                  I     ;                 ROUTINE THEN CALLS THE CALIBRATION DISPLAY ROUTINE, WHICH
                  I     ;                 DISPLAYS ABSCC IN LBS, PF, ETC.
                  I     ;
                  I     ;USES REGISTERS - X, ACCB, @TEMP, @TEMP+1, @ABSCC
                  I     ;
                  I     ;CALLS ROUTINES - CALDSP(?????)
                  I     ;
                  I     ;EXPECTS DATA   - @ANALOG = CURRENT PARAMETER NUMBER
                  I     ;               - @ABSCC = CURRENT VALUE OF THIS PARAMETER
                  I     ;               - LIMITS = TABLE OF MIN AND MAX VALUES FOR EACH PARAMETER
                  I     ;
                  I     ;RETURNS DATA   - @ABSCC IS INCREMENTED
                  I     ;
                  I
                  I
0000E464 96B1     I     INK      LDA A    @ANALOG
0000E466 8101     I              CMP A    #01             ;IF THIS IS LB/KG PARAMETER, INC BY 1.
0000E468 2721     I              BEQ      INK2
                  I
0000E46A 8102     I              CMP A    #02
0000E46C 2609     I              BNE      INK1            ;IF THIS IS THE FUEL WEIGHT PARAMETER, WE INK
0000E46E DCBE     I              LDD      @ABSCC          ;BY 100 LBS OR KGS. RECALL THE FUEL IS ALWAYS
0000E470 C3000A   I              ADDD     #10             ;DISPLAYED WITH THE DUMMY ZERO LIT, SO WE'RE
0000E473 DDBE     I              STD      @ABSCC          ;REALLY STORING TENS OF POUNDS OR KILGRAMS.
0000E475 201B     I              BRA      INK3
                  I
0000E477 8107     I     INK1     CMP A    #07             ; TEST FOR PARAM > 6
0000E479 2410     I              BCC      INK2            ; NO FUNNY STUFF IF > 6
0000E47B DCBE     I              LDD      @ABSCC          ;SINCE WE GOT THIS FAR, WE'RE WORKING ON ONE OF
0000E47D 832710   I              SUBD     #10000          ;THE PICOFARADS PARAMETERS. IF AND WE ARE OVER
0000E480 2509     I              BLO      INK2            ;999.9 PF, WE BEGIN INCREMENTING BY 10. (RECALL
0000E482 DCBE     I              LDD      @ABSCC          ;WE RECORD 1/10 PF INTERVALS)
0000E484 C3000A   I              ADDD     #10             ;@ABSCC < 10000, INK BY ONE.
0000E487 DDBE     I              STD      @ABSCC          ;@ABSCC > 10000, INK BY TEN.
0000E489 2007     I              BRA      INK3
0000E48B DCBE     I     INK2     LDD      @ABSCC          ;INCREMENT THE CURRENT VALUE OF THE PARAMETER
0000E48D C30001   I              ADDD     #01             ;(DOUG ORTH HELPED WITH THIS ROUTINE)
0000E490 DDBE     I              STD      @ABSCC
0000E492 CEE3E7   I     INK3     LDX      #LIMITS-4       ;POINT TO LIMITS - 4
0000E495 D6B1     I              LDA B    @ANALOG         ;GET THE PARAMETER NUMBER, MULTIPLY IT BY FOUR
0000E497 58       I              LSL B                    ;SO THAT WE POINT TO THE UPPER LIMIT NUMBER FOR
0000E498 58       I              LSL B                    ;THIS PARAMETER IN THE LIMITS TABLE.
0000E499 3A       I              ABX                      ;ADD @ANALOG*4 TO X TO MOVE US DOWN TABLE
0000E49A EC02     I              LDD      2,X             ;GET THE UPPER LIMIT VALUE
0000E49C 93BE     I              SUBD     @ABSCC          ;SUBTRACT AWAY THE CURRENT @ABSCC VALUE
0000E49E 270C     I              BEQ      INK4
0000E4A0 2506     I              BCS      INK3R           ;IF WE'VE REACHED THE LOWER LIMIT,
0000E4A2 DCBE     I              LDD      @ABSCC          ;SET @ABSCC EQUAL TO THE LOWER LIMIT
0000E4A4 A300     I              SUBD     0,X             ;STORE IT AND RETURN
0000E4A6 2404     I              BCC      INK4
0000E4A8 EC02     I     INK3R    LDD      2,X
0000E4AA DDBE     I              STD      @ABSCC          ; RESET TO UPPER LIMIT
0000E4AC BDE5BA   I     INK4     JSR      CALDSP
0000E4AF CC0000   I              LDD      #00
0000E4B2 39       I              RTS
                  I
                  I     ;FSTINK *****     THIS ROUTINE INCREMENTS AND DISPLAYS THE CONTENTS OF @ABSCC
                  I     ;                 ONCE EVERY 40MS, CONTINUOUSLY, FOR AS LONG AS EITHER BUTTON IS
                  I     ;                 HELD DOWN, AFTER AN INITIAL TWO SECOND WAIT. AFTER FOUR SECS,
                  I     ;                 ABSCC INCREMENTS EVERY 10MS. IT CALLS THE CALIBRATION DISPLAY
                  I     ;                 ROUTINE TO CONTINUOUSLY UPDATE THE DISPLAY.
                  I     ;
```

```
                     I    ;USES REGISTERS - ACCA,
                     I    ;
                     I    ;CALLS ROUTINES - KEYSCN(?????)
                     I    ;               - INK(CALDSP(?????))
                     I    ;
                     I    ;EXPECTS DATA   - @ANALOG = CURRENT PARAMETER NUMBER
                     I    ;               - @ABSCC = CURRENT VALUE OF THIS PARAMETER
                     I    ;
                     I    ;RETURNS DATA   - @ABSCC IS INCREMENTED
                     I    ;
                     I
0000E4B3 8628        I    FSTINK  LDA A   #40            ;LOAD THE TIMER VALUE
0000E4B5 97A1        I            STA A   @CLTMP2
0000E4B7 97AA        I            STA A   @NCBUF+13
0000E4B9 BDE37F      I    FSTNK1  JSR     KEYSCN
0000E4BC 8101        I            CMP A   #00000001B
0000E4BE 2648        I            BNE     FSTNK7
                     I
0000E4C0 7A00A1      I            DEC     CLTMP2
0000E4C3 26F4        I            BNE     FSTNK1
                     I            ;
0000E4C5 96AA        I            LDA A   @NCBUF+13      ; READ HIGH GEAR COUNT
0000E4C7 2709        I            BEQ     FSTNKF         ; IF ZERO THAN HIGH GEAR
                     I            ;
0000E4C9 7A00AA      I            DEC     NCBUF+13       ; COUNT DOWN UNTIL HIGH GEAR
0000E4CC CE000A      I            LDX     #10            ; 100 MS DELAY
0000E4CF BDE094      I            JSR     DELAY          ; WAIT
                     I            ;
0000E4D2 96B1        I    FSTNKF  LDA A   @ANALOG
0000E4D4 8101        I            CMP A   #01            ;LOOK AT THE CURRENT PARAMETER NUMBER. IF IT'S
0000E4D6 2730        I            BEQ     FSTNK7         ;PARAMETER NUMBER ONE (LB/KG), DON'T FSTINK.
0000E4D8 8107        I            CMP A   #7             ;COMPARE TO PARMETER 7
0000E4DA 2424        I            BCC     FSTNK6         ; FAST ONE AT A TIME
0000E4DC 8102        I            CMP A   #02            ;IF THIS IS PARAMETER NUMBER 2 (FUEL WEIGHT),
0000E4DE 2609        I            BNE     FSTNK2         ;ADD 300 AND DISPLAY. WE ADD 300 BECAUSE THIS
0000E4E0 DCBE        I            LDD     @ABSCC         ;VALUE CAUSES THE LOW DIGIT TO ROLL.
0000E4E2 C30014      I            ADDD    #20
0000E4E5 DDBE        I            STD     @ABSCC
0000E4E7 2017        I            BRA     FSTNK6
                     I
0000E4E9 DCBE        I    FSTNK2  LDD     @ABSCC         ;SINCE WE GOT THIS FAR, WE'RE WORKING ON ONE OF
0000E4EB 832710      I            SUBD    #10000         ;THE PICOFARADS PARAMETERS. IF WE ARE OVER
0000E4EE 2509        I            BLO     FSTNK3         ;999.9 PF, WE INCREMENT BY 10. (REMEMBER THAT
0000E4F0 DCBE        I            LDD     @ABSCC         ;WE RECORD 1/10 PF INTERVALS)
0000E4F2 C30050      I            ADDD    #80            ;@ABSCC < 10000, INK BY NINE.
0000E4F5 DDBE        I            STD     @ABSCC         ;@ABSCC > 10000, INK BY NINETY.
0000E4F7 2007        I            BRA     FSTNK6
0000E4F9 DCBE        I    FSTNK3  LDD     @ABSCC         ;INCREMENT THE CURRENT VALUE OF THE PARAMETER
0000E4FB C30008      I            ADDD    #08            ;(DOUG ORTH HELPED WITH THIS ROUTINE)
0000E4FE DDBE        I            STD     @ABSCC
                     I
0000E500 BDE464      I    FSTNK6  JSR     INK
0000E503 7C00A1      I            INC     CLTMP2
0000E506 20B1        I            BRA     FSTNK1
                     I
0000E508 BDE464      I    FSTNK7  JSR     INK
0000E50B CC0000      I            LDD     #00
0000E50E 39          I            RTS
                     I
                     I
                     I    ;DEK *****      THIS ROUTINE DECREMENTS THE VALUE IN @ABSCC. MAXIMUM AND
                     I    ;               MINIMUM VALUES FOR @ABSCC ARE LISTED IN THE TABLE ABOVE. THE
                     I    ;               ROUTINE THEN CALLS THE CALIBRATION DISPLAY ROUTINE, WHICH
                     I    ;               DISPLAYS ABSCC IN LBS, PF, ETC.
                     I    ;
                     I    ;USES REGISTERS - X, ACCB, @TEMP, @TEMP+1, @ABSCC
                     I    ;
                     I    ;CALLS ROUTINES - CALDSP(?????)
                     I    ;
                     I    ;EXPECTS DATA   - @ANALOG = CURRENT PARAMETER NUMBER
```

```
                    I   ;               - @ABSCC = CURRENT VALUE OF THIS PARAMETER
                    I   ;               - LIMITS = TABLE OF MIN AND MAX VALUES FOR EACH PARAMETER
                    I   ;
                    I   ;RETURNS DATA   - @ABSCC IS DECREMENTED
                    I   ;
                    I
0000E50F 96B1       I   DEK     LDA A   @ANALOG
0000E511 8101       I           CMP A   #01             ;IF THIS IS LB/KG PARAMETER, BRANCH TO DEC BY 1
0000E513 2721       I           BEQ     DEK2
                    I
0000E515 8102       I           CMP A   #02
0000E517 2609       I           BNE     DEK1            ;IF THIS IS THE FUEL WEIGHT PARAMETER, WE DEK
0000E519 DCBE       I           LDD     @ABSCC          ;BY 100 LBS OR KGS. RECALL THE FUEL IS ALWAYS
0000E51B 83000A     I           SUBD    #10             ;DISPLAYED WITH THE DUMMY ZERO LIT, SO WE'RE
0000E51E DDBE       I           STD     @ABSCC          ;REALLY STORING TENS OF POUNDS OR KILGRAMS.
0000E520 201B       I           BRA     DEK3
                    I
0000E522 8107       I   DEK1    CMP A   #07             ; TEST FOR 7 OR GREATER
0000E524 2410       I           BCC     DEK2            ; BRANCH NO FUNNY STUFF ON PARAM > 6
0000E526 DCBE       I           LDD     @ABSCC          ;SINCE WE GOT THIS FAR, WE'RE WORKING ON ONE OF
0000E528 832710     I           SUBD    #10000          ;THE PICOFARADS PARAMETERS. IF AND WE ARE OVER
0000E52B 2509       I           BLO     DEK2            ;999.9 PF, WE DECREMENT BY 10. (REMEMBER THAT
0000E52D DCBE       I           LDD     @ABSCC          ;WE RECORD 1/10 PF INTERVALS)
0000E52F 83000A     I           SUBD    #10             ;@ABSCC < 10000, DEK BY ONE.
0000E532 DDBE       I           STD     @ABSCC          ;@ABSCC > 10000, DEK BY TEN.
0000E534 2007       I           BRA     DEK3
0000E536 DCBE       I   DEK2    LDD     @ABSCC          ;DECREMENT THE CURRENT VALUE OF THE PARAMETER
0000E538 830001     I           SUBD    #01             ;(DOUG ORTH HELPED WITH THIS ROUTINE)
0000E53B DDBE       I           STD     @ABSCC
0000E53D CEE3E7     I   DEK3    LDX     #LIMITS-4       ;POINT TO LIMITS - 4
0000E540 D6B1       I           LDA B   @ANALOG         ;GET THE PARAMETER NUMBER, MULTIPLY IT BY FOUR
0000E542 58         I           LSL B                   ;SO THAT WE POINT TO THE UPPER LIMIT NUMBER FOR
0000E543 58         I           LSL B                   ;THIS PARAMETER IN THE LIMITS TABLE.
0000E544 3A         I           ABX                     ;ADD @ANALOG*4 TO X TO MOVE US DOWN TABLE
0000E545 EC02       I           LDD     2,X             ;GET THE UPPER LIMIT VALUE
0000E547 93BE       I           SUBD    @ABSCC          ;SUBTRACT AWAY THE CURRENT @ABSCC VALUE
0000E549 270C       I           BEQ     DEK4
0000E54B 2506       I           BCS     DEK4R           ;IF WE'VE REACHED THE LOWER LIMIT,
0000E54D DCBE       I           LDD     @ABSCC          ;SET @ABSCC EQUAL TO THE LOWER LIMIT
0000E54F A300       I           SUBD    0,X             ;STORE IT AND RETURN
0000E551 2404       I           BCC     DEK4
0000E553 EC00       I   DEK4R   LDD     0,X
0000E555 DDBE       I           STD     @ABSCC          ; RESET TO LOWER LIMIT
0000E557 BDE5BA     I   DEK4    JSR     CALDSP
0000E55A CC0000     I           LDD     #00
0000E55D 39         I           RTS
                    I
                    I
                    I   ;FSTDEK *****  THIS ROUTINE DECREMENTS AND DISPLAYS THE CONTENTS OF @ABSCC
                    I   ;              ONCE EVERY 40MS, CONTINUOUSLY, FOR AS LONG AS EITHER BUTTON IS
                    I   ;              HELD DOWN, AFTER AN INITIAL TWO SECOND WAIT. AFTER FOUR SECS,
                    I   ;              ABSCC DECREMENTS EVERY 10MS. IT CALLS THE CALIBRATION DISPLAY
                    I   ;              ROUTINE TO CONTINUOUSLY UPDATE THE DISPLAY.
                    I   ;
                    I   ;USES REGISTERS - ACCA,
                    I   ;
                    I   ;CALLS ROUTINES - KEYSCN(?????)
                    I   ;               - DEK(CALDSP(?????))
                    I   ;
                    I   ;EXPECTS DATA   - @ANALOG = CURRENT PARAMETER NUMBER
                    I   ;               - @ABSCC = CURRENT VALUE OF THIS PARAMETER
                    I   ;
                    I   ;RETURNS DATA   - @ABSCC IS DECREMENTED
                    I   ;
                    I
0000E55E 8628       I   FSTDEK  LDA A   #40             ;LOAD THE TIMER VALUE
0000E560 97A1       I           STA A   @CLTMP2
0000E562 97AA       I           STA A   @NCBUF+13
0000E564 BDE37F     I   FSTDK1  JSR     KEYSCN
0000E567 8102       I           CMP A   #00000010B
```

```
1466  0000E569 2648    I              BNE     FSTDK7
1467  0000E56B 7A00A1  I              DEC     CLTMP2
1468  0000E56E 26F4    I              BNE     FSTDK1
1469                   I              ;
1470  0000E570 96AA    I              LDA A   @NCBUF+13       ; READ HIGH GEAR COUNT
1471  0000E572 2709    I              BEQ     FSTDKF          ; IF ZERO THAN HIGH GEAR
1472                   I              ;
1473  0000E574 7A00AA  I              DEC     NCBUF+13        ; COUNT DOWN UNTIL HIGH GEAR
1474  0000E577 CE000A  I              LDX     #10             ; 100 MS DELAY
1475  0000E57A BDE094  I              JSR     DELAY           ; WAIT
1476  0000E57D 96B1    I     FSTDKF   LDA A   @ANALOG
1477  0000E57F 8101    I              CMP A   #01             ;LOOK AT THE CURRENT PARAMETER NUMBER. IF IT'S
1478  0000E581 2730    I              BEQ     FSTDK7          ;PARAMETER NUMBER ONE (LB/KG), DON'T FSTDEK.
1479                   I
1480  0000E583 8102    I              CMP A   #02             ;IF THIS IS PARAMETER NUMBER 2 (FUEL WEIGHT),
1481  0000E585 260D    I              BNE     FSTDK2          ;SUB 300 AND DISPLAY. WE SUB 300 BECAUSE THIS
1482  0000E587 8107    I              CMP A   #07             ; COMPARE TO PARMETER NUMBER 7
1483  0000E589 2420    I              BCC     FSTDK6          ; FAST BUT BY ONES
1484  0000E58B DCBE    I              LDD     @ABSCC          ;VALUE CAUSES THE LOW DIGIT TO ROLL.
1485  0000E58D 830014  I              SUBD    #20
1486  0000E590 DDBE    I              STD     @ABSCC
1487  0000E592 2017    I              BRA     FSTDK6
1488                   I
1489  0000E594 DCBE    I     FSTDK2   LDD     @ABSCC          ;SINCE WE GOT THIS FAR, WE'RE WORKING ON ONE OF
1490  0000E596 832710  I              SUBD    #10000          ;THE PICOFARADS PARAMETERS. IF WE ARE OVER
1491  0000E599 2509    I              BLO     FSTDK3          ;999.9 PF, WE DECREMENT BY 10. (REMEMBER THAT
1492  0000E59B DCBE    I              LDD     @ABSCC          ;WE RECORD 1/10 PF INTERVALS)
1493  0000E59D 830050  I              SUBD    #80             ;@ABSCC < 10000, DEK BY NINE.
1494  0000E5A0 DDBE    I              STD     @ABSCC          ;@ABSCC > 10000, DEK BY NINETY.
1495  0000E5A2 2007    I              BRA     FSTDK6
1496  0000E5A4 DCBE    I     FSTDK3   LDD     @ABSCC          ;DECREMENT THE CURRENT VALUE OF THE PARAMETER
1497  0000E5A6 830008  I              SUBD    #08             ;(DOUG ORTH HELPED WITH THIS ROUTINE)
1498  0000E5A9 DDBE    I              STD     @ABSCC
1499                   I
1500  0000E5AB BDE50F  I     FSTDK6   JSR     DEK
1501  0000E5AE 7C00A1  I              INC     CLTMP2
1502  0000E5B1 2081    I              BRA     FSTDK1
1503                   I
1504  0000E5B3 BDE50F  I     FSTDK7   JSR     DEK
1505  0000E5B6 CC0000  I              LDD     #00
1506  0000E5B9 39      I              RTS
1507                   I
1508                   I
1509                   I              ;CALDSP xxxxx   THIS IS THE CAL MODE DISPLAY ROUTINE. IT DISPLAYS THE CURRENT
1510                   I              ;              VALUE OF WHATEVER PARAMETER IS POINTED TO BY @ANALOG
1511                   I              ;
1512                   I              ;USES REGISTERS - ACCA, ACCB, @TEMP,
1513                   I              ;CALDSP xxxxx   THIS IS THE CAL MODE DISPLAY ROUTINE. IT DISPLAYS THE CURRENT
1514                   I              ;              VALUE OF WHATEVER PARAMETER IS POINTED TO BY @ANALOG
1515                   I              ;
1516                   I              ;USES REGISTERS - ACCA, ACCB, @TEMP,
1517                   I              ;
1518                   I              ;CALLS ROUTINES - DISCAL(?????)
1519                   I              ;                - DISPARM(?????)
1520                   I              ;
1521                   I              ;EXPECTS DATA   - @ANALOG HOLDS PARAMETER NUMBER TO BE DISPLAYED
1522                   I              ;                - @ABSCC HOLDS QUANTITY TO BE DISPLAYED
1523                   I              ;
1524                   I              ;RETURNS DATA   - NONE
1525                   I              ;
1526                   I
1527  0000E5BA 96B1    I     CALDSP   LDA A   @ANALOG
1528  0000E5BC 8101    I              CMP A   #01             ;PARAMETER 1? IF NOT; BRANCH FORWARD
1529  0000E5BE 2611    I              BNE     CLDSP2
1530  0000E5C0 D6BF    I              LDA B   @ABSCC+1        ;LOOK AT THE CONTENTS OF @ABSCC TO SEE IF WE ARE
1531  0000E5C2 CB01    I              ADD B   #01             ;SUPPOSED TO DISPLAY KG OR LB. @ABSCC = 1 = KG
1532  0000E5C4 58      I              LSL B                   ;(ABSCC + 1) X 2 = CORRECT FORM FOR DISPLAY
1533  0000E5C5 D782    I              STA B   @TEMP           ;ROUTINE KG/LB FLAG BITS
1534  0000E5C7 D7A9    I              STA B   @NCBUF+12       ; SAVE KG/LB FLAG FOR TOTAL FUEL DISPLAY
1535  0000E5C9 7F00BC  I              CLR     @WEIGHT         ;CLEAR THE @WEIGHT REGISTER
```

```
0000E5CC 7F00B0    I            CLR    WEIGHT+1
0000E5CF 205C      I            BRA    CLDSP32
                   I
0000E5D1 8102      I    CLDSP2  CMP A  #02            ;PARAMETER 2?
0000E5D3 260C      I            BNE    CLDS21         ;NO, BRANCH
                   I
0000E5D5 8601      I            LDA A  #00000001B     ;@TEMP HOLDS THE ERR, KGS, LBS FLAGS
0000E5D7 9AA9      I            ORA A  @NCBUF+12      ; OR IN LB/KG FLAG
0000E5D9 9782      I            STA A  @TEMP          ;LIGHT THE DUMMY ZERO
0000E5DB DCBE      I            LDD    @ABSCC         ;GET THE CURRENT VALUE OF THE CURRENT PARAMETER
0000E5DD DDBC      I            STD    @WEIGHT        ;PASS IT TO DISPARM IN @WEIGHT REGISTER
0000E5DF 204C      I            BRA    CLDSP32
                   I
0000E5E1 8107      I    CLDS21  CMP A  #07            ;COMPARE TO PARMETER 7
0000E5E3 251C      I            BCS    CLDSP3         ; IF LESS THAN 7 BRANCH OVER THIS ROUTINE
                   I            ;
0000E5E5 8601      I            LDA A  #00000001B     ;@TEMP HOLDS THE ERR, KGS, LBS FLAGS
0000E5E7 9AA9      I            ORA A  @NCBUF+12      ; OR IN LB/KG FLAG
0000E5E9 9782      I            STA A  @TEMP          ;LIGHT THE DUMMY ZERO
                   I            ;
0000E5EB DCBE      I            LDD    @ABSCC         ; GET CURRENT VALUE
0000E5ED 830200    I            SUBD   #512           ; SUBTRACT REAL ZERO
0000E5F0 240B      I            BCC    CLDS22         ; POSITIVE NUMBER
                   I            ;
0000E5F2 9682      I            LDA A  @TEMP          ; READ TEMP
0000E5F4 8A80      I            ORA A  #128           ; OR IN NEGATIVE BIT
0000E5F6 9782      I            STA A  @TEMP          ; STORE IN TEMP
                   I            ;
0000E5F8 CC0200    I            LDD    #512           ; LOAD REAL ZERO
0000E5FB 93BE      I            SUBD   @ABSCC         ; SUBTRACT CURRENT VALUE
                   I            ;
0000E5FD DDBC      I    CLDS22  STD    @WEIGHT        ; STORE IN WEIGHT
0000E5FF 202C      I            BRA    CLDSP32        ; BRANCH TO DISPLAY IT
                   I
0000E601 DCBE      I    CLDSP3  LDD    @ABSCC         ;FOR ALL OF THE OTHER PARAMETERS, WE ARE USING
0000E603 832710    I            SUBD   #10000         ;1/10 PICOFARADS, SO CHECK THE @ABSCC VALUE
0000E606 251E      I            BLO    CLDSP31        ;FOR @ABSCC < 10000, DISPLAY ALL DIGITS.
0000E608 DCBE      I            LDD    @ABSCC
0000E60A DDC1      I            STD    ARG1+1         ;TRUNCATE ALL NUMBERS > 10000
0000E60C 7F00C0    I            CLR    ARG1           ;BY DIVIDING BY 10
0000E60F 7F00C3    I            CLR    ARG2           ;(THE DISPLAY ONLY DISPLAYS 4 DECIMAL DIGITS)
0000E612 7F00C4    I            CLR    ARG2+1
0000E615 860A      I            LDA A  #10
0000E617 97C5      I            STA A  ARG2+2
0000E619 BDF2BC    I            JSR    DIV24
0000E61C DCC7      I            LDD    RES+1
0000E61E DDBC      I            STD    @WEIGHT        ;STORE THE TRUNCATED NUMBER IN @WEIGHT
0000E620 8601      I            LDA A  #01            ;SET THE DUMMY ZERO BIT IN THE @TEMP REGISTER
0000E622 9782      I            STA A  @TEMP
0000E624 2007      I            BRA    CLDSP32
0000E626 DCBE      I    CLDSP31 LDD    @ABSCC
0000E628 DDBC      I            STD    @WEIGHT
0000E62A 7F0082    I            CLR    TEMP
0000E62D BDF8E9    I    CLDSP32 JSR    DISPARM
0000E630 39        I            RTS
                   I
                   I
                   I
                              INCLUDE 'dcturam.asm'
                   I            ;
                   I
                   I
                   I    ;CHKSUM xxxxx  THIS IS A BANK CHECKSUM. THE SUM OF ALL OF THE NOVRAM WORDS
                   I    ;              MUST BE A SIXTEEN-BIT ZERO OR WE FLUNK THE CHECKSUM. THE SUM IS
                   I    ;              RETURNED IN ACCD.
                   I    ;
                   I    ;              THIS ROUTINE RUNS ONLY IN THE CAL MODE
                   I
                   I    ;
                   I    ;USES REGISTERS - ACCA,ACCB,@XREG,@XREG+1,@YREG,@YREG+1,@TEMP
```

```
                   I   ;
                   I   ;CALLS ROUTINES - RECALL(RUNSND, NDESNOV, NSELNOV)
                   I   ;               - RUNRED(RUNSND, RUNREC, NDESNOV, NSELNOV)
                   I   ;               - ADDNIB
                   I   ;
                   I   ;EXPECTS DATA   - NOVRAM DATA IN NOVRAM RAM
                   I   ;
                   I   ;RETURNS DATA   - ACCD = 0 IF CHECKSUM PASSES
                   I   ;
                   I
0000E631 7F0086    I   CHKSUM  CLR     XREG
0000E634 7F0087    I           CLR     XREG+1
0000E637 BDE678    I           JSR     RECALL
0000E63A 860F      I           LDA A   #15          ;SET @COUNTER FOR BANK CHECK SUM CALCULATION
0000E63C 9785      I           STA A   @COUNT+1
0000E63E 9685      I   CHKSM1  LDA A   @COUNT+1
0000E640 BDE773    I           JSR     RUNRED       ;GET THE NEXT WORD FROM THE NOVRAM RAM
0000E643 DC86      I           LDD     @XREG        ;ADD THE WORD TO @XREG
0000E645 D388      I           ADDD    @YREG
0000E647 DD86      I           STD     @XREG
0000E649 7A0085    I           DEC     COUNT+1
0000E64C 2AF0      I           BPL     CHKSM1
0000E64E DC86      I           LDD     @XREG
0000E650 39        I           RTS
                   I
                   I   ;FIXSUM *****   THIS ROUTINE CALCULATES ALL OF THE NOVRAM CHECKSUMS, AND WRITES
                   I   ;               THEM IN THE CORRECT NOVRAM RAM LOCATIONS. THE REST OF THE DATA
                   I   ;               IN THE NOVRAM IS UNAFECTED.
                   I   ;
                   I   ;USES REGISTERS - ACCA, ACCB, @YREG, @YREG+1
                   I   ;
                   I   ;CALLS ROUTINES - RUNRED(RUNSND, RUNREC, NDESNOV, NSELNOV)
                   I   ;               - RUNWRT
                   I   ;
                   I   ;EXPECTS DATA   -
                   I   ;
                   I   ;RETURNS DATA   -
                   I   ;
                   I
0000E651 7F0086    I   FIXSUM  CLR     XREG
0000E654 7F0087    I           CLR     XREG+1
0000E657 860F      I           LDA A   #15          ;SET @COUNTER FOR BANK CHECK SUM CALCULATION
0000E659 9785      I           STA A   @COUNT+1     ;WE DON'T INCLUDE THE LAST BIT IN THE SUM,
0000E65B 9685      I   FIXSM1  LDA A   @COUNT+1     ;BECAUSE THAT'S THE ONE WE'RE MODIFYING.
0000E65D BDE773    I           JSR     RUNRED       ;GET THE NEXT WORD FROM THE NOVRAM RAM
0000E660 DC86      I           LDD     @XREG        ;ADD THE WORD TO @XREG
0000E662 D388      I           ADDD    @YREG
0000E664 DD86      I           STD     @XREG        ;KEEP THE RUNNING SUM IN @XREG
0000E666 7A0085    I           DEC     COUNT+1
0000E669 26F0      I           BNE     FIXSM1
0000E66B CC0000    I   FIXSM4  LDD     #00          ;SET THE VALUE OF ACCD TO ZERO
0000E66E 9386      I           SUBD    @XREG        ;AND SUBTRACT XREG FROM IT
0000E670 DD88      I           STD     @YREG        ;THIS NOW EQUALS THE CHECKSUM
0000E672 8600      I           LDA A   #00          ;WHICH IS STORED IN THE BANK CHECKSUM WORD
0000E674 BDE78E    I           JSR     RUNWRT       ;OF THE NOVRAM
0000E677 39        I           RTS
                   I
                   I   ;RECALL *****   THIS ROUTINE ISSUES THE RECALL INSTRUCTION TO THE NOVRAM. THE
                   I   ;               RECALL INSTRUCTION RECALLS THE CONTENTS OF THE NOVRAM EEPROM
                   I   ;               INTO THE NOVRAM RAM. IT NEXT READS THE NOVRAM RAM AND UPDATES
                   I   ;               THE VALUE OF ABSCC.
                   I   ;
                   I   ;               DON'T ENTER WITH ANYTHING, NOTHING IS SET ON EXIT.
                   I   ;
                   I   ;USES REGISTERS - ACCA, ACCB, COUNT
                   I   ;
                   I   ;CALLS ROUTINES - RUNSND, NDESNOV, NSELNOV
                   I   ;
                   I   ;EXPECTS DATA   - NONE
                   I   ;
```

```
                      I   ;RETURNS DATA   - NONE
                      I   ;
                      I
0000E678 BDE68A       I   RECALL  JSR     WIGGLE         ;THE NOVRAM ONLY RECOGNIZES CONTROL WORD START
                      I                                  ;BITS ON THE FIRST CLOCK PULSE FOLLOWING CE
0000E67B 8685         I           LDA A   #10000101B     ;SEND THE RECALL CONTROL WORD
0000E67D BDE71F       I           JSR     RUNSND
0000E680 BDE6DF       I           JSR     NDESNOV
0000E683 CE0001       I           LDX     #1             ; SET 10 MS DELAY CONSTANT
0000E686 BDE094       I           JSR     DELAY          ; WAIT
0000E689 39           I           RTS
                      I
                      I
                      I   ;WIGGLE *****     QUICK NDESNO/NSELNOV TO PROPERLY SELECT THE NOVRAM
                      I
0000E68A BDE6DF       I   WIGGLE  JSR     NDESNOV        ; ENSURE THE NOVRAM IS DESELECTED
0000E68D BDE6E8       I           JSR     NSELNOV        ; VERIFY IT IS SELECTED
0000E690 39           I           RTS                    ; DONE EXIT
                      I
                      I
                      I   ;STORE *****     STORE THE CONTENTS OF @ABSCC IN THE CORRECT NOVRAM LOCATION.
                      I   ;                @ABSCC HOLDS THE VARIABLE THAT IS INCREMENTED BY THE OPERATOR.
                      I
                      I   ;
                      I   ;USES REGISTERS - ACCA, ACCB, ACCD, @YREG, @YREG+1
                      I   ;
                      I   ;CALLS ROUTINES - RUNWRT(RUNSND, NDESNOV, NSELNOV)
                      I   ;               - RUNRED(RUNSND, RUNREC, NDESNOV, NSELNOV)
                      I   ;
                      I   ;EXPECTS DATA   - VALID @ANALOG
                      I   ;
                      I   ;RETURNS DATA   - NONE
                      I   ;
0000E691 BDE678       I   STORE   JSR     RECALL
0000E694 9681         I           LDA A   @ANALOG        ;GET THE CURRENT PARAMETER NUMBER. IF WE'RE IN
0000E696 2602         I           BNE     STORE0         ;PARAMETER NUMBER ZERO, DON'T STORE ANYTHING.
0000E698 2041         I           BRA     STORE2         ;BUT CHECK THE CHECKSUM AND RETURN.
0000E69A DCBE         I   STORE0  LDD     @ABSCC
0000E69C DD88         I           STD     @YREG
0000E69E 9681         I           LDA A   @ANALOG
0000E6A0 BDE78E       I           JSR     RUNWRT
0000E6A3 860E         I           LDA A   #14            ;GET THE CONTENTS OF THE NOVRAM REGISTER THAT
0000E6A5 BDE773       I           JSR     RUNRED         ;CONTAINS THE NUMBER OF WRITES TO THE DEVICE,
0000E6A8 DC88         I           LDD     @YREG          ;GET THE NUMBER TO ACCD AND SUBTRACT
0000E6AA 8303E8       I           SUBD    #1000          ;THE MAX PERMISSIBLE NUMBER OF WRITES
0000E6AD 2B04         I           BMI     STORE1         ;IF LESS THAN MAX, CONTINUE.
0000E6AF 86FF         I           LDA A   #0FFH          ;IF TOO MANY WRITES, GENERATE AN ERROR
0000E6B1 202B         I           BRA     STORE3         ;MESSAGE IN ACCA AND RETURN
0000E6B3 DC88         I   STORE1  LDD     @YREG          ;IF NOT TO MANY WRITES,
0000E6B5 C30001       I           ADDD    #01            ;ADD ONE TO THE NUMBER OF WRITES
0000E6B8 DD88         I           STD     @YREG
0000E6BA 860E         I           LDA A   #14            ;STORE THE NEW NUMBER OF WRITES
0000E6BC BDE78E       I           JSR     RUNWRT
0000E6BF BDE651       I           JSR     FIXSUM         ;FIX THE CHECKSUM
0000E6C2 BDE68A       I           JSR     WIGGLE         ;THE NOVRAM ONLY RECOGNIZES CONTROL WORD START
                      I                                  ;BITS ON THE FIRST CLOCK PULSE FOLLOWING CE
0000E6C5 8684         I           LDA A   #10000100B     ;LDA ACCA WITH THE CONTROL WORD TO ENABLE
0000E6C7 BDE6F1       I           JSR     CALSND         ;WRITES TO THE NOVRAM AND SEND THE WORD.
0000E6CA BDE68A       I           JSR     WIGGLE         ;THE NOVRAM ONLY RECOGNIZES CONTROL WORD START
                      I                                  ;BITS ON THE FIRST CLOCK PULSE FOLLOWING CE
0000E6CD 8681         I           LDA A   #10000001B     ;LOAD THE NOVRAM STORE COMMAND WORD
0000E6CF BDE6F1       I           JSR     CALSND         ;AND SEND THE STORE COMMAND
0000E6D2 BDE6DF       I           JSR     NDESNOV
0000E6D5 CE0001       I           LDX     #1             ; 10 MS DELAY FOR STORE
0000E6D8 BDE094       I           JSR     DELAY          ; WAIT
0000E6DB BDE631       I   STORE2  JSR     CHKSUM
0000E6DE 39           I   STORE3  RTS
                      I
                      I   ;NDESNOV        *****   DE-SELECT THE NOVRAM
                      I   ;
```

```
                 I     ;USES REGISTERS - ACCB
                 I     ;
                 I     ;CALLS ROUTINES - NONE
                 I     ;
                 I     ;EXPECTS DATA   - NONE
                 I     ;
                 I     ;RETURNS DATA   - NONE
                 I
0000E6DF 0F      I     NDESNOV SEI                      ;ALWAYS DISABLE INTERRUPTS IN PORT FIDDLING
0000E6E0 D603    I             LDA B   @PORT2           ;GRAB THE CONTENTS OF PORT 2 AND SAVE
0000E6E2 C4F7    I             AND B   #11110111B       ;EVERYTHING EXCEPT BIT 1 (THE NOVRAM SELECT
0000E6E4 D703    I             STA B   @PORT2           ;BIT) AND WRITE IT BACK TO PORT 2
0000E6E6 0E      I             CLI
0000E6E7 39      I             RTS
                 I
                 I     ;NSELNOV xxxxx  SELECT THE NOVRAM
                 I     ;
                 I     ;USES REGISTERS - ACCB
                 I     ;
                 I     ;CALLS ROUTINES - NONE
                 I     ;
                 I     ;EXPECTS DATA   - NONE
                 I     ;
                 I
0000E6E8 0F      I     NSELNOV  SEI                     ;ALWAYS DISABLE INTERRUPTS IN PORT FIDDLING
0000E6E9 D603    I             LDA B   @PORT2           ;GRAB THE CONTENTS OF PORT 2 AND SAVE
0000E6EB CA08    I             ORA B   #00001000B       ;EVERYTHING, BUT MAKE BIT 1 (THE NOVRAM SELECT
0000E6ED D703    I             STA B   @PORT2           ;BIT) A ZERO AND SAVE THE STUFF IN PORT 2
0000E6EF 0E      I             CLI
0000E6F0 39      I             RTS
                 I
                 I     ;CALSND xxxxx   SEND AN 8-BIT WORD TO THE DCTU NOVRAM VIA THE CAL SERIAL COMM
                 I     ;               LINE NOTE THAT THERE ARE TWO SEPARATE COMM LINES TO THE NOVRAM,
                 I     ;               ONE FOR CALIBRATION MODE COMM (PORT 1-6) AND ONE FOR RUN MODE
                 I     ;               COMM (PORT 2-4).
                 I     ;
                 I     ;               RUNSND WORKS BY SHIFTING THE CONTENTS OF ACC A THRU THE CARRY
                 I     ;               BIT. IF THE CARRY IS SET YOU STORE A 1 AT THE PORT LINE AND
                 I     ;               TOGGLE THE CLOCK LINE. STORE A 0 AND DITTO IF THE CARRY ISN'T
                 I     ;               SET. ENTER THE ROUTINE WITH AN EIGHT BIT WORD IN ACC A. THE
                 I     ;               WORD IS SENT MSB FIRST.
                 I     ;
                 I     ;               THIS ROUTINE EXPECTS THE NOVRAM TO HAVE BEEN SELECTED.
                 I     ;
                 I     ;
                 I     ;USES REGISTERS - ACCA, ACCB, @COUNT
                 I     ;
                 I     ;CALLS ROUTINES - NONE
                 I     ;
                 I     ;EXPECTS DATA   - EIGHT BITS OF DATA IN ACCA
                 I     ;
                 I     ;RETURNS DATA   - NONE
                 I
0000E6F1 C608    I    CALSND  LDA B   #08              ;LOAD B WITH A BIT COUNTER
0000E6F3 D784    I            STA B   @COUNT           ;STUFF IT IN A @TEMP REGISTER
0000E6F5 C6FB    I            LDA B   #0FBH            ; SET UP THE CAL PIN AS AN OUTPUT
0000E6F7 D700    I            STA B   @DDR1            ;AND STORE THIS VALUE IN DDR1
0000E6F9 0F      I    CLSND1  SEI                      ;ALWAYS DISABLE INTERRUPTS IN PORT FIDDLING
0000E6FA D602    I            LDA B   @PORT1           ;BRING IN THE CURRENT STATE OF PORT 1
0000E6FC 48      I            LSL A                    ;SHIFT THE MSB OF ACCA INTO THE CARRY BIT
0000E6FD 2504    I            BCS     CLSND2           ;IF THERE'S A ONE IN THE CARRY, BRANCH TO SEND
0000E6FF C4BF    I            AND B   #10111111B       ;A ONE. IF THERE'S A ZERO, AND IN A ZERO, AND
0000E701 2002    I            BRA     CLSND3           ;BRANCH TO WRITE THE DATA.
0000E703 CA40    I    CLSND2  ORA B   #01000000B       ;IF THERE'S A ONE, OR IN A ONE.
0000E705 D702    I    CLSND3  STA B   @PORT1           ;STORE THE BIT AT PORT 1.
0000E707 0E      I            CLI
0000E708 01      I            NOP                      ;THIS SPACE IS HERE BECAUSE THE 6801 PROCESSOR
0000E709 0F      I            SEI                      ;ALWAYS EXECUTES THE INSTRUCTION FOLLOWING NOP
0000E70A D602    I            LDA B   @PORT1
0000E70C CA08    I            ORA B   #00001000B       ;TOGGLE THE CLOCK LINE, PORT 1-3.
0000E70E D702    I            STA B   @PORT1
```

```
1817 0000E710 C4F7    I           AND B   #11110111B
1818 0000E712 D702    I           STA B   @PORT1
1819 0000E714 0E      I           CLI
1820 0000E715 7A0084  I           DEC     COUNT           ;DO THE LOOP 8 TIMES
1821 0000E718 260F    I           BNE     CLSND1
1822 0000E71A C6BB    I           LDA B   #0BBH           ; MAKE TYHE CAL DATA PIN AN INPUT TO AVOID
1823 0000E71C D700    I           STA B   @DDR1           ; BUS CONFLICT
1824 0000E71E 39      I           RTS
1825                  I           ;
1826                  I   ;RUNSND xxxxx SEND A WORD TO THE OCTU NOVRAM VIA THE RUN SERIAL COMM LINE
1827                  I   ;            NOTE THAT THERE ARE TWO SEPARATE COMM LINES TO THE NOVRAM, ONE
1828                  I   ;            FOR CALIBRATION MODE COMM (PORT 1-6) AND ONE FOR RUN MODE
1829                  I   ;            COMM (PORT 2-4).
1830                  I   ;
1831                  I   ;            RUNSND WORKS BY SHIFTING THE CONTENTS OF ACC A THRU THE CARRY
1832                  I   ;            BIT. IF THE CARRY IS SET YOU STORE A 1 AT THE PORT LINE AND
1833                  I   ;            TOGGLE THE CLOCK LINE. STORE A 0 AND DITTO IF THE CARRY ISN'T
1834                  I   ;            SET. ENTER THE ROUTINE WITH AN EIGHT BIT WORD IN ACC A. THE
1835                  I   ;            WORD IS SENT MSB FIRST.
1836                  I   ;
1837                  I   ;USES REGISTERS - ACCA, ACCB, COUNT
1838                  I   ;
1839                  I   ;CALLS ROUTINES - WIGGLE(DESNOV, SELNOV)
1840                  I   ;
1841                  I   ;EXPECTS DATA   - EIGHT BITS OF DATA IN ACCA
1842                  I   ;
1843                  I   ;RETURNS DATA   - NONE
1844                  I   ;
1845                  I
1846 0000E71F C608    I   RUNSND  LDA B   #08             ;LOAD B WITH A BIT COUNTER
1847 0000E721 D784    I           STA B   @COUNT          ;STUFF IT IN A TEMP REGISTER
1848 0000E723 C6FD    I           LDA B   #0FDH           ;PORT 2 ALL OUTPUTS
1849 0000E725 D701    I           STA B   @DDR2           ;AND STORE THIS VALUE IN DDR2
1850 0000E727 0F      I   RNSND1  SEI                     ;ALWAYS DISABLE INTERRUPTS IN PORT FIDDLING
1851 0000E728 D603    I           LDA B   @PORT2          ;BRING IN THE CURRENT STATE OF PORT 2
1852 0000E72A 48      I           LSL A                   ;SHIFT THE MSB OF ACCA INTO THE CARRY BIT
1853 0000E72B 2504    I           BCS     RNSND2          ;IF THERE'S A ONE IN THE CARRY, BRANCH TO SEND
1854 0000E72D C4EF    I           AND B   #11101111B      ;A ONE. IF THERE'S A ZERO, AND IN A ZERO, AND
1855 0000E72F 2002    I           BRA     RNSND3          ;BRANCH TO WRITE THE DATA.
1856 0000E731 CA10    I   RNSND2  ORA B   #00010000B      ;IF THERE'S A ONE, OR IN A ONE.
1857 0000E733 D703    I   RNSND3  STA B   @PORT2          ;STORE THE BIT AT PORT 1.
1858 0000E735 0E      I           CLI
1859 0000E736 01      I           NOP                     ;THIS SPACE IS HERE BECAUSE THE 6801 PROCESSOR
1860 0000E737 0F      I           SEI                     ;ALWAYS EXECUTES THE INSTRUCTION FOLLOWING NOP
1861 0000E738 D602    I           LDA B   @PORT1
1862 0000E73A CA08    I           ORA B   #00001000B      ;TOGGLE THE CLOCK LINE, PORT 1-3.
1863 0000E73C D702    I           STA B   @PORT1
1864 0000E73E C4F7    I           AND B   #11110111B
1865 0000E740 D702    I           STA B   @PORT1
1866 0000E742 0E      I           CLI
1867 0000E743 7A0084  I           DEC     COUNT           ;DO THE LOOP 8 TIMES
1868 0000E746 26DF    I           BNE     RNSND1
1869 0000E748 C600    I           LDA B   #000H           ; MAKE THE DATA LINE AN INPUT TO AVOID CONFLICT
1870 0000E74A D701    I           STA B   @DDR2
1871 0000E74C 39      I           RTS
1872                  I
1873                  I   ;RUNREC xxxxx RECEIVE AN 8 BIT WORD FROM THE OCTU NOVRAM VIA THE RUN SERIAL
1874                  I   ;            COMM LINE. NOTE THAT THERE ARE TWO SEPARATE COMM LINES TO THE
1875                  I   ;            NOVRAM ONE FOR CALIBRATION MODE COMM (PORT 1-6) AND ONE FOR RUN
1876                  I   ;            MODE COMM (PORT 2-4).
1877                  I   ;
1878                  I   ;            RUNREC WORKS BY READING THE STATUS OF PORT 1, ANDING AWAY ALL
1879                  I   ;            OF THE BITS EXCEPT BIT 6, SETTING THE CARRY TO THE CONDITION OF
1880                  I   ;            BIT 6 AND ROLLING THE CARRY INTO ACCA.
1881                  I
1882                  I   ;            EXIT WITH THE WORD IN ACCB.
1883                  I   ;
1884                  I   ;USES REGISTERS - ACCA, ACCB, COUNT
1885                  I   ;
1886                  I   ;CALLS ROUTINES - WIGGLE(SELNOV,NOESNOV)
```

```
                        I     ;
                        I     ;EXPECTS DATA   - NONE
                        I     ;
                        I     ;RETURNS DATA   - EIGHT BITS OF DATA IN ACCA
                        I     ;
                        I
0000E74D C608           I     RUNREC  LDA B   #08             ;LOAD A WITH A BIT COUNTER
0000E74F D784           I             STA B   @COUNT          ;STUFF IT IN A TEMP REGISTER
0000E751 C600           I             LDA B   #00DH           ;MAKE THE DATA LINE AN INPUT
0000E753 D701           I             STA B   @DDR2           ;AND STORE THIS VALUE IN DDR2
0000E755 4F             I             CLR A                   ;CLEAR ACCA TO RECEIVE THE INCOMING BITS
0000E756 D603           I     RNREC1  LDA B   @PORT2          ;BRING IN THE CURRENT STATE OF PORT 1
0000E758 C410           I             AND B   #00010000B      ;SAVE ONLY CAL SERIAL LINE
0000E75A 2603           I             BNE     RNREC2          ;IF NOT EQUAL TO ZERO BRANCH TO SET THE CARRY.
0000E75C 0C             I             CLC                     ;IF BIT IS ZERO CLEAR THE CARRY.
0000E75D 2001           I             BRA     RNREC3
0000E75F 00             I     RNREC2  SEC
0000E760 49             I     RNREC3  ROL A                   ;PUSH THE CARRY IN FROM THE RIGHT (MSB FIRST)
0000E761 0F             I             SEI             ;
0000E762 D602           I             LDA B   @PORT1
0000E764 CA08           I             ORA B   #00001000B      ;TOGGLE THE CLOCK LINE, PORT 1-3.
0000E766 D702           I             STA B   @PORT1
0000E768 C4F7           I             AND B   #11110111B
0000E76A D702           I             STA B   @PORT1
0000E76C 0E             I             CLI
0000E76D 7A0084         I             DEC     COUNT           ;DO THE LOOP 8 TIMES
0000E770 26E4           I             BNE     RNREC1
0000E772 39             I             RTS
                        I
                        I     ;RUNRED *****   THIS ROUTINE READS A 16 BIT NUMBER FROM A RAM LOCATION IN THE
                        I     ;               NOVRAM OVER THE RUN SERIAL LINE. ENTER WITH THE THE FOUR-BIT
                        I     ;               NOVRAM ADDRESS IN THE LOW BITS OF ACCA. EXIT WITH THE SIXTEEN
                        I     ;               BIT NUMBER IN ZREG AND ZREG+1.
                        I     ;
                        I     ;USES REGISTERS - ACCA, ACCB, COUNT, ZREG, ZREG+1
                        I     ;
                        I     ;CALLS ROUTINES - RUNSND(WIGGLE(DESNOV, SELNOV))
                        I     ;               - RUNREC(WIGGLE(DESNOV, SELNOV))
                        I     ;
                        I     ;EXPECTS DATA   - NOVRAM ADDRESS IN RANGE 0-15 IN ACCA
                        I     ;
                        I     ;RETURNS DATA   - 16 BIT NUMBER IN ZREG:ZREG+1
                        I     ;
                        I
0000E773 840F           I     RUNRED  AND A   #00001111B      ;FIRST, SAVE ONLY THE ADDRESS BITS, AND SHIFT
0000E775 48             I             LSL A                   ;THEM INTO THE CORRECT POSITION
0000E776 48             I             LSL A
0000E777 48             I             LSL A
0000E778 8A86           I             ORA A   #10000110B      ;OR IN THE CORRECT LEADING AND TRAILING BITS
0000E77A BDE68A         I             JSR     WIGGLE          ; SELECT THE NOVRAM
0000E77D BDE71F         I             JSR     RUNSND          ;FOR THE  READ-FROM-RAM INSTRUCTION AND SEND IT
0000E780 BDE74D         I             JSR     RUNREC          ;THEN IMMEDIATELY RECEIVE THE RAM CONTENTS AND
0000E783 9788           I             STA A   YREG            ;STICK IT IN YREG AND YREG+1.
0000E785 BDE74D         I             JSR     RUNREC
0000E788 9789           I             STA A   YREG+1
0000E78A BDE60F         I             JSR     NDESNOV         ; SDESELETC THE NIOV
0000E78D 39             I             RTS
                        I
                        I     ;RUNWRT *****   THIS ROUTINE WRITES A 16 BIT NUMBER TO A RAM LOCATION IN THE
                        I     ;               NOVRAM OVER THE RUN SERIAL LINE. ENTER WITH THE SIXTEEN BIT
                        I     ;               NUMBER IN ZREG AND ZREG+1, AND THE THE FOUR-BIT NOVRAM ADDRESS
                        I     ;               IN THE LOW BITS OF ACCA.
                        I     ;
                        I     ;USES REGISTERS - ACCA, ACCB, COUNT, ZREG, ZREG+1
                        I     ;
                        I     ;CALLS ROUTINES - RUNSND(WIGGLE(DESNOV, SELNOV))
                        I     ;
                        I     ;EXPECTS DATA   - NOVRAM ADDRESS IN RANGE 0-15 IN ACCA
                        I     ;               - 16 BIT NUMBER IN ZREG:ZREG+1
                        I     ;
```

```
                       I     ;RETURNS DATA   - NONE
                       I     ;
0000E78E 9782          I     RUNWRT  STA A   @TEMP
0000E790 BDE68A        I             JSR     WIGGLE
0000E793 8684          I             LDA A   #10000100B
0000E795 BDE71F        I             JSR     RUNSND
0000E798 BDE68A        I             JSR     WIGGLE
0000E79B 9682          I             LDA A   @TEMP
0000E79D 840F          I             AND A   #00001111B
0000E79F 48            I             LSL A
0000E7A0 48            I             LSL A
0000E7A1 48            I             LSL A
0000E7A2 8A83          I             ORA A   #10000011B
0000E7A4 BDE71F        I             JSR     RUNSND
0000E7A7 9688          I             LDA A   @YREG
0000E7A9 BDE71F        I             JSR     RUNSND
0000E7AC 9689          I             LDA A   @YREG+1
0000E7AE BDE71F        I             JSR     RUNSND
0000E7B1 BDE6DF        I             JSR     NDESNOV
0000E7B4 39            I             RTS
                       I                                 ;
                       I                                 ;
                       I
                       I
                                   INCLUDE 'idctu.asm'
                       I             ;
                       I
                       I             ;xxxxxxxxxxxxxxxxxxxxxxxxxxxxxxxxxxxxxxxxxxxxxxxxxxxxxxxxxxxxxxxxxxxxxx
                       I
0000E7B5 BDE631        I     IDCTU    JSR  CHKSUM          ; DO CHECKSUM ON DCTU
0000E7B8 2706          I              BEQ  IDCTU0          ; GOOD CHECKSUM BRANCH TO CHECK CALRAM
                       I              ;
0000E7BA CE0007        I              LDX  #7              ; ERROR CODE FOR DCTU FAILURE
0000E7BD BDE0A0        I              JSR  IERROR          ; CALL INITILIZATION ERROR
                       I              ;'
0000E7C0 BDE9C9        I     IDCTU0   JSR  STCHKSUM        ; DO CHECKSUM ON CALRAM
0000E7C3 C100          I              CMP B #0             ; IS IT A GOOD CHECKSUM?
0000E7C5 2706          I              BEQ   IDCTU1         ; YES , BRANCH TO LOAD
                       I              ;
                       I              ;
0000E7C7 CE0009        I              LDX   #9             ; CALRAM ERROR CODE
0000E7CA BDE0A0        I              JSR   IERROR         ; LOG IT AND DIE
                       I              ;
0000E7CD 8600          I     IDCTU1   LDA A #0             ; FIRST WORD TO READ IS 2
0000E7CF 9780          I              STA A @WORK          ; STORE IN WORK
                       I              ;
0000E7D1 9680          I     RDCALRAM LDA A @WORK          ; WORD TO READ
0000E7D3 978C          I              STA A @ZFLAG         ; PASS IN ZFLAG
0000E7D5 BDEA9D        I              JSR   STREADWD       ; READ FROM CALRAM
0000E7D8 DF82          I              STX   @TEMP          ; SAVE IN TEMP
0000E7DA CE009D        I              LDX   #NCBUF         ; BASE OFFSET FOR STORES
0000E7DD D680          I              LDA B @WORK          ; ADJUST INDEX TO TABLE
0000E7DF 3A            I              ABX                  ; ADD OFFSET
0000E7E0 9683          I              LDA A @TEMP+1        ; GET DEVIATION VALUE
0000E7E2 A700          I              STA A 0,X            ; STORE IN NCBUFFER
0000E7E4 7C0080        I              INC    WORK          ; BUMP TO NEXT WORD
0000E7E7 9680          I              LDA A @WORK          ; READ WORD NUMBER
0000E7E9 810A          I              CMP A #10            ; COMPARE TO 12
0000E7EB 26E4          I              BNE   RDCALRAM       ; NOT DONE LOOP AGAIN
                       I              ;
0000E7ED 8601          I     IDCTU2   LDA A #1             ; READ LBS/KGS
0000E7EF BDE773        I              JSR   RUNRED         ; READ FROM DCTURAM
0000E7F2 DC88          I              LDD   @YREG          ; RETURN WORD
0000E7F4 2706          I              BEQ   IDCTU3         ; ITS LBS SO SKIP STATUS UPDATE
                       I              ;
0000E7F6 968D          I              LDA A @STATUS        ; READ STATUS REGISTAR
0000E7F8 8A40          I              ORA A #01000000B     ; OR IN KGS BIT
0000E7FA 978D          I              STA A @STATUS        ; RESTORE STATUS
                       I              ;
0000E7FC 8602          I     IDCTU3   LDA A #2             ; READ MAX FUEL
```

```
0000E7FE BDE773   I            JSR   RUNRED        ; READ FROM DCTU RAM
0000E801 DC88     I            LDD  @YREG
0000E803 DDB2     I            STD  @TOTFUEL       ; STORE IN TOTAL FUEL
                  I            ;
0000E805 8603     I            LDA A #3            ; READ DRY TANK
0000E807 BDE773   I            JSR   RUNRED        ; READ FROM DCTU RAM
0000E80A DC88     I            LDD  @YREG
0000E80C DDB4     I            STD  @TKEMPTY       ; STORE IN TANK EMPTY
                  I            ;
0000E80E 8604     I            LDA A #4            ; READ WET TANK
0000E810 BDE773   I            JSR   RUNRED        ; READ FROM DCTU RAM
0000E813 DC88     I            LDD  @YREG
0000E815 DDB6     I            STD  @TKRANGE       ; STORE IN TANK RANGE
                  I            ;
0000E817 8606     I            LDA A #6            ; READ WET COMPENSATOR
0000E819 BDE773   I            JSR   RUNRED        ; READ FROM DCTU RAM
0000E81C DC88     I            LDD  @YREG
0000E81E DDBA     I            STD  @CCFULL        ; STORE IN CC CAPACITANCE
                  I            ;
0000E820 8607     I            LDA A #7            ; READ ZERO OFFSET
0000E822 BDE773   I            JSR   RUNRED        ; READ FROM DCTU RAM
0000E825 DC88     I            LDD   @YREG
0000E827 830200   I            SUBD  #512          ; SUBTRACT REAL ZERO
0000E82A DDDC     I            STD   @CCVAL        ; TEMPORARY VALUE
                  I            ;
0000E82C 8608     I            LDA A #8            ; READ FULL SCALE OFFSET
0000E82E BDE773   I            JSR   RUNRED        ; READ FROM DCTU RAM
0000E831 DC88     I            LDD   @YREG
0000E833 830200   I            SUBD  #512          ; SUBTRACT REAL ZERO
0000E836 DDBE     I            STD   @ABSCC        ; TEMPORARY VALUE
                  I            ;
0000E838 DCB6     I            LDD  @TKRANGE       ; LOAD WET TANK
0000E83A 05       I            ASLD                ; MULTIPLY
0000E83B DDC1     I            STD  @ARG1+1        ; STORE IN ARG 1
0000E83D CC0000   I            LDD  #0             ; CLEAR DOUBLE ACCUM
0000E840 97C0     I            STA A @ARG1         ; CLEAR MSB OF ARG1
0000E842 DDC3     I            STD  @ARG2          ; CLEAR 2 MSB OF ARG2
0000E844 8603     I            LDA A #3            ; DIVIDE BY 3 CONSTANT
0000E846 97C5     I            STA A @ARG2+2       ; PLACE A 3 IN ARG2
0000E848 BDF2BC   I            JSR   DIV24         ; DIVIDE IT
0000E84B DCC7     I            LDD   @RES+1        ; READ RESULT
0000E84D 93B4     I            SUBD  @TKEMPTY      ; SUBTRACT DRY TANK
0000E84F 2406     I            BCC   TNKOK         ; DRY <= 2/3 WET  IS OK
                  I            ;
0000E851 CE0008   I    DCERR   LDX   #8            ; DCTU DATA ERROR
0000E854 BDE0A0   I            JSR   IERROR        ; CALL INITILIZATION ERROR
                  I            ;
0000E857 DCBA     I    TNKOK   LDD   @CCFULL       ; READ WET COMPENSATOR
0000E859 C30334   I            ADDD  #820          ; ADD IN REG CAP
0000E85C 93B6     I            SUBD  @TKRANGE      ; COMPARE TO TANK FULL
0000E85E 24F1     I            BCC    DCERR        ; TNKRANGE < CC+CK
                  I
0000E860 BDE868   I    ALLOK   JSR  SETCONS
                  I            ;
0000E863 39       I    NOP1    RTS
                             INCLUDE 'setcons.asm'
                  I            LIST    DBG
                  I                                       ;
                  I                                       ;
                  I                                       ;
                  I    ; xxxxxxxxxxxxxxxxxxxxxxxxxxxxxxxxxxxxxxxxxxxxxxxxxxxxxxxxxxxxxxxxx
                  I    ; xxx
                  I    ; xxx   ASSEMBLER DIRECTIVES
                  I    ; xxx
                  I    ; xxx   VALID ENTRY POINTS
                  I    ; xxx
                  I    ; xxx   EXTERNAL SUBROUTINES USED
                  I    ; xxx
                  I    ; xxx   EXTERNAL VARIABLES USED
                  I    ; xxx
```

```
                I   ; ***
                I   ; ***********************************************************************
                I                                          ;
                I                                          ;
0000E864 0334   I   REGCK   WORD   820
0000E866 0E10   I   DCNFULL WORD   3600
                I                                          ;
                I                                          ;
                I   ; ***********************************************************************
                I   ; ***
                I   ; ***   NAME:    SETCONS
                I   ; ***
                I   ; ***            SET CONSTANTS FOR COMPUTING FUEL WEIGHT AND DAC
                I   ; ***            DRIVE CONSTANTS.
                I   ; ***
                I   ; ***   EXPECTS: DCTU VALUES READ INTO VARIABLES
                I   ; ***                TOTFUEL - MAXIMUM FUEL WEIGHT, UNITLESS/10
                I   ; ***                TKEMPTY - DRY TANK PROBE CAPACITANCE, PF*10
                I   ; ***                TKRANGE - WET TANK PROBE CAPACITANCE, PF*10
                I   ; ***                CCFULL  - WET COMP PROBE CAPACITANCE, PF*10
                I   ; ***            CALIBRATION RAM READ INTO VARIABLES
                I   ; ***                NCBUF   - CALIBRATION RAM PARAMETER CAL 10
                I   ; ***                NCBUF+1 - CALIBRATION RAM PARAMETER CAL 8
                I   ; ***                NCBUF+2 - CALIBRATION RAM PARAMETER CAL 4
                I   ; ***                NCBUF+3 - CALIBRATION RAM PARAMETER CAL 2
                I   ; ***   ALTERS:  ARG1, ARG2, RES, NCBUF, ZREG, 6301 REGS A, B, AND X
                I   ; ***   CALLS:   LINT1, LINT2, ADD24, SUB24, MUL24, DIV24
                I   ; ***   RETURNS: DAC DRIVE CONSTANTS IN VARIABLES
                I   ; ***                TKEMPTY - COMP DRIVE DAC VALUE FOR TANK EMPTY
                I   ; ***                TKRANGE - COMP DRIVE FOR FULL - COMP DRIVE FOR EMPTY
                I   ; ***                NCBUF+4 - TANK DRIVE FOR CC+CK NULLING
                I   ; ***                VCBUF+4 - TANK DRIVE FOR CK NULLING
                I   ; ***
                I   ; ***                   3600 * CK
                I   ; ***   COMPUTE DTCK = -----------
                I   ; ***                     CTFULL
                I   ; ***
                I   ; ***   MULTIPLY CK BY 3600
                I   ; ***
                I   ; ***********************************************************************
                I                                          ;
                I                                          ;
0000E868 CCEA60 I   SETCONS LDD    #60000                  ;
0000E86B DD8E   I           STD    @DEDTIM                 ;
0000E86D CEE864 I           LDX    #REGCK                  ; POINT TO THE CK VALUE CONSTANT
0000E870 BDF1C6 I           JSR    LINT1                   ; MOVE IT TO ARGUMENT 1
0000E873 CEE866 I           LDX    #DCNFULL                ; POINT TO NOMINAL COMP DRIVE DAC VALUE
0000E876 BDF1D3 I           JSR    LINT2                   ; FOR A FULL TANK, MOVE TO ARGUMENT 2
0000E879 BDF222 I           JSR    MUL24                   ; MULTIPLY
                I                                          ;
                I   ; *** NOW DIVIDE BY CTFULL
                I                                          ;
0000E87C DCB6   I           LDD    @TKRANGE                ; GET THE WET TANK PROBE CAP VALUE
0000E87E DDC4   I           STD    @ARG2+1                 ; MOVE IT TO ARG2
0000E880 4F     I           CLR A                          ; CLEAR REGISTER A
0000E881 97C3   I           STA A  @ARG2                   ; AND THE HIGH ORDER OF ARG 2
0000E883 BDF2BC I           JSR    DIV24                   ; DO THE DIVIDE
                I                                          ;
                I   ;       MOVE DTCK TO VCBUF+4
                I                                          ;
0000E886 DCC7   I           LDD    @RES+1                  ; GET THE RESULT
0000E888 DDA9   I           STD    @VCBUF+4                ; AND MOVE IT TO VCBUF+4
                I                                          ;
                I   ;                    3600 * (CK + CCFULL)
                I   ;    COMPUTE DTCCCK = --------------------
                I   ;                           CTFULL
                I                                          ;
                I   ;       START BY ADDING CK + CCFULL AND STORING IN ZREG
                I                                          ;
0000E88A CEE864 I           LDX    #REGCK                  ; POINT TO THE CK VALUE CONSTANT
```

```
0000E88D BDF1C6   I          JSR    LINT1          ; MOVE IT TO ARGUMENT 1
0000E890 CE008A   I          LDX    #CCFULL        ; POINT AT THE CC WET VALUE
0000E893 BDF1D3   I          JSR    LINT2          ; MOVE IT TO ARGUMENT 2
0000E896 BDF1E0   I          JSR    ADD24          ; ADD THEM
0000E899 DCC7     I          LDD    @RES+1         ; SAVE THIS VALUE FOR LATER
0000E89B DD8A     I          STD    @ZREG          ;
                  I                                ;
                  I                                ;
                  I     ;    NOW MULTIPLY BY 3600
                  I                                ;
0000E89D CEE866   I          LDX    #DCNFULL       ; POINT TO NOMINAL COMP DRIVE DAC VALUE
0000E8A0 BDF1D3   I          JSR    LINT2          ; FOR A FULL TANK, MOVE TO ARGUMENT 2
0000E8A3 BDF222   I          JSR    MUL24          ; MULTIPLY BY THE CK + CCFULL SUM
                  I                                ;
                  I     ;    NOW DIVIDE BY CTFULL
                  I                                ;
0000E8A6 DCB6     I          LDD    @TKRANGE       ; GET THE WET TANK PROBE CAP VALUE
0000E8A8 DDC4     I          STD    @ARG2+1        ; MOVE IT TO ARG2
0000E8AA 4F       I          CLR A                 ; CLEAR REGISTER A
0000E8AB 97C3     I          STA A  @ARG2          ; AND THE HIGH ORDER OF ARG 2
0000E8AD BDF2BC   I          JSR    DIV24          ; DO THE DIVIDE
                  I                                ;
                  I     ;    MOVE DTCCCK TO NCBUF+4
                  I                                ;
0000E8B0 DCC7     I          LDD    @RES+1         ; GET THE RESULT
0000E8B2 DD88     I          STD    @YREG          ; AND MOVE IT TO YREG
                  I                                ;
                  I     ;                        DTCCCK * CTEMPTY
                  I     ;    COMPUTE TKEMPTY = ----------------
                  I     ;                           CCFULL+CK
                  I                                ;
0000E8B4 DCB4     I          LDD    @TKEMPTY       ; GET THE EMPTY TANK CAPACITANCE
0000E8B6 DDC4     I          STD    @ARG2+1        ; MOVE TO ARG2
0000E8B8 4F       I          CLR A                 ; CLEAR THE HIGH ORDER
0000E8B9 97C3     I          STA A  @ARG2          ;
0000E8BB BDF222   I          JSR    MUL24          ; MULTIPLY THEM
                  I                                ;
                  I     ;    NOW DIVIDE BY CCFULL + CK
                  I                                ;
0000E8BE CE008A   I          LDX    #ZREG          ; MOVE THE SUM TO ARG2
0000E8C1 BDF1D3   I          JSR    LINT2          ;
0000E8C4 BDF2BC   I          JSR    DIV24          ; DIVIDE INTO DTCCCK * CTEMPTY
                  I                                ;
                  I                                ;
0000E8C7 DCC7     I          LDD    @RES+1         ; MOVE RESULT TO TKEMPTY
0000E8C9 DDB4     I          STD    @TKEMPTY       ;
                  I                                ;
                  I     ;                        DTCCCK * CTFULL
                  I     ;    COMPUTE TKRANGE = --------------- - TKEMPTY
                  I     ;                          CCFULL + CK
                  I                                ;
0000E8CB DCB6     I          LDD    @TKRANGE       ; GET THE FULL TANK CAPACITANCE
0000E8CD DDC4     I          STD    @ARG2+1        ; MOVE TO ARG2
0000E8CF 4F       I          CLR A                 ; CLEAR THE HIGH ORDER
0000E8D0 97C3     I          STA A  @ARG2          ;
0000E8D2 CE0088   I          LDX    #YREG          ; POINT TO DTCCCK
0000E8D5 BDF1C6   I          JSR    LINT1          ; MOVE TO ARG 1
0000E8D8 BDF222   I          JSR    MUL24          ; MULTIPLY THEM
                  I                                ;
                  I     ;    NOW DIVIDE BY CCFULL + CK
                  I                                ;
0000E8DB CE008A   I          LDX    #ZREG          ; MOVE THE SUM TO ARG2
0000E8DE BDF1D3   I          JSR    LINT2          ;
0000E8E1 BDF2BC   I          JSR    DIV24          ; DIVIDE INTO DTCCCK * CTEMPTY
                  I                                ;
                  I     ;    NOW SUBTRACT TKEMPTY
                  I                                ;
0000E8E4 CE00B4   I          LDX    #TKEMPTY       ; POINT TO TKEMPTY
0000E8E7 BDF1D3   I          JSR    LINT2          ; MOVE TO ARG2
0000E8EA BDF201   I          JSR    SUB24          ; COMPUTE THE DIFFERENCE
```

```
0000E8ED DCC7     I            LDD     @RES+1         ; MOVE THE RESULT TO TKRANGE
0000E8EF DDB6     I            STD     @TKRANGE       ;
                  I                                   ;
                  I                                   ;
                  I                                   ;
0000E8F1 7F0090   I   DEVIATE CLR      MODNUM         ; TEMPORARY FLAG FOR CAL BANK
0000E8F4 DC88     I            LDD     @YREG          ; READ COMPUTED TANK DRIVE
0000E8F6 830643   I            SUBD    #1603          ; SUBTRACT MIDPOINT
0000E8F9 2403     I            BCC     DEVIAT1        ; LESS THAN USE BANK 0
0000E8FB 7C0090   I            INC     MODNUM         ; BUMP TO USE BANK ONE
                  I                                   ;
                  I                                   ;
                  I   ;        DEV EMPTY = C<3+2X> - ( DTCCCK - DR<X> ) ( C<3+2X> - C<1+2X> ) / 1056
                  I                                   ;
                  I                                   ;
0000E8FE CE00A0   I   DEVIAT1 LDX      #NCBUF+3       ; OFFSET TO START OF BUFFER
0000E901 D690     I            LDA B   @MODNUM        ; POINT AT OFFSET
0000E903 58       I            ASL B                  ; MULTIPLY BY 2
0000E904 3A       I            ABX                    ;
0000E905 DF8A     I            STX     @ZREG          ; HOLD OFFSET
                  I                                   ;
0000E907 A600     I            LDA A   0,X            ; C<1+2X>  HIGH DRIVE
0000E909 E602     I            LDA B   2,X            ; C<3+2X>  LOW DRIVE
0000E90B BDE987   I            JSR     DEVCAL         ; CALCULATE DEVIATION
0000E90E DDA7     I            STD     @VCBUF+2       ; SAVE IT
                  I                                   ;
                  I                                   ;
                  I   ;        DEV FULL = C<4+2X> - ( DTCCCK - DR<X> ) ( C<4+2X> - C<2+2X> ) / 1056
                  I                                   ;
0000E910 DE8A     I            LDX     @ZREG          ; RESTORE OFFSET
0000E912 A601     I            LDA A   1,X            ; C<2+2X>  HIGH DRIVE
0000E914 E603     I            LDA B   3,X            ; C<4+2X>  LOW DRIVE
0000E916 BDE987   I            JSR     DEVCAL         ; CALCULATE DEVIATION
0000E919 DDAB     I            STD     @VCBUF+6       ; SAVE IT
                  I                                   ;
                  I   ;        DEV VCOMP =  P<1+X> - ( DTCCCK - DR<X> ) ( C<1+X> - C<X> ) / 1056
                  I                                   ;
                  I                                   ;
0000E91B CE009D   I            LDX     #NCBUF         ; POINT AT BUFFER
0000E91E D690     I            LDA B   @MODNUM        ; OFFSET IN MODNUM
0000E920 3A       I            ABX
0000E921 A600     I            LDA A   0,X            ; HIGH DRIVE
0000E923 E601     I            LDA B   1,X            ; LOW DRIVE
0000E925 BDE987   I            JSR     DEVCAL         ; CALCULATE DEVIATION
0000E928 05       I            ASLD                   ; MULTIPLY BY 2
0000E929 05       I            ASLD                   ; MULTIPLY BY 4
0000E92A DDB8     I            STD     @VCOFF         ; SAVE IN VC OFFSET
                  I                                   ;
                  I   ;        TKEMPTY = TKEMPTY - DEV EMPTY
                  I                                   ;
0000E92C DCB4     I            LDD     @TKEMPTY
0000E92E 93A7     I            SUBD    @VCBUF+2       ; DEVIATION IN EMPTY
0000E930 DDB4     I            STD     @TKEMPTY       ; RESTORE TO TKEMPTY
                  I                                   ;
                  I   ;        TKRANGE = TKRANGE - DEV FULL + DEV EMPTY
                  I                                   ;
0000E932 DCB6     I            LDD     @TKRANGE
0000E934 93AB     I            SUBD    @VCBUF+6       ; DEVIATION FOR FULL
0000E936 D3A7     I            ADDD    @VCBUF+2       ; DEVIATION FOR EMPTY
0000E938 DDB6     I            STD     @TKRANGE       ; RESTORE TO TKEMPTY
                  I                                   ;
0000E93A DC88     I            LDD     @YREG
0000E93C DDA1     I            STD     @NCBUF+4       ; SAVE IN TANK DRIVE VC
                  I                                   ;
                  I            ;
                  I            ;
                  I            ;  VCOFF = VCOFF - ZERO ADJ * TKRANGE / TOTFUEL
                  I            ;
0000E93E CE000C   I            LDX     #CCVAL         ; POINT AT ZERO ADJUST
0000E941 BDF1C6   I            JSR     LINT1          ; LOAD INTO ARG1
```

```
0000E944 CE00B6   I          LDX    #TKRANGE       ; POINT AT TKRANGE
0000E947 BDF1D3   I          JSR    LINT2          ; LOAD INTO ARG2
0000E94A BDF222   I          JSR    MUL24          ; MULTIPLY
0000E94D CE00B2   I          LDX    #TOTFUEL       ; POINT AT TOTAL FUEL
0000E950 BDF1D3   I          JSR    LINT2          ; LOAD INTO ARG2
0000E953 BDF2BC   I          JSR    DIV24          ; DIVIDE IT
                  I          ;
0000E956 DCB8     I          LDD    @VCOFF         ; LOAD IN VCOFFSET
0000E958 93C7     I          SUBD   @RES+1         ; SUBTRACT ZERO ADJUST
0000E95A DDB8     I          STD    @VCOFF         ; RESTORE TO VCOFFSET
                  I          ;
                  I          ;
                  I          ;  TKRANGE = TKRANGE + FULL ADJ * TKRANGE / ( TOTFUEL - FULL ADJ )
                  I          ;
0000E95C CE00BE   I          LDX    #ABSCC         ; POINT AT FULL ADJUST
0000E95F BDF1C6   I          JSR    LINT1          ; LOAD INTO ARG1
0000E962 CE00B6   I          LDX    #TKRANGE       ; POINT AT TKRANGE
0000E965 BDF1D3   I          JSR    LINT2          ; LOAD INTO ARG2
0000E968 BDF222   I          JSR    MUL24          ; MULTIPLY
                  I          ;
0000E96B DCB2     I          LDD    @TOTFUEL       ; READ TOTAL FUEL
0000E96D 93BE     I          SUBD   @ABSCC         ; SUBTRACT FULL ADJUST
0000E96F DDBE     I          STD    @ABSCC         ; STORE BACK INTO TEMP
                  I          ;
0000E971 CE00BE   I          LDX    #ABSCC         ; POINT AT TEMPORARY
0000E974 BDF1D3   I          JSR    LINT2          ; LOAD INTO ARG2
0000E977 BDF2BC   I          JSR    DIV24          ; DIVIDE
                  I          ;
0000E97A DCB6     I          LDD    @TKRANGE       ; FETCH OLD TKRANGE
0000E97C 93C7     I          SUBD   @RES+1         ; SUBTRACT OFFSET
0000E97E DDB6     I          STD    @TKRANGE       ; STORE IN TANK RANGE
                  I          ;
0000E980 39       I          RTS                   ; THAT'S ALL FOLKS
                  I                                ;
                  I                                ;
                  I     ; ***************************************************************
                  I     ; ***
                  I     ; ***  DEVCAL    CALCULATES DEVIATION USING
                  I     ; ***
                  I     ; ***       DEV = LOW - (( LOW - HIGH ) /1056 ) ( NCBUF+4 - DRIVE <X> )
                  I     ; ***
                  I     ; ***  ENTER
                  I     ; ***
                  I     ; ***  USES    TEMP
                  I     ; ***          DRIVE0
                  I     ; ***          MODNUM
                  I     ; ***          YREG
                  I     ; ***          WORK
                  I     ; ***          RES
                  I     ; ***          COUNT
                  I     ; ***
                  I     ; ***  CALLS   LINT1
                  I     ; ***          LINT2
                  I     ; ***          MUL24
                  I     ; ***          DIV24
                  I     ; ***
                  I     ; ***  RETURNS
                  I     ; ***
                  I     ; ***************************************************************
                  I                                ;
0000E981 FBE0     I     NEG1056  WORD -1056
0000E983 0643     I     DRIVE0   WORD  1603
0000E985 0223     I     DIIVE1   WORD  547
                  I                                ;
                  I                                ;
0000E987 9782     I     DEVCAL  STA A  @TEMP       ; STORE IN TEMPORARY VARIABLE
0000E989 D783     I             STA B  @TEMP+1     ; STORE IN TEMPORARY VARIABLE
0000E98B 4F       I             CLR A              ; CLEAR ACCUMULATOR
0000E98C D682     I             LDA B  @TEMP       ; HIGH DRIVE
0000E98E 2A01     I             BPL    DEVI1       ; POSITIVE NO FIX
```

```
2379  0000E990 43      I            COM  A           ; NEGATIVE FIX IT
2380  0000E991 DD80    I    DEVI1   STD  @WORK       ; SAVE IN WORK
2381  0000E993 4F      I            CLR  A           ; CLEAR ACCUMULATOR
2382  0000E994 D683    I            LDA B @TEMP+1    ; LOW DRIVE
2383  0000E996 2A01    I            BPL  DEVI2       ; POSITIVE NO FIX
2384  0000E998 43      I            COM  A           ; NEGATIVE FIX IT
2385  0000E999 DD84    I    DEVI2   STD  @COUNT      ; SAVE IN COUNT
2386  0000E99B 9380    I            SUBD @WORK       ; SUBTRACT HIGH DRIVE
2387  0000E99D DD80    I            STD  @WORK       ; SAVE IN ARG1
2388                   I                             ;
2389  0000E99F CE0080  I            LDX  #WORK       ; POINT AT WORK
2390  0000E9A2 BDF1C6  I            JSR  LINT1       ; LOAD IN ARG1
2391  0000E9A5 CEE983  I            LDX  #DRIVE0     ; POINT AT TANK DRIVE TABLE
2392  0000E9A8 D690    I            LDA B @MODNUM    ; LOAD OFFSET
2393  0000E9AA 58      I            ASL  B           ; MULTIPLY BY 2
2394  0000E9AB 3A      I            ABX              ; ADD INTO OFFSET
2395  0000E9AC DC88    I            LDD  @YREG       ; GET DTCCCK TANK DRIVE
2396  0000E9AE A300    I            SUBD 0,X         ; SUBTRACT TANK DRIVE OFFSET
2397  0000E9B0 DD80    I            STD  @WORK       ; SAVE IN ARG2
2398  0000E9B2 CE0080  I            LDX  #WORK       ; POINT AT WORK
2399  0000E9B5 BDF1D3  I            JSR  LINT2       ; LOAD ARG2
2400  0000E9B8 BDF222  I            JSR  MUL24       ; TEMPORARY RESULT
2401                   I                             ;
2402  0000E9BB CEE981  I            LDX  #NEG1056    ; POINT AT -1056
2403  0000E9BE BDF1D3  I            JSR  LINT2       ; LOAD INTO ARG2
2404  0000E9C1 BDF2BC  I            JSR  DIV24       ; DIVIDE BY -1056
2405                   I                             ;
2406  0000E9C4 DCC7    I            LDD  @RES+1      ; LOAD 16 BIT RESULT
2407  0000E9C6 D384    I            ADDD @COUNT      ; ADD IN 16 BIT DEV B
2408  0000E9C8 39      I            RTS              ; EXIT
2409                   I                             ;
2410                   I                             ;
2411                   I                             ;
2412                           INCLUDE 'calram.asm'
2413                   I                             ;
2414                   I                             ;
```

With respect to the above control program, the microcomputer or microprocessor control unit 104 preferably supports software interfaces with four programmable logic devices in the universal fuel quantity indicator apparatus 100; namely a display driver, a dual digital-to-analog converter 16,122, the internal non-voltile random access memory 150 termed CALRAM and the external non-volatile random access memory 108 termed DCTURAM which is housed in the digital calibration trim unit or DCTU 102. All of these software interfaces are preferably supported by a multiple purpose internal communication bus which, in the above example, is defined on port lines P30 through P36. The display driver is preferably a conventional display driver such as a Holt Intergrated Circuits Inc. PN: HI-8010, with the indicator apparatus 100 software preferably providing all of the necessary timing, formatting, data translation and control necessary for serial communication with the display driver.

The display driver is preferably treated as a pair of shift registers with data being strobed into the input shift register by first presenting one bit of the data on the DATA LINE and toggling the CLOCK LINE once. After the entire shift register is filled, the LOAD LINE is preferably toggled to move the contents of the input shift register into the display register. This shift is preferably performed internally and continues to drive the display with the correct character pattern regardless of the state of CS not.

The previously referred to digital-to-analog converters or DACs associated with Tank Drive 122 and the Compensator Drive 116, as was previously mentioned with respect to FIG. 1, are preferably contained in a single dual 12-bit DAC such as an Analog Devices PN AD7549 dual 12-bit DAC. The universal fuel quantity indicator 100 software preferably provides all the necessary timing, formating, data translation and control necessary to support, in the above example, 12-bit multiplexed parallel communication with the DACs.

The previously mentioned CALRAM 150 is a conventional static memory such as a National Semiconductor PN 9306 E. Once again, the associated control software for the universal fuel quantity indicated apparatus 100 provides all the necessary timing, formatting, data translation and control necessary to support serial communication with the CALRAM 150.

Figure 5:
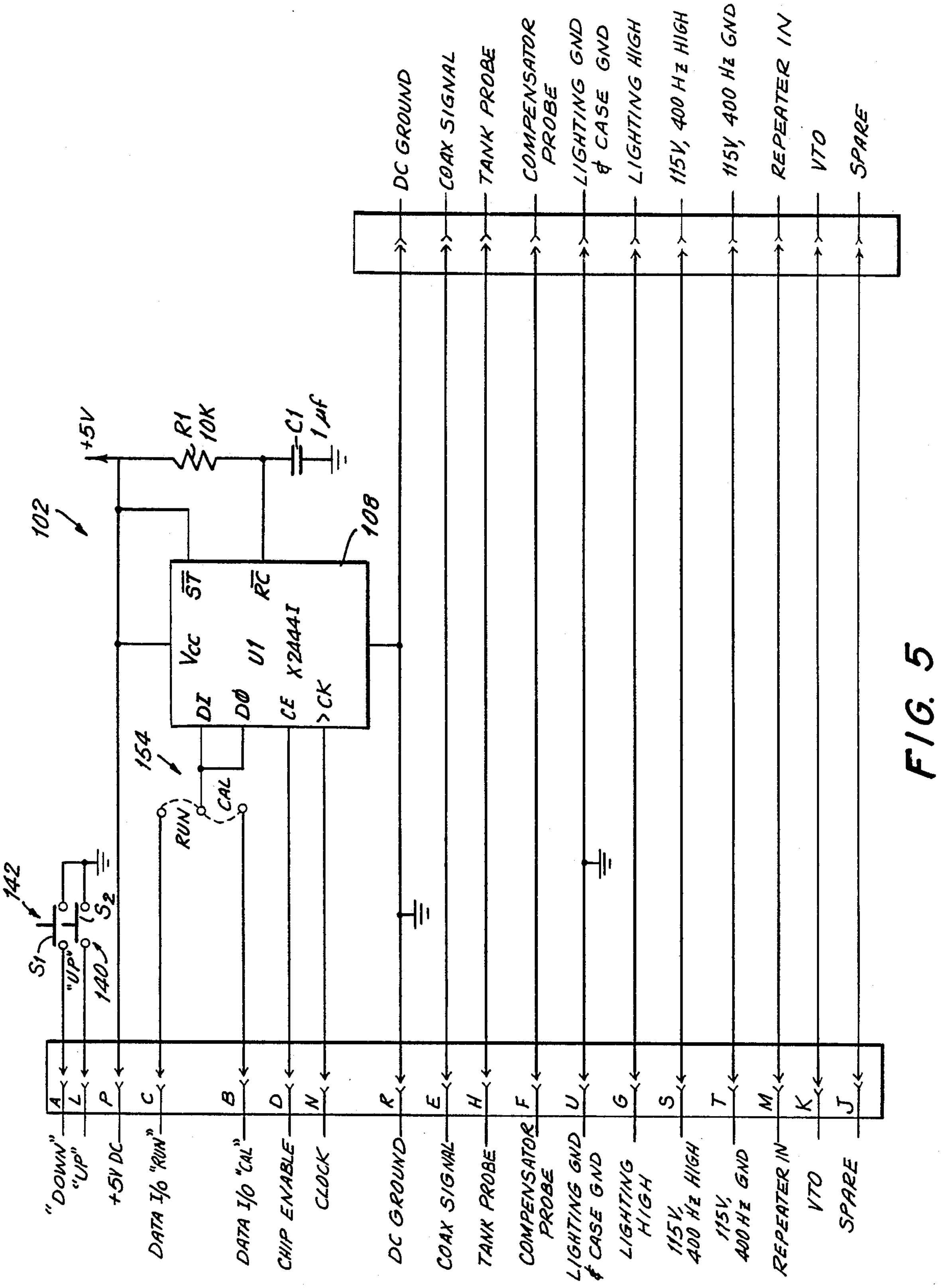
FIG. 5 is a schematic diagram of the presently preferred interface or digital calibration trim unit of the present invention employed with the universal fuel quantity indicator apparatus of FIG. 1.

With respect to the DCTURAM 108, such as a Xicor Inc. PN X2444, the afore mentioned control, software resident in memory 150 of the universal fuel quantity indicator apparatus 100 preferably provides all the necessary timing, formating, data translation and control necessary to support serial communication with the DCTURAM 108 on two separate conductor paths. These two separate conductor paths are preferably used, alternately, in the running and calibrating modes of operation which are selected by a mode selection jumper 154 (FIG. 5). By way of example, the data in the DCTURAM 108 is preferably organized as indicated in one of the following memory map tables.

TABLE

DCTURAM MEMORY MAP

| Data Word # | Contents | Valid Range |
|---|---|---|
| 00 | bank checksum word | 0000H to FFFFH |
| 01 | LB/KG indication | 0 or 1 |
| 02 | maximum fuel weight | 10 to 8000 |
| 03 | dry tank capacitance | 399 to 65,000 |
| 04 | wet tank capicitance | 799 to 20,000 |
| 05 | dry compensator capacitance | 199 to 1490 |
| 06 | wet compensator capacitance | 399 to 1490 |
| 07 | VCOMP zero-adjust offset (represents values from | 0-1024 −512 to 512) |
| 08 | range adjustment (represents values from | 0-1024 −512 to 512) |
| Words 09-13 | Not used - set to 0000H. | |
| 14 | Number of writes to the device | 1-1000 |

Preferably, the universal fuel quantity indicator apparatus 100 of the present invention has the ability to communicate with external devices by modulating the amplitude of the compensator drive. By driving the compensator to full scale for a logical 1 and to 0 for a logical 0, the indicator 100 will transmit data. When communications to the repeater are occuring, perferably the sample/hold amplifier 118 will be disabled to avoid inducing off scale bursts of signal data into the null point. Preferably, by way of example, one bit can be sent every two miliseconds with the stream being transmitted at an interval of no less than once every 1.5 seconds.

With respect to the CPU 104 software requirements, there are certain overhead processing requirements that should be considered. Thus, with respect to power-on initialization, the reset line of the micro computer 104, which is pin 6 in the above example, is Active low. While this pin is held low, the microcomputer 104 is held in a reset state. When a positive transition is detected on this line, the micro computer 104 fetches the reset address as defined by the operating mode, which is, in turn, defined by the state of port Lines, 20, 21, and 22. Preferably, in the indicator apparatus 100 of the present invention, all three mode select lines are pulled high which forces the micro computer 104 into mode 7 in the above example. In this mode, microcomputer 104 fetches the contents of memory location FFFEH: FFFFH, stores this value in the program counter, and begins program execution. This value is the address, in hexadecimal notation, of the first executable instruction executable instruction of the initalization routine illustrated above, which will also be the lowest address of the EPROM. To initialize the microcomputer 104, the stact pointer is set to FFH. All of the memory locations from 00H through SSH will be loaded with 0 and all of the port lines will be set to the I/O states referred to above. As for memory tests, the RAM will be check summed and the RAM will be tested by writing and reading test patterns to and from each location with a failure of either memory test preferably causing the software to enter a wait loop to reset. The software is also preferably designed to test the DCTURAM 108 communication line to see if it is present in which instance control passes to the field calibration routine forming part of the above illustrated control program. As for the operating constant calculation, which is where the digital calibration trim unit 102 in the calibrate mode configures the Fuel quantity indicator 100 for the specific fuel tank by inserting the specific parameters associated with the given fuel tank configuration, the above illustrated initialization routines calculate the constants necessary for the fuel weight equation, with the following constants or parameters specific to a given tank configuration which determine the calculated fuel quantity determination being required;

DTCCCK=NCOMPT tank drive DAC counts

DTCK=VCOMP tank drive DAC Counts

DKEMPTY=compensator drive DAC counts for empty tank

TKRANGE=DAC counts representing the span of compensator drive DAC count values (from empty to full tank) for the current tank VCOFF=DAC count bias (offset) for VCOMP mode The operating constants will be calculated in the above example, using the following equations:

$$DTCCCK = \frac{3600 \pm CK}{CTFULL}$$

$$DTCK = \frac{3600 \pm (CK + CCFULL)}{CTFULL}$$

$$(CK = 820)$$

Once a tank DAC value has been determined, the tank is placed either in the high or low range. The offsets for that tank can be found by a straight linear interpolation between two points.

$$X = 0 \text{ High tank drive } DAC \text{ range} \geqq 1603\ DAC<X> = 1603$$

$$X = 1 \text{ Low tank drive } DAC \text{ range} < 1603\ DAC<X> = 1603$$

$$\text{Offset empty} = C<3 + 2X> - (DTCCCK - DAC<X>)\frac{(C<3 + 2\ \ - C<1 + 2X>)}{1056}$$

$$\text{Offset full} = C<4 + 2X> - (DTCCCK - DAC<X>)\frac{(C<4 + 2X> - C<2 + 2X>)}{1056}$$

$$\text{Offset } VCOMP = P<1 + X> - (DTCCCK - DAC<X>)\frac{(P<1 + X> - P<X>)}{1056}$$

TKEMPTY is calculated using the theoretical value minus the empty tank offset.

$$TKEMPTY = \frac{DTCCCCK = CTEMPTY}{CCFULL + CK} - \text{Offset Empty}$$

TKRANGE is calculated using the theoretical value minus the full offset minus a full scale adjustment.

$$\text{TKRANGE} = \left(\frac{\text{DTCCCK} = \text{CTFULL}}{\text{CCFULL} + \text{CK}} - \text{TKEMPTY}\right)\left(1 - \frac{\text{FULL ADJUST}}{\text{TOT FUEL} - \text{FULL ADJUST}}\right)$$

The virtual compensation offset, VCOFF, is preferably a combination of the biasing deviation found in calibration of the apparatus 100 and a zero adjust entered in the DCTU.

$$VCOFF = VC\ \text{Offset} - \frac{\text{ZERO ADJUST} * TKRANGE}{TOT\ \text{FUEL}}$$

Preferably, in addition to the overhead functions already specified, the main execution loop continuously provides a calculation of the fuel weight using the following algorithm:

RUNNING AVERAGE OF COMPENSATOR DAC COUNTS—CALIBRATION OFFSET

Empty Tank Compensator DAC Counts)/Valid Range of Compensator DAC Counts * Maximum Fuel Weight=Actual fuel weight present Using mnemonics, this may be expressed more simply by,

WEIGHT=((AVG−TKEMPTY)/TKRANGE) * TOTFUEL

Preferably, the calibration routines can adjust the offset values such that the accuracy of the above calculation is by way of example, 0.5% of the actual fuel weight present in the specific tank for which the constants have been configuraled.

Digital Calibration Trim Unit

Figure 6A:
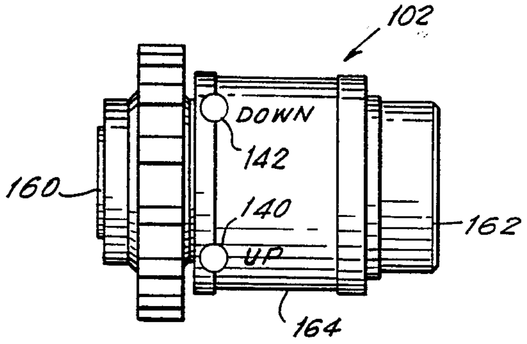
FIGS. 6A and 6B are side elevation views of a typical interface or digital calibration trim unit of FIG. 5 showing the sleeve off and on the unit.
Figure 6B:
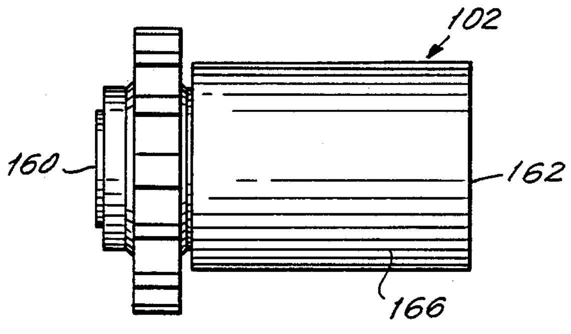
Figure 7:
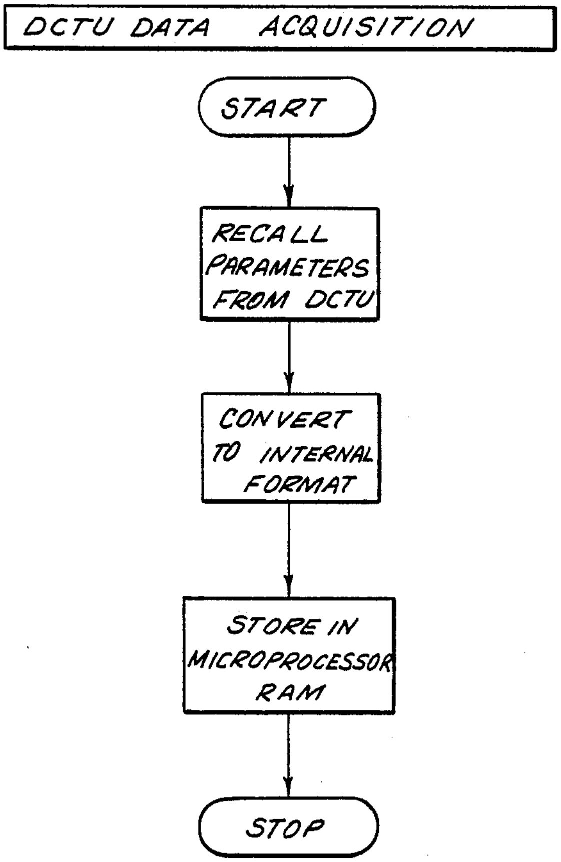
FIG. 7 is a logic flow diagram illustrative of the data acquisition program for the interface or digital calibration trim unit of FIG. 5.
Figure 8:
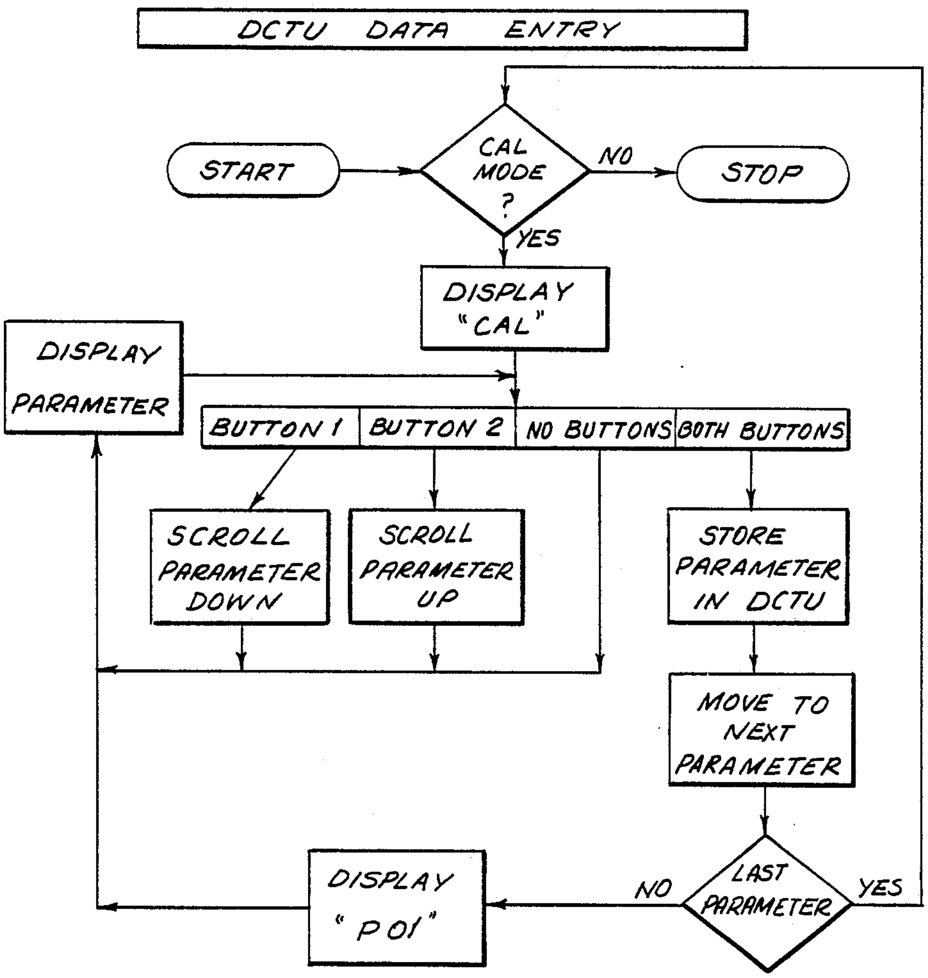
FIG. 8 is a logic flow diagram, similar to FIG. 7, of the data entry program for the interface or digital calibration trim unit of FIG. 5.
Figure 9:
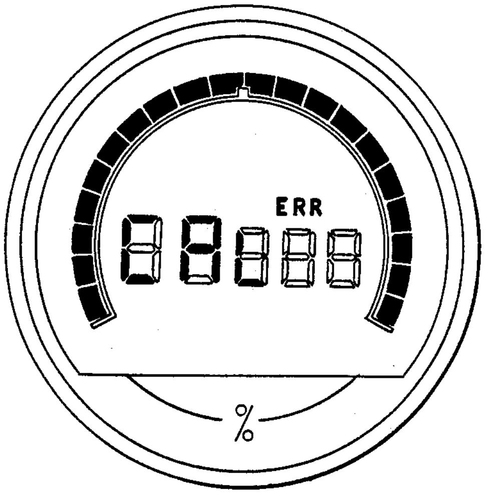
FIGS. 9 through 17 are illustrative examples of typical displays which preferably appear on the display device of the fuel quantity indicator of FIG. 1 in the calibrate mode during the configuring of the universal fuel quantity indicator to a specific fuel tank configuration, with FIG. 9 illustrating the entry display for this calibrate mode, FIG. 10 illustrating the normal display indicating the parameter number, FIG. 11 illustrating a normal parameter value display, FIG. 12 illustrating a normal display of parameter 2, FIG. 13 illustrating a normal display of parameter 3, FIG. 14 illustrating a normal display of parameter 4, FIG. 15 illustrating a normal display of parameter 5, FIG. 16 illustrating a normal display of parameter 6 and FIG. 17 illustrating an error display.
Figure 19:
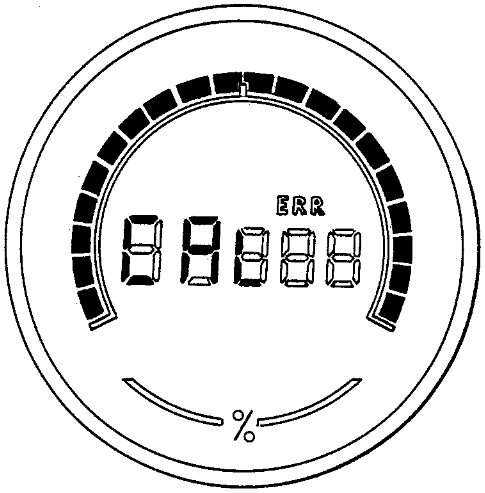
FIGS. 19 through 21 are further illustrative examples of typcal display configurations in the calibrate mode with FIG. 19 showing the entry display, FIG. 20 showing a display of parameter 1 and with FIG. 21 showing the display of parameter 4.

Although the previously referred to digital calibration trim unit or DCTU 102 may be permanently connected to a universal fuel quantity indicator 100 if desired, it is most preferably removably connectable as an interface to universal fuel quantity indicator 100, such as illustrated in FIG. 18 and in FIGS. 1 and 5. In such an instance, the DCTU 102, such as illustrated in FIG. 6 contains a multi-pin connector 160 which is plug compatable with the universal fuel quantity indicator 100 and another electrical connector 162 which is preferably plug compatable with the tank probe located in the fuel tanks for which the universal fuel quantity indicator 100 is to be configured such as an 18 pin connector to mate with the indicator 100 and all 11 pin connector to mate with the aircraft wiring by way of example. For ease of access, by way of example, the up and down button switches, 140 and 142, respectfully, extend through the outside of the housing 164 which is illustrated as being cylindrical although any type of shape desired may be employed. In addition, as illustrated on FIG. 6B, preferably a removable sleeve 166 is located on the digital calibration trim unit 102 so as to cover the select buttons 140 and 142 when the unit 102 is in the run mode as opposed to the calibrate mode and prevent inadvertent operation thereof. As will be explained further hereinafter, by pressing and releasing the switches 140 and 142 in the calibrate mode, an operator is able to enter any value for any constant maintained by the DCTU 102 which is in the valid range for that parameter. In the calibrate mode, after successful initialization, as referred to in the above control program, the display 130 of the fuel quantity indicator 100 is preferably illuminated with the message "CAL" to indicate the calibrate mode and the above illustrated control program starts scanning the buttons or switches 140 and 142 for transitions. The appearance of the display 130 at this time is illustrated in FIGS. 9 and 19. As was previously mentioned, preferably if both buttons or switches 140 and 142 are depressed simultaneously, the number of the DCTU 102 parameter being selected will increment by one and the associated parameter number which will be referred to in the following example, is displayed for a predetermined time, such as at least one second after the buttons 140 and 142 are released. Such a display is shown by way of example in FIGS. 10, 20 and 21. It should be noted that preferably the parameter number is the same as the DCTURAM address number and parameter number zero is the "CAL" message. Preferably after the parameter number display, the display 130, which preferably includes an arctic type of display, will show the current value of the current parameter being selected. By way of example, for parameter 1, 1 arc tic of a display and the weight unit legends will be displayed such as shown by way of example in FIG. 20. For parameter 2 in the above example, maximum fuel weight values are preferably displayed in actual amounts with the "FUEL", the appropriate weight unit legends, and 2 arctics active. For parameters 3 through 6, the number of tenths of a picofarad of capacitance and a number of arc tics equal to the parameter number will be displayed, such as the 4 arc tics shown by way of example in FIG. 21 for parameter 4. For parameters 7 and 8, in the above example, the weight units legend will be lit, the current value of pounds or kilograms will be indicated, and the number of arctics equal to the particular parameter will be lit. As was previously mentioned, preferably, releasing one button or switch 140 or 142 while the other is unpressed cause in increment for the up button 140 or a decrement for the down button 142 of the value of the current parameter being selected. Holding either button 140 or 142 depressed will preferably cause a scroll of current parameter values with the scrolling preferably being slow for a predetermined period such as 2 seconds, and rapid after this period for as long as the selected button is held depressed. Maximum fuel weight will preferably vary in increments or decrements of 100 pounds or kilograms by way of example, and compensator capacitor values will preferably increment by one tenth of a picofarad for values below 1000 pf, by way of example, and one picofarad for values above 1000 pf, by way of example. This data entry routine is illustrated by way of example in the logic flow diagram of FIG. 8 with the data acquisition routine being illustrated by way of example in the logic flow diagram of FIG. 8. In this regard, it should be noted that preferably every time both buttons 140 and 142 are depressed simultaneously, but before the number of the DCTU parameter is incremented by one, the number of writes to the device will be updated and checked for overrange, the current value of the current parameter will be written to the DCTURAM 108, and the checksum will be updated and verified. If the number of writes to the device is overrange or if the checksum test fails, the control program will preferably flag a DCTU error.

Summarizing the presently preferred method of configuring the universal fuel quantity indicator 100 of the present invention for a specific fuel tank, the outer sleeve 166 is preferably removed from the digital calibration trim unit 102 to expose the switch buttons 140 and 142 and the mode selection jumper 154 which is then moved from the "RUN" to the "CAL" position. The fuel quantity indicator display 130 will then preferably indicate this change of mode by displaying the word "CAL" such as illustrated in FIGS. 9 and 19. As was previously mentioned, push buttons 140 and 142 may then be pressed simultaneously to prompt the display of the first "DCTU" calibration parameter number on the display 130 with the arc tic corresponding to the parameter being displayed also preferably being active. The following table preferably defines the parameter numbers by way of example:

| parameter # | definition | valid range |
|---|---|---|
| 1 | max quantity of fuel | 00000-65000 |
| 2 | lb or kg | lb or kg legend |
| 3 | dry tank capacitance | 00000-6500.0 pf |
| 4 | wet tank capacitance | 00000-6500.0 pf |
| 5 | dry compensator cap | 00000-6500.0 pf |
| 6 | wet compensator cap | 00000-6500.0 pf |

Figure 10:
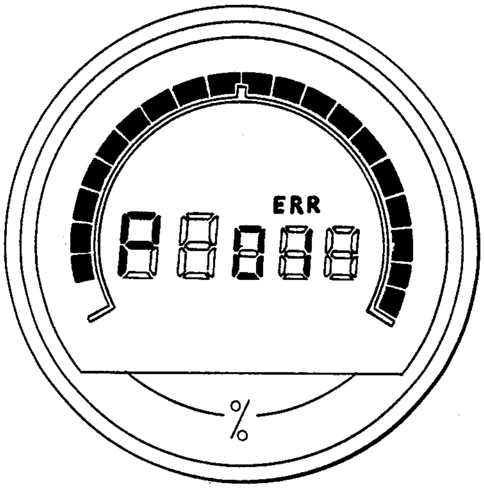
Figure 11:
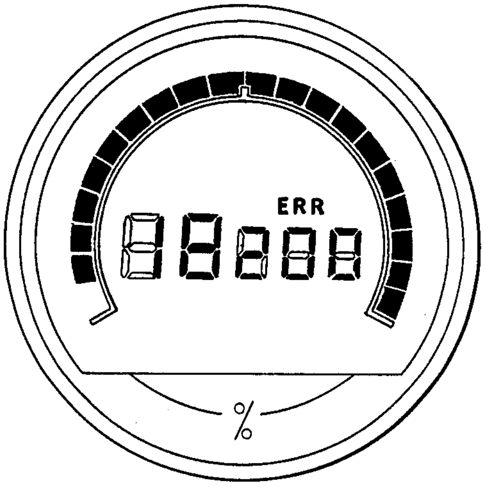
Figure 12:
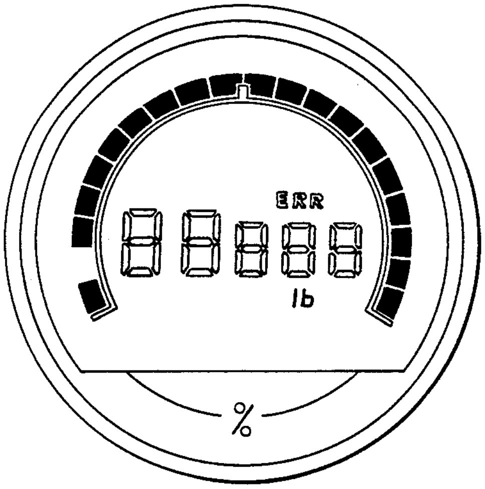
Figure 13:
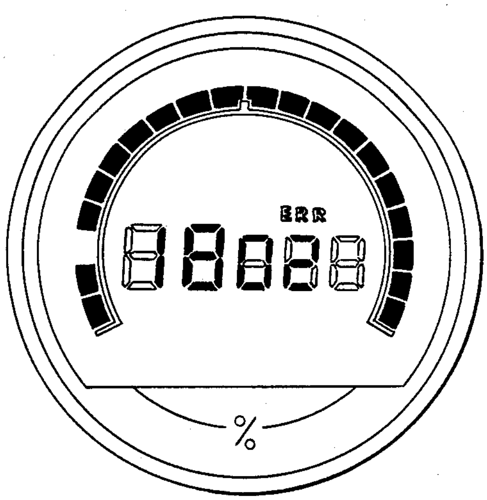
Figure 14:
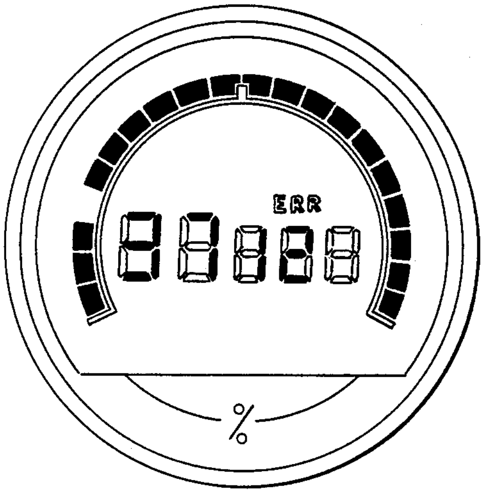
Figure 15:
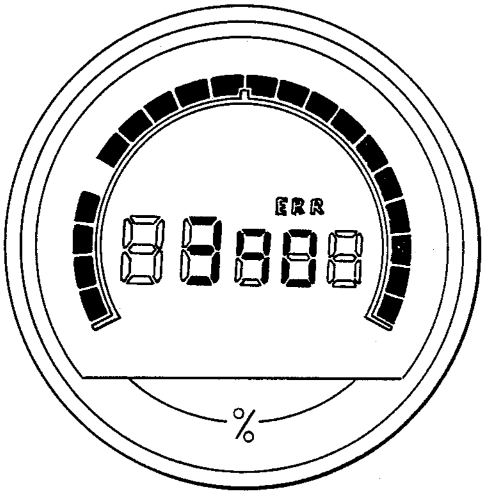
Figure 16:
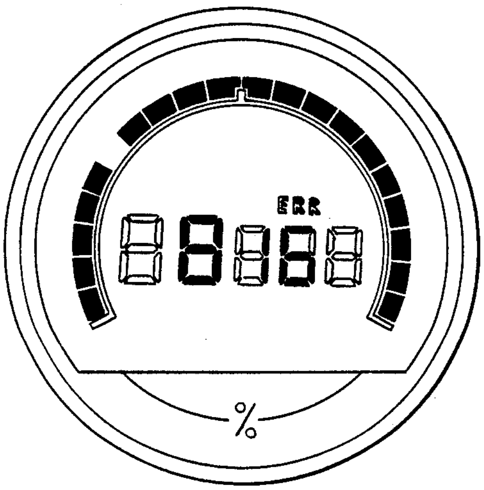
Figure 17:
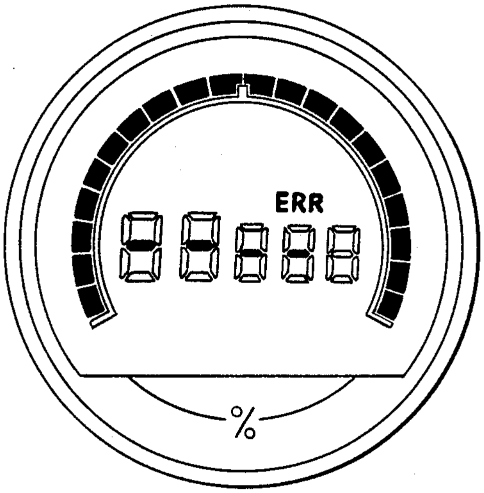
Figure 20:
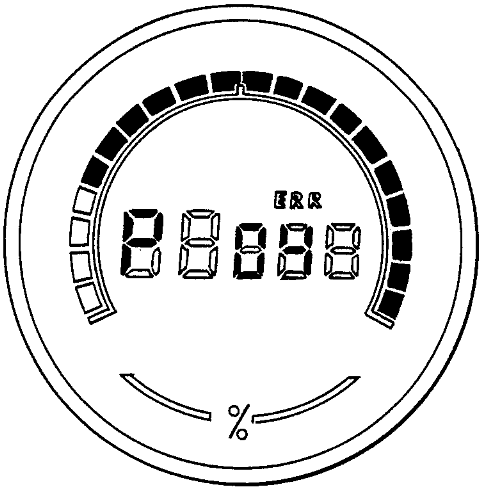
Figure 21:
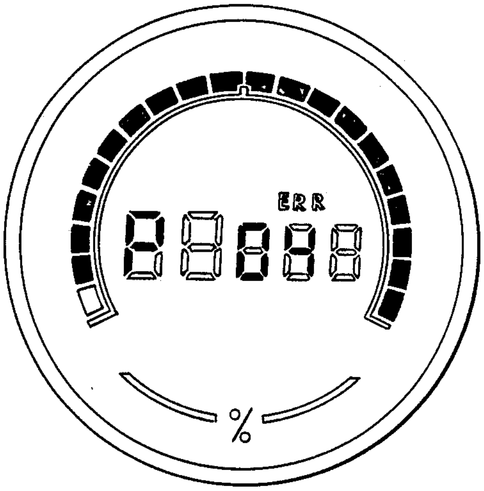

As was previously mentioned, the normal display indicating these parameter numbers is illustrated, by way of example, in FIGS. 10, 20 and 21. Preferably after releasing the two buttons 140 and 142, the parameter number will remain displayed for a predetermed period, such as one second, and then the value of the associated parameter will then be displayed on display 130, such as illustrated in FIG. 11. If the data for the particlar displayed parameter is not required to be altered, then the operator would press both push buttons 140 and 142 simultaneously and, thus advance the display 130 to the next DCTU calibration parameter number. FIGS. 12 through 16 illustrate typical normal display parameters for parameters 2 through 6 in the above example. In the event of the occurrence of an error, an error display would appear on display 130, such as shown by way of example in FIG. 17. If, however, the displayed parameter is not the desired parameter for the specific tank configuration with which the universal fuel quantity indicator 100 is to be employed, then the operator would press the corresponding "UP" or "DOWN" push button 140 or 142, respectively, to either increment or decrement, respectively, the displayed value until the desired value is displayed. The displayed value will preferably wrap around if the valid range is exceeded. When the displayed value of the parameter is the desired parameter for the specific fuel tank configuration, then both push buttons 140 and 142 are pressed simultaneously to enter the displayed value into the DCTURAM 108. The next parameter number is then displayed on display 30. If desired, all parameters can be viewed without change by repeated pressing of both push buttons 140 and 142 simultaneously. Preferably, after the operator verifies that the parameters are all now properly configured for the specific fuel tank configuration with which the universal fuel quantity indicator 100 of the present invention is being employed, the DCTU calibration mode is exited by moving the mode selection jumper 154 to the "RUN" position and the fuel quantity indicator 100 immediately returns to the fuel measurement mode in accordance with the above control program.

With respect to the balance of the circuitry of the fuel quantity indicator 100 illustrated in the drawings herein, this circuitry is self-explanatory and will be readily understood by one of ordinary skill in the art based on the foregoing information taken in conjunction with these drawings and need not be described in greater detail herein after. Suffice it to say, that with the apparatus of the present invention, a universal fuel quantity indicator apparatus may be provided which is reconfigurable for different specific fuel tanks by varying the selected fuel tank parameters so that different constants for different fuel tanks may be programmed into the fuel quantity indicator and changed as the specific tank configuration with which the indicator is to be employed changes.

What is claimed is:

1. In a fuel quantity indicator apparatus for determining the fuel quantity present in a fuel tank based on calculations of capacitance of a tank capacitor array and a compensation capacitor wherein a plurality of different parameters specific to a given tank configuration determine the measurement factors for said calculated fuel quantity determination, said indicator comprising display means for displaying fuel quantity information with respect to said fuel tank based on said calculated fuel quantity determination and microprocessor control means for calculating said fuel quantity determination and for controlling said display based thereon, said microprocessor control means comprising a CPU and first static memory means for storing control program information for controlling the operation of said microprocessor control means and for storing information corresponding to said different parameters for enabling said microprocessor control means to provide said calculated fuel quantity determination on said display means for a given specific fuel tank; the improvement comprising:

second alterable static memory means operably connected to said microprocessor control means for providing an alterable auxiliary data source of different groups of said different parameters for a plurality of different specific fuel tanks to said microprocessor control means, and up/down steering control means operably connected to said microprocessor control means CPU and said first and second static memory means for selecting a particular group of said different parameters dependent on the parameters associated with a particular specific fuel tank, said up/down steering control means comprising switch means for variably selecting the value of each of said parameters in said particular group and for storing each of said selected parameters in said group in said second alterable static memory means, said switch means further comprising means for loading the selected parameter content of said second alterable static memory means into said microprocessor control means first static memory means for configuring said fuel quantity indicator for a particular specific fuel tank, said fuel quantity indicator apparatus being reconfigurable for a different specific fuel tank by varying said selected fuel tank parameters by said up/down storing control means; whereby a universal fuel quantity indicator apparatus is provided.

2. An improved fuel quantity indicator apparatus in accordance with claim 1 wherein said first static memory control program controls said display means, said switch means including mode selection means having a first mode and a second mode, said display means further displaying each of said selected parameters during the selecting thereof in such first mode for verifying the selection thereof, said switch means being capable of confirming said displayed selection for enabling the storage thereof in said second alterable static memory means, said display means further being capable of displaying said fuel quantity information in said second mode.

3. An improved fuel quantity indicator apparatus in accordance with claim 2 wherein said control program controls said display means in said first mode for further displaying the parameter being selected and the varying selections for said parameter during the selection of said selected parameter for said specific fuel tank.

4. An improved fuel quantity indicator apparatus in accordance with claim 3 wherein said up/down steering control means switch means comprises means for bidirectionally varying the value of said selected parameter in said first mode.

5. An improved fuel quantity indicator apparatus in accordance with claim 4 wherein said switch means comprises a pair of switches, one of said pair of switches incrementing said selected parameter value in said first mode and the other of said pair of switches decrementing said selected parameter value in said first mode, both of said switches being operable together for storing said selected parameter value in said second alterable static memory means.

6. An improved fuel quantity indicator apparatus in accordance with claim 5 wherein said control program enables said parameter selection in a predetermined selection sequence for configuring said fuel quantity indicator, both of said switches being further operable together for advancing through said selection sequence to the next parameter to be selected in said selection sequence while also enabling said selected parameter value storage in said second alterable static memory means.

7. An improved fuel quantity indicator apparatus in accordance with claim 6 wherein said second alterable static memory means is a NOVRAM.

8. An improved fuel quantity indicator apparatus in accordance with claim 6 wherein said second alterable static memory means is an EEPROM.

9. An improved fuel quantity indicator apparatus in accordance with claim 2 wherein said switch means comprises means for enabling said loading of said selected parameter content of said second alterable static memory means in said second mode.

10. An improved fuel quantity indicator apparatus in accordance with claim 2 wherein said second alterable static memory means is a NOVRAM.

11. An improved fuel quantity indicator apparatus in accordance with claim 10 wherein said up/down steering control means switch means comprises means for bidirectionally varying the value of said selected parameter in said first mode.

12. An improved fuel quantity indicator apparatus in accordance with claim 2 wherein said second alterable static memory means is an EEPROM.

13. An improved fuel quantity indicator apparatus in accordance with claim 12 wherein said up/down steering control means switch means comprises means for bidirectionally varying the value of said selected parameter in said first mode.

14. An improved fuel quantity indicator apparatus in accordance with claim 1 wherein said selected parameters comprise constants for said specific fuel tank associated with said calculated fuel quantity determination therefor.

15. An improved fuel quantity indicator apparatus in accordance with claim 14 wherein said fuel tank comprises an aircraft fuel tank.

16. An improved fuel quantity indicator apparatus in accordance with claim 14 wherein said constants comprise full scale display factors for said display means.

17. An improved fuel quantity indicator apparatus in accordance with claim 1 wherein said fuel tank comprises an aircraft fuel tank.

18. An improved fuel quantity indicator apparatus in accordance with claim 17 wherein said second alterable static memory means is a NOVRAM.

19. An improved fuel quantity indicator apparatus in accordance with claim 17 wherein said second alterable static memory means is an EEPROM.

20. An improved fuel quantity indicator apparatus in accordance with claim 17 wherein said selected parameters comprise full scale display factors for said display means.

21. An improved fuel quantity indicator apparatus in accordance with claim 1 wherein said selected parameters comprise full scale display factors for said display means.

22. An improved fuel quantity indicator apparatus in accordance with claim 21 wherein said second alterable static memory means is a NOVRAM.

23. An improved fuel quantity indicator apparatus in accordance with claim 21 wherein said second alterable static memory means is an EEPROM.

24. An improved fuel quantity indicator apparatus in accordance with claim 1 wherein said up/down steering control means switch means comprises means for bidirectionally varying the value of said selected parameter in said first mode.

25. An improved fuel quantity indicator apparatus in accordance with claim 24 wherein said selected parameters comprise full scale display factors for said display means.

26. An improved fuel quantity indicator apparatus in accordance with claim 1 wherein said second alterable static memory means and said up/down steering control means are removably connected to said microprocessor control means.

27. A universal fuel quantity indicator interface apparatus for providing a variable set of initial conditions for a universal fuel quantity indicator apparatus for variably configuring said universal fuel quantity indicator apparatus for a particular specific fuel tank for determining the fuel quantity present in said specific fuel tank based on calculation of capacitance of a tank capacitor array and a compensation capacitor wherein a plurality of different parameters specific to a given tank configuration determine the measurement factors for said calculated fuel quantity determination, said indicator comprising display means for displaying fuel quantity information with respect to said fuel tank based on said calculated fuel quantity determination and microprocessor control means for calculating said fuel quantity determination and for controlling said display based thereon, said microprocessor control means comprising a CPU and first static memory means for storing control program information for controlling the operation of said microprocessor control means and for storing information corresponding to said different parameters for enabling said microprocessor control means to provide said calculated fuel quantity determination on said display means for a given specific fuel tank; said interface apparatus comprising second alterable static memory means removably connected to said microprocessor control means for providing an alterable auxiliary data source of different groups of said different parameters for a plurality of different specific fuel tanks to said microprocessor control means, and up/down steering control means removably connectable to said microprocessor control means CPU and said first and second static memory means for selecting a particular group of said different parameters dependent on the parameters associated with a particular specific fuel tank, said up/down steering control means comprising switch means for variably selecting the value of each of said parameters in said particular group and for storing each of said selected parameters in said group in said second alterable static memory means, said switch means further comprising means for loading the selected parameter content of said second alterable static memory means into said microprocessor control means first static memory means for configuring said fuel quantity indicator for a particular specific fuel tank, said fuel quantity indicator apparatus being reconfigurable for a different specific fuel tank by varying said selected fuel tank parameters by said up/down steering control means; whereby a universal fuel quantity indicator may be variably configured for different specific fuel tanks.

28. A universal fuel quantity indicator interface apparatus in accordance with claim 27 further comprising connection means for removably connecting said interface apparatus between a fuel tank probe for said specific tank and said universal fuel quantity indicatator apparatus for providing variations in said capacitance of said fuel tank to said microprocessor control means.

29. A universal fuel quantity indicator interface apparatus in accordance with claim 28 wherein said selected parameters comprise constants for said specific fuel tank associated with said calculated fuel quantity determination therefor.

30. A universal fuel quantity indicator interface apparatus in accordance with claim 27 wherein said fuel tank comprises an aircraft fuel tank.

31. A universal fuel quantity indicator interface apparatus in accordance with claim 30 wherein said selected parameters comprise full scale display factors for said display means.

32. A universal fuel quantity indicator interface apparatus in accordance with claim 31 wherein said second alterable static memory means is a NOVRAM.

33. A universal fuel quantity indicator interface apparatus in accordance with claim 30 wherein said second alterable static memory means is a NOVRAM.

34. A universal fuel quantity indicator interface apparatus in accordance with claim 30 wherein said second alterable static memory means in a EEPROM.

35. A universal fuel quantity indicator interface apparatus in accordance with claim 27 wherein said selected parameters comprise full scale display factors for said display means.

36. A universal fuel quantity indicator interface apparatus in accordance with claim 27 wherein said second alterable static memory means is a NOVRAM.

37. A universal fuel quantity indicator interface apparatus in accordance with claim 36 wherein said up/-down steering control means switch means comprises means for bidirectionally varying the value of said selected parameter in said first mode.

38. A universal fuel quantity indicator interface apparatus in accordance with claim 27 wherein said second alterable static memory means in a EEPROM.

39. A universal fuel quantity indicator interface apparatus in accordance with claim 38 wherein said up/-down steering control means switch means comprises means for bidirectionally varying the value of said selected parameter.

40. A universal fuel quantity indicator interface apparatus in accordance with claim 27 wherein said up/-down steering control means switch means comprises means for bidirectionally varying the value of said selected parameter.

41. A universal fuel quantity indicator interface apparatus in accordance with claim 40 wherein said switch means comprises a pair of switches, one of said pair of switches incrementing said selected parameter value and the other of said pair of switches decrementing said selected parameter value, both of said switches being operable together for storing said selected parameter value in said second alterable static memory means.

* * * * *